(12) United States Patent
Sumida et al.

(10) Patent No.: US 6,940,570 B1
(45) Date of Patent: Sep. 6, 2005

(54) LIGHTING ELEMENT FOR LIQUID CRYSTAL DISPLAY

(75) Inventors: Yukihiro Sumida, Yamatokoriyama (JP); Takeshi Masuda, Soraku-gun (JP); Tsuyoshi Ebi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/856,657

(22) PCT Filed: Nov. 24, 1999

(86) PCT No.: PCT/JP99/06548

§ 371 (c)(1),
(2), (4) Date: May 24, 2001

(87) PCT Pub. No.: WO00/32981

PCT Pub. Date: Jun. 8, 2000

(30) Foreign Application Priority Data

Nov. 27, 1998 (JP) ............................. 10-337456
Feb. 17, 1999 (JP) ............................. 11-038257

(51) Int. Cl.[7] .................... G02F 1/1335; F21V 7/04; G02B 6/10
(52) U.S. Cl. ...................... 349/61; 349/62; 349/112; 349/113; 362/31; 385/146
(58) Field of Search ............................ 349/60–65, 112, 349/113; 362/26, 31; 385/146

(56) References Cited

U.S. PATENT DOCUMENTS

| | | | | |
|---|---|---|---|---|
| 5,099,343 A | * | 3/1992 | Margerum et al. ............ | 349/63 |
| 5,390,276 A | * | 2/1995 | Tai et al. ..................... | 385/146 |
| 5,506,929 A | | 4/1996 | Tai et al. ..................... | 385/146 |
| 5,608,550 A | | 3/1997 | Epstein et al. ................ | 359/40 |
| 5,668,913 A | * | 9/1997 | Tai et al. ..................... | 385/146 |
| 5,729,311 A | * | 3/1998 | Broer et al. .................. | 349/65 |
| 5,764,322 A | * | 6/1998 | Mamiya et al. ............... | 349/65 |
| 5,808,708 A | | 9/1998 | Oyama et al. ................ | 349/65 |
| 5,926,601 A | * | 7/1999 | Tai et al. ..................... | 385/146 |
| 5,971,559 A | * | 10/1999 | Ishikawa et al. ............. | 362/31 |
| 6,086,212 A | * | 7/2000 | Onishi et al. ................. | 362/31 |
| 6,239,851 B1 | * | 5/2001 | Hatazawa et al. ............ | 349/62 |

FOREIGN PATENT DOCUMENTS

| | | |
|---|---|---|
| EP | 0 556 606 | 8/1993 |
| EP | 0 851 675 | 7/1998 |
| EP | 0 866 264 | 9/1998 |
| EP | 0 969 311 | 1/2000 |
| JP | 5-196820 A | 8/1993 |
| JP | 7-1426 | 1/1995 |
| JP | 7-20305 A | 1/1995 |
| JP | 7-287126 | 10/1995 |
| JP | 9-160032 | 6/1997 |
| JP | 9-311333 | 12/1997 |
| JP | 3048369 | 2/1998 |
| JP | 10-210405 | 8/1998 |
| JP | 10-283817 | 10/1998 |
| JP | 11-249579 | 9/1999 |
| JP | 2000-19330 | 1/2000 |

* cited by examiner

Primary Examiner—Tarifur R. Chowdhury
(74) Attorney, Agent, or Firm—Nixon & Vanderhye, P.C.

(57) ABSTRACT

A front light (100) and a reflecting liquid crystal display of the present invention includes a dot light emitting source (101), and a light guiding body (104) having a light incident surface (104a) to which light from the dot light emitting source (101) is incident and a light outgoing surface (104b) from which the incident light outgoes, and light from the dot light emitting source (101) is in a linearly emitting state at least when incident onto the light incident surface (104a). By so doing, it is possible to provide bright, inexpensive, low-power consuming front light (100) and reflecting liquid crystal display which do not cause shadows or a moire fringe from the dot light emitting source (101), or a light-dark difference in luminance.

68 Claims, 60 Drawing Sheets

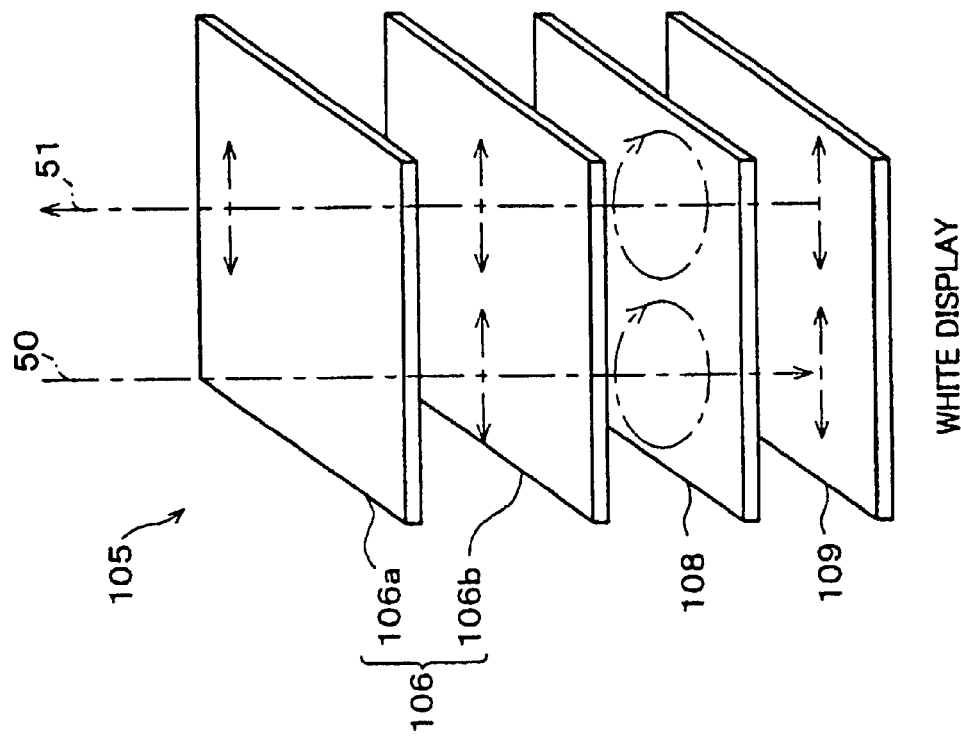
FIG. 2 (b) WHITE DISPLAY
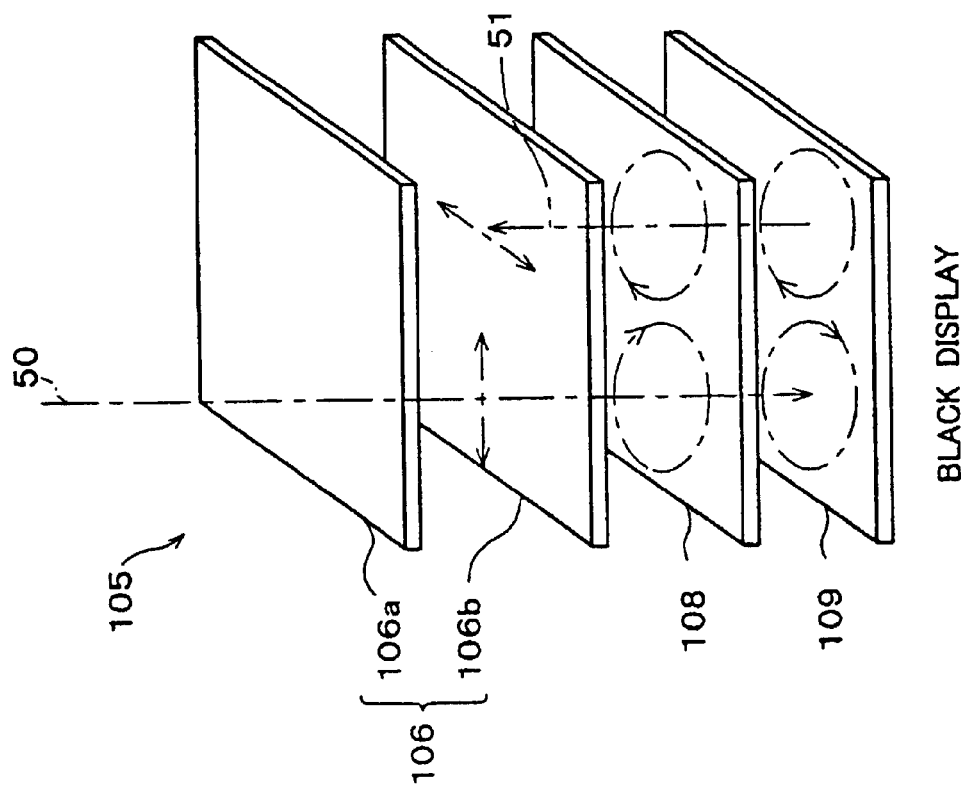
FIG. 2 (a) BLACK DISPLAY

DELTA ALIGNMENT

STRIPE ALIGNMENT

→|◁— FIRST LED ARRAY
→|◁— SECOND LED ARRAY

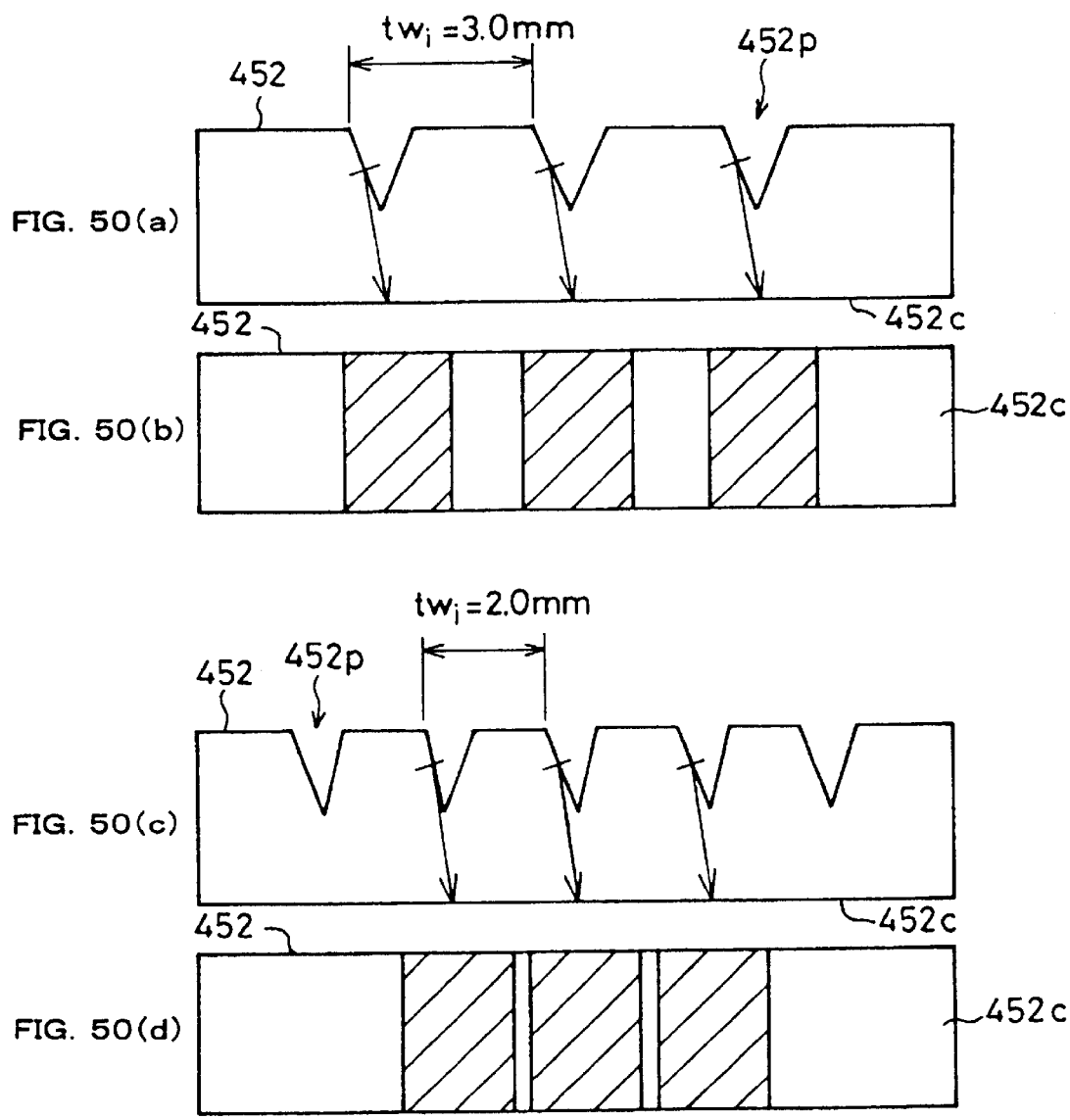

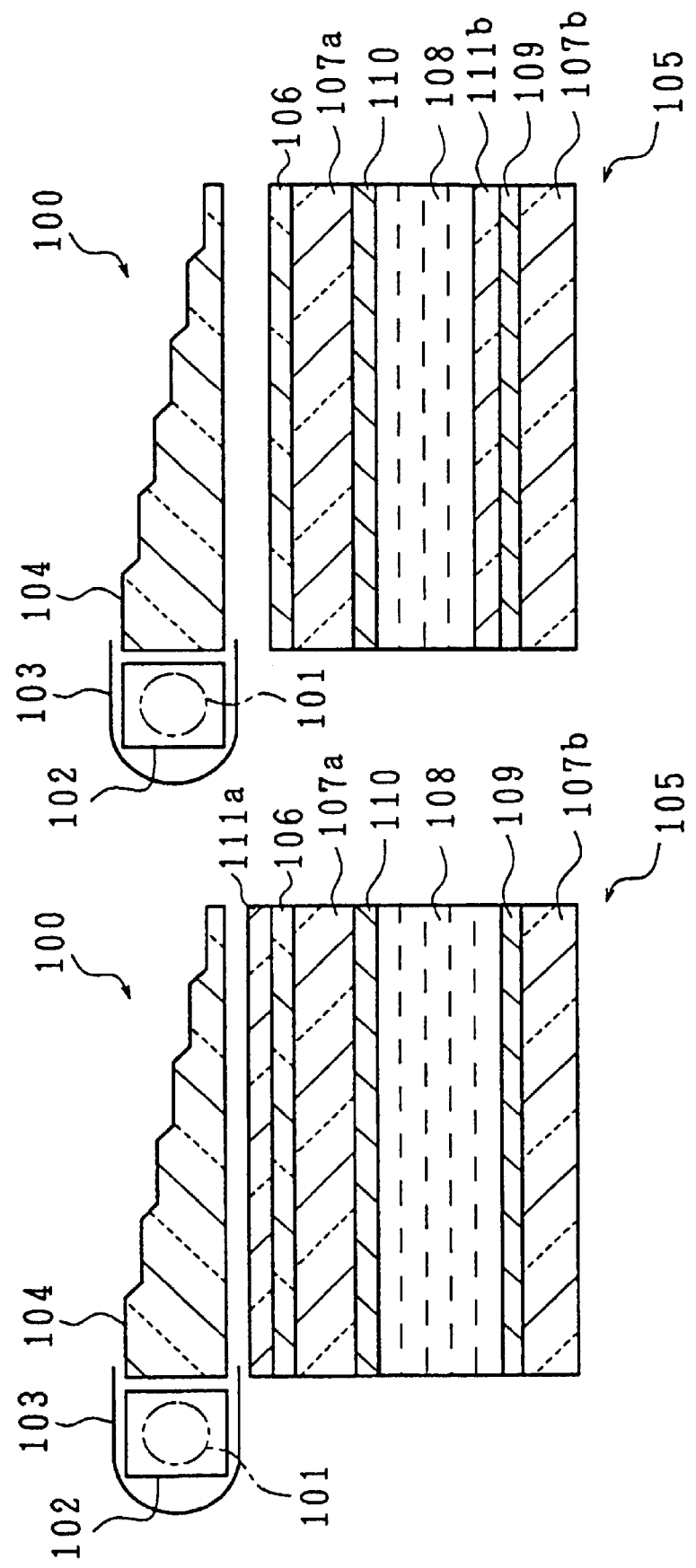

LIGHTING ELEMENT FOR LIQUID CRYSTAL DISPLAY

This application is the U.S. national phase of international application PCT/JP99/06548 filed Nov. 24, 1999 which designated the U.S. and claims benefit of Japanese application 10-337456 filed Nov. 27, 1998 and Japanese application 11-38257 filed Feb. 17, 1999, entire contents of which are hereby incorporated by reference.

TECHNICAL FIELD

The present invention relates to a thin, light, low-power consuming liquid crystal display (for example, a reflecting liquid crystal display, a transmitting liquid crystal display, etc.) used for image display in an information display system or OA equipment, and a lighting system (for example, a front light, a back light, etc.) capable of lighting the display efficiently without degrading the display quality thereof as well as a lighting element used in the lighting system, and more particularly to a front light capable of lighting the display efficiently without impairing thinness, lightness, low-power consumption, namely, the characteristics of a liquid crystal display equipped with a lighting system, and a liquid crystal display employing the same.

TECHNICAL BACKGROUND

A liquid crystal display is different from other types of displays, such as a CRT (Cathode Ray Tube), a PDP (Plasma Display Panel), and an EL (Electro Luminescence) in that it displays characters and images not by allowing liquid crystal to self-emit light, but by adjusting and controlling a quantity of transmitting light emitted from a particular light source or a quantity of reflected light.

The foregoing conventional liquid crystal display is largely divided into two types: a transmitting liquid crystal display and a reflecting liquid crystal display.

The transmitting liquid crystal display device has polarizing plates at the light incident side and light outgoing side, and displays an image by modulating in the liquid crystal layer a polarization state of linearly polarized light incident through the polarizing plate at the light incident side, and controlling a quantity of light passing through the other polarizing plate at the light outgoing side. Hence, a light emitting source, such as a fluorescent tube or an EL, serving as lighting means and called a back light that lights the liquid crystal display from behind (light incident side), is generally provided to the transmitting liquid crystal display at the light incident side.

On the other hand, the reflecting liquid crystal display includes one polarizing plate and one reflecting plate, and it controls a quantity of outgoing light from the polarizing plate by modulating a polarization state of linearly polarized light in the liquid crystal layer while the linearly polarized light incident on the polarizing plate is reflected by the reflecting plate to reach the polarizing plate again. Hence, the reflecting liquid crystal display can display an image by using surrounding light, and does not require the back light as described above, thereby making it possible to realize the characteristics of the transmitting liquid crystal display, that is, lightness, thinness, and a low power consumption.

Further, under the very bright circumstances with direct sunlight, image visibility is reduced markedly in a light-emitting display or the transmitting liquid crystal display. On the contrary, another characteristic of the reflecting liquid crystal display is that the image visibility can increase under such circumstances.

For this reason, there has been an increasing need for the reflecting liquid crystal displays in recent years, and there is a tendency to employ reflecting liquid crystal displays extensively in portable information terminals, mobile computers, etc.

However, the foregoing reflecting liquid crystal display has the following problem. That is, as previously mentioned, because the reflecting liquid crystal display uses surrounding light for display, its display luminance largely depends on environments, and one can hardly see the display under dark circumstances at night, for example. In particular, this problem is significant in a reflecting liquid crystal display using a color filter for color image display or a polarizing plate. Therefore, if the surrounding light is insufficient, auxiliary lighting means has to be provided.

However, the back light used in the transmitting liquid crystal display can not be employed as the lighting means for the reflecting liquid crystal display, because a reflecting plate made of a metal thin film or the like is essentially provided at the back surface of the reflecting liquid crystal display.

In order to solve the above problem, methods of lighting the reflecting liquid crystal display from front have been proposed as auxiliary lighting means under the dark environment.

It should be noted, however, that, in order to maintain the advantages of the reflecting liquid crystal display, namely, the lightness, thinness, and low power consumption, the auxiliary lighting means has to be a light, low-power consuming, space-saving component.

For example, if a fluorescent tube is used as the light source of the auxiliary lighting means, a high frequency power is necessary to allow the fluorescent tube to emit light. However, because a portable device is equipped with a DC power source, such as a battery, an inverter that converts a DC current to an AC current is essential. Hence, not only power consumption increases, but also a larger space becomes necessary to install the high frequency power source, thereby making it difficult to produce a low-power consuming, light, compact reflecting liquid crystal display.

However, by using a light source which can emit light on a DC current, such as an LED, as the light source of the auxiliary lighting means, the inverter can be omitted. Thus, this arrangement is advantageous in realizing a low-power consuming, light, space-saving reflecting liquid crystal display.

Lighting systems described in Japanese Laid-Open Patent Application No. 260405/1998 (Japanese Official Gazette, Tokukaihei No. 10-260405, published on Sep. 29, 1998), U.S. Pat. No. 5,506,929 issued to Ping-Kaung Tai Clio Technologies Inc. and published on Apr. 9, 1996, etc. can be used as the foregoing auxiliary lighting means. These publications disclose a lighting system, in which a light guiding body is combined with converting means for efficiently converting light emitted from a dot light source to light in a linearly emitting state.

Also, U.S. Pat. No. 5,608,550 issued on Mar. 4, 1997 discloses an auxiliary lighting system, by which light emitted from a dot light emitting source is converted efficiently to light in a linearly emitting state in a uniform distribution, and then this light in the linearly emitting state is guided to reach a planar light guiding body to have a tilt with respect to the incident surface thereof, whereby the light in the linearly emitting state is converted to light in a planarly emitting state.

The above lighting system can reduce the number of light sources compared with a case where a plurality of dot light emitting sources are provided at the end surface of the light guiding body, and is advantageous in that it costs less. The above lighting system would also be advantageous in that a light-dark difference in luminance can be reduced compared with a case when a plurality of dot light emitting sources are provided at the end surface of the light guiding body.

The following will describe the conditions required for the lighting system employed in a liquid crystal display. The liquid crystal display displays an image by lighting a liquid crystal element, and for this reason, it is preferable to light the pixel area (display screen) formed on the liquid crystal element brightly in a uniform manner. In order to realize such lighting, a dot of light emitted from a dot light source has first to be converted to light in a linearly emitting state efficiently in a uniform distribution. In other words, the light converted to the linearly emitting state is allowed to have, in the light emitting state, the least irregularity in luminance with respect to the line direction, while attaining high outgoing luminance by efficiently utilizing light emitted from the dot light source.

In particular, when using the auxiliary lighting means as a front light, light in the linearly emitting state has to be converted to light in the planarly emitting state, and the resulting planarly emitting light should not affect the display quality adversely. For example, a moire fringe is produced when a structure formed in the planar light guiding body that converts light in the linearly emitting state to light in the planarly emitting state interferes with a pixel formed on the liquid crystal display element, and the moire fringe gives adverse affects significantly to the display quality. Thus, the occurrence of moire fringe has to be prevented.

To this end, it is preferable that the linear light guiding body converts a dot of light incident thereon to light in the linearly emitting state adequately as light to be incident on the planar light guiding body by considering the position of the planar light guiding body in relation to the liquid crystal element. Also, it is important to convert a dot of light to light in the linearly emitting state efficiently in a well-distributed state, and then to light in the planarly emitting state.

However, the foregoing auxiliary lighting means has the following problem.

First, the lighting system described in Japanese Laid-open Patent Application No. 260405/1998 supra discloses that light from a dot light emitting source converted to light in the linearly emitting state to reach the planar light guiding body. However, this publication fails to disclose or suggest specifically the linearly emitting state (for example, as to the outgoing direction or distribution). The same can be the for U.S. Pat. No. 5,506,929 supra, which will be described more in detail below.

FIG. 42(a) shows an example of the lighting system described in U.S. Pat. No. 5,506,929 supra.

As shown in the drawing, the lighting system includes a light guiding body 2102 in the vicinity of a dot light emitting source 2101. The light guiding body 2102 guides incident light thereon to another light guiding body 2104 by limiting an angle of the incident light by a propagating portion 2102b, and then allowing the same to go out from a light outgoing surface 2012c to reach the light guiding body 2104. As a consequence, the incident light is converted to light in the planarly emitting state by the light conducting body 2104, thereby making it possible to light an unillustrated reflecting display.

In the lighting system arranged as above, however, the length of the light outgoing surface 2102c of the light guiding body 2102 is substantially equal to an effective emission length of a light incident surface 2104a of the light guiding body 2104. Therefore, sufficient light does not enter at the corners of the light incident surface 2104a of the light guiding body 2104, and this produces shadows 2103 noticeable as shown in FIG. 42(b) when one observes the display screen, thereby causing a problem that the display quality its deteriorated.

While the auxiliary light stays OFF, cyclic structures 2104f formed on the light guiding body 2104 interfere with a repeating direction (not shown) of pixels formed in the reflecting liquid crystal display, and a moire fringe is produced, which also causes a problem that the display quality is deteriorated.

Further, when a plurality of dot light emitting sources 2101 are provided directly to the light incident surface 2104a of the light guiding body 2104 in the foregoing lighting system, incident light emitted from each dot light emitting source 2101 directly travels through the light guiding body 2104. Thus, bright lines as many as the dot light emitting sources 2101 are produced, thereby causing a problem that a light-dark difference in luminance is produced on the display screen and the display quality is deteriorated markedly.

Also, when the lighting system described in U.S. Pat. No. 5,608,550 supra displays an image while the front light stays OFF, that is, by using surrounding light alone (light incident from the exterior in all directions), an image is blurred or a moire fringe is produced, thereby degrading the display quality. In addition, in the above lighting system, a tilt is given to light incident on the planar light guiding body with respect to the surface thereof. Thus, light other than the one that goes out in the planar light guiding body direction is not utilized, thereby reducing light utilization.

Further, in the above lighting system, when more than one dot light emitting source is provided in order to increase brightness, for example, when a dot light emitting source is provided at each end of the linear light guiding body, light emitted from each dot light emitting source is converted into light in the nonuniform linearly emitting state. This inconvenience may be eliminated and a well distributed linearly emitting state may be obtained by providing two linear light guiding bodies disclosed in the publications or the like and symmetrically with respect to each other. However, this arrangement upsizes the light source unit, and not only the portability is reduced, but also the cost is increased significantly.

Moreover, none of the foregoing publications fully discusses light utilization of the linear light guiding body. Thus, a great quantity of light is lost at the linear light guiding body, thereby reducing light utilization of the entire lighting system.

More specifically, according to each technique disclosed in the foregoing publications, it is quite difficult to secure a sufficiently large reflecting surface which plays an important role in converting light to light in the linearly emitting state while distributing the same in a uniform manner. Therefore, a quantity of light that goes out in an adequate direction from the linear light guiding body is reduced and so is a quantity of light contributing in planarly emission in the planar light guiding body, thereby reducing light utilization.

As has been discussed, there has been a need for bright, inexpensive, low-power consuming lighting system and liquid crystal display which do not cause shadows or a moire fringe from the light source, or a light-dark difference in luminance.

DISCLOSURE OF THE INVENTION

The present invention was made in light of the aforementioned problems, and an object of the present invention is to improve display quality of an image display device needing a light source. More specifically, an object of the present invention is to provide a low-power consuming and space saving lighting system (for instance, a front light, or a back light) that is capable of, when combined with a display element, preventing occurrence of a moire fringe that adversely affects image quality, and irradiating the display element with uniform and bright light by converting light from light source into a linearly emitting state and further to a planarly emitting state in good distribution and efficiently, as well as to provide a lighting element for use in the lighting system, and further, to provide a liquid crystal display using the same (for instance, a reflecting liquid crystal display, and a transmitting liquid crystal display).

To achieve the foregoing object, a lighting system of the present invention is a lighting system for irradiating pixels of an image display element with outgoing light, the lighting system comprising:

a linear light guiding body for converting light from a light source unit into a linearly emitting state; and a planar light guiding body in which a cyclic structure for converting light from the linear light guiding body into a planarly emitting state and emitting the converted light is formed, wherein light from the linear light guiding body reaches a peak value of luminance when outgoing in a first outgoing direction, the first outgoing direction being a direction on a side of a direction perpendicular to a cyclic direction of the cyclic structure with respect to a normal direction of a light outgoing surface of the linear light guiding body.

Furthermore, the first outgoing direction is preferably set so that light in the first outgoing direction should travel in the planar light guiding body in a perpendicular direction with respect to the cyclic direction.

According to the foregoing arrangement, the linear light guiding body that converts light from a light source unit such as a dot light emitting source into a linearly emitting state causes outgoing light to reach a peak value of luminance when outgoing in the first outgoing direction, which is a direction on a side of a direction perpendicular to a cyclic direction of the cyclic structure with respect to a normal direction of a light outgoing surface of the linear light guiding body. More preferably, the first outgoing direction is set so that light in the first outgoing direction should travel in the planar light guiding body in a perpendicular direction with respect to the cyclic direction.

Here, the planar light guiding body can efficiently convert light incident to the cyclic structures in a direction in close approximation to the perpendicular direction into the planarly emitting state. Such efficient conversion of light into the planarly emitting state results in efficient irradiation of an image display element, whereby bright image display can be realized.

Therefore, the foregoing arrangement enables efficient conversion of light from the light source unit into the planarly emitting state even in the case where adapted as the light source unit is a dot light emitting source that can be easily caused to emit by means of a DC power source. Consequently, it is possible to efficiently irradiate an image display element with bright light.

Consequently, with the foregoing arrangement, it is possible to provide a lighting system that irradiates an image display element with bright light while maintaining low power consumption and space saving. By producing an image display device using the foregoing lighting system, it is possible to improve image quality of display images.

The lighting system of the present invention is arranged so that a tilt is given to the cyclic direction of the cyclic structure with respect to a repeating direction of the pixels.

According to the foregoing arrangement, a tilt is given to the cyclic structure provided on the planar light guiding body that converts light in the linearly emitting state into the planarly emitting state, with respect to the repeating direction of pixels of the image display element that is to be irradiated by the lighting system. Therefore, it is possible to prevent a moire fringe from occurring due to interference of the cyclic structure with the pixels. Consequently, it is possible to prevent occurrence of a moire fringe in the image display device, thereby improving image quality of display images.

The lighting system of the present invention is preferably further arranged so that light from the linear light guiding body reaches a peak value of luminance when outgoing in a second outgoing direction that is different from the first outgoing direction.

In addition, it is preferably further arranged so that the first outgoing direction and the second outgoing direction are symmetric with respect to the normal direction of the light outgoing surface of the linear light guiding body.

The foregoing arrangement ensures that irradiation of an area other than the area directly irradiated by light that is emitted to propagate the planar light guiding body in the first outgoing direction can be compensated by means of light that is emitted to propagate the planar light guiding body in the second outgoing direction. Consequently, it is possible to attain more even luminance distribution of light in the planarly emitting state that outgoes from the planar light guiding body.

In the case where the first and second outgoing directions are set so as to be symmetric in particular, light emitted in the second outgoing direction and reflected by a side surface of the planar light guiding body travels in the planar light guiding body in a substantially identical direction to the direction in which light emitted in the first outgoing direction travels. Therefore, like in the aforementioned cases, the light is efficiently converted into the planarly emitting state.

The lighting system of the present invention is preferably further arranged so that a ratio of maximum value and minimum value in luminance distribution of the light outgoing from the linear light guiding body in the first outgoing direction is not more than 3.

Alternatively, the lighting system is preferably further arranged so that a ratio of maximum value and minimum value in luminance distribution of the light outgoing from the linear light guiding body in the second outgoing direction is not more than 3.

According to the foregoing arrangements, light in the linearly emitting state with the luminance distribution of not more than 3 is incident to the planar light guiding body. Therefore, luminance of light in the planarly emitting state that outgoes from the planar light guiding body is more evenly distributed. Consequently, by irradiating an image display element with this light uniformly emitted from the planar light guiding body, high-quality image display with less display irregularities can be realized.

The lighting system of the present invention is preferably further arranged so that an angle that the cyclic direction of the cyclic structure provided on the planar light guiding body forms with respect to the repeating direction of the pixels is not less than 10° and not more than 80°.

The foregoing arrangement is particularly effective to prevent occurrence of a moire fringe, thereby further improving image quality of display images.

The lighting system of the present invention is preferably further arranged so that in the linear light guiding body, on a surface thereof opposing the light outgoing surface, a propagating portion and a reflecting portion are repetitively formed.

In the foregoing arrangement, the linear light guiding body has a light outgoing surface and a surface opposing the light outgoing surface. On the surface opposing the light outgoing surface, a propagating portion and a reflecting portion are alternately and repetitively formed. This arrangement causes incident light emitted from a light source (for instance, a dot light emitting source) to be reflected by a plurality of reflecting portions, to be converted into the linearly emitting state to outgo. Therefore, it is possible to cause light to efficiently enter the planar light guiding body.

Furthermore, since by means of the propagating portions, the incident light from the light source is allowed to efficiently travel in a lengthwise direction of the linear light guiding body. Therefore, it is possible to improve utilization of light, and to achieve uniform luminance of light in the linearly emitting state.

The lighting system of the present invention is preferably further arranged so that a diffusing and reflecting sheet is provided to surround the linear light guiding body.

With the foregoing arrangement in which a diffusing and reflecting sheet is provided to surround the linear light guiding body, light leaking from outside the light outgoing surface provided on the linear light guiding body can be diffused and reflected by the diffusing and reflecting sheet. Therefore, it is possible to cause light to be effectively incident to the planar light guiding body, thereby to improve utilization of light.

The lighting system of the present invention preferably has an arrangement in which (i) the light source unit causes the light to enter the linear light guiding body, and (ii) optical matching means is provided between the light source unit and the linear light guiding body.

The foregoing arrangement in which optical matching is attained between the light source unit and the linear light guiding body ensures reduction of interface reflection that occurs in the case where the light source unit (for instance, a dot light emitting source) and the linear light guiding body are provided with an air layer therebetween. Therefore, it is possible to reduce loss of the incident light.

The lighting system of the present invention is preferably further arranged so that the optical matching means is an adhesive resin having a refractive index n ranging from 1.4 to 1.7 both inclusive.

With the foregoing arrangement in which the optical matching is achieved by means of an adhesive resin having a refractive index n ranging from 1.4 to 1.7 both inclusive, it is possible to provide, at a low cost and high productivity, optical matching means capable of guiding light of a sufficient quantity from the light source to the linear light guiding body.

The lighting system of the present invention is preferably further arranged so that the linear light guiding body is formed so that:

a thickness t2 of the light outgoing surface of the linear light guiding body is substantially equal to a thickness t1 of a light incident surface of the planar light guiding body; and an angle $\theta 5$ formed between the normal direction of the light outgoing surface with a side end surface of the linear light guiding body satisfies:

$0°<\theta 5 \leq 20°$

According to the foregoing arrangement, the thickness t2 of the light outgoing surface of the linear light guiding body and the thickness t1 of the light incident surface of the planar light guiding body are set substantially equal to each other, and a tapering treatment is applied so that the angle $\theta 5$ formed between the normal direction of the light outgoing surface with a side end surface of the linear light guiding body satisfies $0°<\theta 5 \leq 20°$. By so doing, it is possible to cause incident light having been emitted from the light source unit (for instance, dot light emitting source) to be efficiently incident to the linear light guiding body, and then, to cause the light to be incident to the light incident surface of the planar light guiding body with high efficiency. Thus, it is possible to provide a bright lighting system.

In other words, it is preferable that the linear light guiding body is tapered so that a cross section of the linear light guiding body taken along a plane perpendicular to the light outgoing surface thereof should be in a shape of trapezoid that widens from a light outgoing surface side toward a side opposing the light outgoing surface side.

By so doing, in the case where adapted as the light source unit is a light source having a diameter greater than the thickness of the incident light surface of the planar light guiding body, it is possible to cause light from the light source unit to be efficiently incident to the linear light guiding body, hence to be efficiently incident to the light incident surface of the planar light guiding body.

Furthermore, it is desirable that an angle formed between the normal direction of the light outgoing surface of the linear light guiding body with a tapered side surface is larger than 0° and not larger than 20°.

Since light reaching the tapered side surface of the linear light guiding body can be efficiently reflected therefrom in the foregoing arrangement, little light leaks to outside, resulting in improvement of utilization of light.

The lighting system of the present invention is preferably further arranged so that a reflecting surface is provided on the light incident surface of the linear light guiding body in such a manner that light from the light source unit (for instance, a dot light emitting source) should be reflected toward the cyclic structures formed on the linear light guiding body.

According to the foregoing arrangement, a reflecting surface is provided on the light incident surface of the linear light guiding body in such a manner that light from the light source unit (for instance, a dot light emitting source) should be reflected toward the cyclic structures formed on the linear light guiding body. By so doing, a plurality of dot light emitting sources can be provided, whereby it is possible to provide a brighter lighting system.

The lighting system of the present invention is preferably further arranged so that the following relationship is satisfied:

$0\ mm<(L2-L1)\leq 10\ mm$ where L1 represents a length of the light incident surface of the planar light guiding body and L2 represents a length of the light outgoing surface of the linear light guiding body.

According to the foregoing arrangement, the length of the light incident light of the planar light guiding body is given as L1 while the length of the light outgoing surface of the linear light guiding body is given as L2, and the lighting system is arranged so as to satisfy $0\ mm<(L2-L1)\leq 10\ mm$. By so doing, light is caused to effectively go into the planar light guiding body from its light incident surface including the corner portions, thereby making it possible to reduce the occurrence of unwanted shadows at the corners of the light guiding body. Thus, it is possible to provide a lighting device with high performance, without impairing the portability.

The lighting system of the present invention is preferably further arranged so that the following relationship is satisfied:

$$g \times \tan \theta \leq (L2-L1) \leq 10 \text{ mm}$$

where:
- $\theta$ represents an angle formed between the cyclic direction of the cyclic structure provided on the planar light guiding body and the repeating direction of the pixels;
- L1 represents a length of the light incident surface of the planar light guiding body;
- L2 represents a length of the light outgoing surface of the linear light guiding body; and
- g represents a distance between the light incident surface of the planar light guiding body and the light outgoing surface of the linear light guiding body.

According to the foregoing arrangement, $g \times \tan \theta \leq (L2-L1) \leq 10$ mm is satisfied, where $\theta$ represents an angle the cyclic direction of the cyclic structure provided on the planar light guiding body forms with respect to the repeating direction of the pixels, L1 represents a length of the light incident surface of the planar light guiding body, L2 represents a length of the light outgoing surface of the linear light guiding body, and g represents a distance between the light incident surface of the planar light guiding body and the light outgoing surface of the linear light guiding body. By so doing, it is possible to cause light to be effectively incident into the light incident surface including the corner portions. Thus, it is possible to provide a lighting device that makes it possible to reduce the occurrence of unwanted shadows at the corners of the light guiding body, thereby contributing to improvement of display quality.

The lighting system of the present invention is preferably further arranged so that light outgoing from the linear light guiding body should reach substantially a peak value of luminance when outgoing in a direction at an angle $\theta 1$ that satisfies:

$$\theta 1 = \sin^{-1}(n \times \sin \theta)$$

or $$\theta 1 = -\sin^{-1}(n \times \sin \theta)$$

where:
- $\theta$ represents an angle formed between the cyclic direction of the cyclic structure provided on the planar light guiding body and the repeating direction of the pixels; and
- n represents a refractive index of the planar light emitting body.

According to the foregoing arrangement, light outgoing from the linear light guiding body should reach a peak value of luminance when outgoing in a direction at an angle $\theta 1$ that satisfies $\theta 1 = \sin^{-1}(n \times \sin \theta)$ or $\theta 1 = -\sin^{-1}(n \times \sin \theta)$ where $\theta$ represents an angle formed between the cyclic direction of the cyclic structure provided on the planar light guiding body and the repeating direction of the pixels, and n represents a refractive index of the planar light emitting body. By so doing, light can be caused to effectively go to the cyclic structures (propagating portions and reflecting portions) provided on the planar light guiding body, resulting in that a brighter lighting system can be realized.

The lighting system of the present invention is preferably further arranged so that the normal direction of the light outgoing surface of the linear light guiding body and the first outgoing direction forms an angle expressed as:

$$\sin^{-1}(n \times \sin \theta)$$

where:
- $\theta$ represents an angle formed between the cyclic direction of the cyclic structure provided on the planar light guiding body and the light incident surface of the planar light guiding body; and
- n represents a refractive index of the planar light emitting body.

In the foregoing arrangement, light emitted in the first outgoing direction travels through the planar light guiding body in a direction perpendicular to the cyclic direction of the cyclic structures provided in the planar light guiding body. Therefore, for the aforementioned reason, light from the linear light guiding body can be efficiently converted into a planarly emitting state, whereby bright image display is enabled.

To achieve the aforementioned object, a lighting system of the present invention is a lighting system having a light source unit and a planar light guiding body, the planar light guiding body having a light incident surface to which light from the light source unit is incident and converting light in a linearly emitting state that is incident onto the light incident surface into a planarly emitting state, and is arranged so as to comprise sheet-state converting means that converts light emitted from the light source unit into light in a linearly emitting state, the converting means being arranged so that at least a part thereof opposes the light source unit while at least a part thereof opposes the light incident surface of the planar light guiding body.

According to the foregoing arrangement, light from the light source is converted into a linearly emitting state by the converting means at least parts of which oppose the light source and the light incident surface of the planar light guiding body, respectively, to be incident to the planar light guiding body. Then, the light thus incident to the planar light guiding body is converted by the planar light guiding body into a planarly emitting state.

Here, since the light source unit is provided vis-a-vis the sheet-state converting means, in the case where a dot light emitting source for instance is adapted as a light source unit, it is possible to increase the number of light source units while avoiding to make the system bulky or to make the structure complex.

Therefore, it is possible to easily increase the quantity of light of the lighting system. Consequently, by forming an image display device using the present lighting system, it is possible to provide an image display device producing bright display images.

Incidentally, applicable as the sheet-state converting means is a diffusing and reflecting sheet, a reflecting plate, or the like.

The lighting system of the present invention is preferably further arranged so that the light source unit is composed of at least one dot light emitting source, and that the converting means is diffusing means provided in the vicinity of the dot light emitting source.

According to the foregoing arrangement, the light source unit is composed of at least one dot light emitting source, and light from the dot light emitting source is converted by the diffusing means provided in the vicinity of the dot light emitting source into a linearly emitting state in the process of incidence to the light incident surface of the planar light guiding body. Therefore, the number of component elements can be reduced, thereby making it possible to provide an inexpensive lighting system. Further, since the incident light from the dot light emitting source is diffused, it is possible to provide a lighting system having a small light-dark difference in luminance.

The lighting system of the present invention is preferably further arranged so that:

the at least one dot light emitting source is disposed below the light incident surface of the planar light guiding body so as to face the diffusing means through the planar light guiding body in-between; and a distance L between the dot light emitting source and the diffusing means, and a thickness te of the light incident surface of the planar light guiding body satisfy:

$0 \leq (L-te) \leq 10$ mm

According to the foregoing arrangement, at least one dot light emitting source is provided below the light incident surface of the planar light guiding body, and the distance L between the dot light emitting source and the diffusing means and the thickness te of the light incident surface of the planar light guiding body satisfy $0 \leq (L-te) \leq 10$ mm. By so doing, a lighting system can be provided so as to be capable of diffusing incident light from the dot light emitting source while keeping the quantity of the incident light less varying, without impairing the portability, and therefore it is possible to provide such a bright lighting system having a small light-dark difference in luminance.

The lighting body of the present invention is preferably further arranged so that:

the at least one dot light emitting source is disposed below the light incident surface of the planar light guiding body;

a direction in which light outgoes from the dot light emitting source is set to a normal direction of the light incident surface, directed from inside of the planar light guiding body to outside; and a distance L' between the dot light emitting source and the diffusing means satisfies:

$0 \leq L' \leq 10$ mm

According to the foregoing arrangement, the at least one dot light emitting source is disposed below the light incident surface of the planar light guiding body, and the direction of the light outgoing from the dot light emitting source is set in a direction from inside to outside the planar light guiding body via the light incident surface, while the distance L' between the light source and the diffusing means is set so as to satisfy $0 \leq L' \leq 10$ mm. By so doing, a lighting system can be provided so as to be capable of diffusing incident light from the dot light emitting source while keeping the quantity of the incident light less varying, without impairing the portability, and therefore it is possible to provide such a bright lighting system having a small light-dark difference in luminance.

The lighting system of the present invention is preferably further arranged so that:

the light source unit is composed of at least one dot light emitting source provided on a surface opposing the light incident surface of the planar light guiding body; and the converting means is diffusing means provided on the light incident surface of the planar light guiding body.

According to the foregoing arrangement, the at least one dot light emitting source is disposed on the surface opposing the light incident surface of the planar light guiding body, and the diffusing means is provided on the light incident surface of the planar light guiding body. By so doing, light from a plurality of dot light emitting sources can be more efficiently diffused, and therefore, it is possible to provide a lighting system having a smaller light-dark difference in luminance.

The lighting system of the present invention is preferably further arranged so that:

the light source unit is composed of at least one dot light emitting source provided on a surface opposing the light incident surface of the planar light guiding body; and the converting means is reflecting means provided on the light incident surface of the planar light guiding body.

According to the foregoing arrangement, the at least one dot light emitting source is disposed on the surface opposing the light incident surface of the planar light guiding body, and the reflecting means is provided on the light incident surface of the planar light guiding body. By so doing, light from a plurality of dot light emitting sources can be more efficiently spread over the light incident surface of the planar light guiding body, and therefore, it is possible to provide a lighting system having a smaller light-dark difference in luminance.

The lighting system of the present invention is preferably further arranged so that the at least one dot light emitting source constituting the light source unit is composed of an LED element.

According to the foregoing arrangement, the at least one dot light emitting source constituting the light source unit is composed of an LED element. By so doing, an inexpensive lighting system excelling in portability can be realized.

To achieve the aforementioned object, a lighting system of the present invention is a lighting system having a light source unit and a planar light guiding body, the planar light guiding body having two light incident surfaces opposing each other to which light from the light source unit is incident as well as a light outgoing surface from which the incident light converted into a planarly emitting state outgoes, and is arranged so as to include:

the light source unit is composed of an LED array, wherein:

the LED array includes a first LED array provided on one of the light incident surfaces of the planar light guiding body, and a second LED array provided on the other light incident surface of the planar light guiding body; and the first and second LED arrays alternately emit light.

According to the foregoing arrangement, a plurality of dot light emitting sources are formed with an LED array, and the LED array is composed of a first LED array provided on one of the light incident surfaces of the planar light guiding body, and a second LED array provided on the other light incident surface of the planar light guiding body, and the first and second LED arrays alternately emit light, so as to compensate the light emitting state each other. By so doing, it is possible to provide a linearly emitting state whose light-dark difference in luminance is improved.

The lighting system of the present invention is preferably further arranged so that a frequency f causing the first and second LED arrays to alternately emit light satisfies 60 Hz$\leq$f$\leq$10 kHz.

According to the foregoing arrangement, the first and second LED arrays repeatedly emit light when a frequency f, at which the first and second LED arrays alternately emit light, is in a range of 60 Hz≦f≦10 kHz. By so doing, it is possible to provide a lighting system that suppresses the occurrence of unwanted flickers (recognition of flickers), and to ensure lower power consumption.

To achieve the aforementioned object, a liquid crystal display of the present invention is characterized by including the aforementioned lighting system, and a liquid crystal display element displaying an image by controlling, at each pixel, light outgoing from the light outgoing surface of the planar light guiding body.

The foregoing arrangement makes it possible to provide a liquid crystal display that provides bright, high-quality image display having a small light-dark difference in luminance.

To achieve the aforementioned object, a liquid crystal display of the present invention is a liquid crystal display including:

a front light including a light source unit and a planar light guiding body, the planar light guiding body having a light incident surface to which light from the light source unit is incident and a light outgoing surface from which the incident light outgoes, the light from the light source unit being in a linearly emitting state at least when being incident to the light incident surface of the planar light guiding body; and a reflecting liquid crystal display element displaying an image by controlling, at each pixel, light outgoing from the light outgoing surface of the planar light guiding body, the liquid crystal display being arranged so that:

on a counter surface of the planar light guiding body opposing the light outgoing surface thereof, a cyclic structure composed of a propagating portion and a reflecting portion is repetitively formed; and the cyclic structure is provided on the counter surface of the planar light guiding body so that a cyclic direction thereof has an angle θ of not less than 10° and not more than 80° with respect to the repeating direction of the pixels formed on the reflecting liquid crystal display element.

According to the foregoing arrangement, (i) on a counter surface of the planar light guiding body opposing the light outgoing surface thereof, a cyclic structure composed of a propagating portion and a reflecting portion is repetitively formed, and (ii) the cyclic structure is provided on the counter surface of the planar light guiding body so that a cyclic direction thereof has an angle θ of not less than 10° and not more than 80° with respect to the repeating direction of the pixels formed on the reflecting liquid crystal display element. By so doing, a moire fringe that occurs due to interference of the cyclic structures with each other can be prevented. This makes it possible to improve display quality of the liquid crystal display.

Any foregoing lighting system ensures that each effect should be achieved, in the case where it is adapted as a front light, and also in the case where it constitutes a reflecting liquid crystal display when combined with a reflecting liquid crystal element.

To achieve the aforementioned object, a lighting element of the present invention is a lighting element comprising a prismatic linear light guiding body, the linear light guiding body having a light incident surface to which light from a light source unit is incident and a light outgoing surface from which the incident light outgoes, wherein:

the light incident surface is provided on an end surface of the linear light guiding body, the end surface being at an end in the lengthwise direction;

the light outgoing surface is provided on a side surface of the linear light guiding body along the lengthwise direction;

notches that reflect the incident light are arrayed on a surface of the linear light guiding body opposing the light outgoing surface at constant pitches in the lengthwise direction, the number of the notches being I (I is an integer of not less than 2); and as to the I notches, an average of differences between widths of adjacent notches is greater than 0, the difference being defined as:

$$DIFFERENCE = (pw_{i+1} - pw_i)$$

where $pw_i$ is a width of the i'th notch from the light incident surface (i is an integer ranging from 1 to I).

Alternatively, to achieve the aforementioned object, a lighting element of the present invention is arranged so as to include a prismatic linear light guiding body, the linear light guiding body having a light incident surface to which light from a light source unit is incident and a light outgoing surface from which the incident light outgoes, wherein:

the light incident surface is provided on an end surface of the linear light guiding body, the end surface being at an end in a lengthwise direction;

the light outgoing surface is provided on a side surface of the linear light guiding body along the lengthwise direction;

notches that reflect the incident light are arrayed on a surface of the linear light guiding body opposing the light outgoing surface in the lengthwise direction, the number of the notches being I (I is an integer of not less than 2); and an average of tilts of the I notches is greater than 0, the tilt being defined as:

$$TILT = (d_{i+1} - d_i)/(x_{i+1} - x_i)$$

where $x_i$ and $d_i$ are a distance from the light incident surface, and a depth, respectively, of the i'th notch from the light incident surface (i is an integer ranging from 1 to I).

According to the aforementioned arrangement, the prismatic linear light guiding body has a light incident surface on an end surface at at least one end in the lengthwise direction, and has a light outgoing surface along the lengthwise direction. Besides, on a surface opposing the light outgoing surface, notches that reflect the incident light are arrayed along the lengthwise direction. The notches are arranged so that the notch width thereof or the notch depth thereof averagely increases as becoming farther from the light incident surface.

This ensures that the notch positioned far from the light incident surface should reflect more light, which enables to compensate a decrease in the quantity of light from the light source unit. Therefore, this allows an increase in the quantity of light outgoing from the linear light guiding body, while allows the luminance distribution as to the outgoing light to be more uniform in the lengthwise direction of the linear light guiding body.

Furthermore, the foregoing arrangement, unlike a wedge-form linear light guiding body, allows a linear light guiding body to have a width that is uniform in the lengthwise direction, and hence, to have a structure that facilitates propagation of light from the light incident surface in the lengthwise direction. Therefore, it is possible to improve utilization of light and to make luminance of outgoing light more uniform.

Furthermore, since the foregoing arrangement allows the pitch of the notches uniform, it is possible to ensure that some portions should be left without notches on the surface opposing the light outgoing surface (flat portions). This also allows the light guiding body to have a structure that facilitates propagation of light from the light incident surface in the lengthwise direction.

Consequently, in the lighting element of the foregoing arrangement, it is possible to attain a uniform and bright linearly emitting state in the lengthwise direction of the linear light guiding body. Further, by combining the foregoing lighting element with a planar light guiding body or the like, it is possible to provide a lighting system that illuminates an image display element with uniform and bright light.

The lighting element of the present invention is preferably further arranged so that the average of tilts of the I notches is in a range of not less than 0.0001 and not more than 0.05.

The foregoing arrangement enables to set the luminance distribution of the outgoing light from the linear light guiding body (ratio of the maximum value to the minimum value of luminance of the outgoing light) in a range of 1 to 3, and it is possible to realize a linearly emitting state in which light made to incident to the planar light guiding body is required to be.

The lighting element of the present invention is preferably further arranged so that values of the tilts are uniform throughout the I notches.

In the foregoing arrangement, the notches are formed repetitively with a certain set tilt. Therefore, the luminance distribution of the outgoing light can be made further uniform.

The lighting element of the present invention is preferably further arranged so that, on the surface of the linear light guiding body opposing the light outgoing surface, a total of widths of the notches in the lengthwise direction accounts for not less than 5 percent and not more than 80 percent of a sum of the total of the widths of the notches and a total of widths of flat portions provided between the notches.

According to the foregoing arrangement, a proportion of the total of widths of the notches in the sum of the total of the widths of the notches and the total of the widths of the flat portions is set not less than 5%. Therefore, it is possible to ensure a sufficient proportion of the notches. This enables to efficiently convert incident light from the light source unit into a linearly emitting state, thereby improving utilization of light.

Furthermore, according to the foregoing arrangement, a proportion of the total of widths of the notches in the sum of the total of the widths of the notches and the total of the widths of the flat portions is set not more than 80%. Therefore, a sufficient proportion of flat portions can be ensured as well. Consequently, it is possible to efficiently guide the incident light from the light source unit in the lengthwise direction of the linear light guiding body. This enables to uniformly convert the incident light from the light source unit into a linearly emitting state.

Consequently, it is possible to provide a uniform and bright lighting element.

The lighting element of the present invention is preferably further arranged so that, on the surface of the linear light guiding body opposing the light outgoing surface, a sum of a width of the notch in the lengthwise direction and a width of a flat portion in the lengthwise direction is not less than 0.05 mm and not more than 2 mm, the flat portion being a portion provided between the notch and another adjacent notch on one side to the notch.

According to the foregoing arrangement, the sum of a width of the notch and a width of a flat portion adjacent to the notch on one side is set not more than 2 mm. Therefore, it is possible to ensure continuity of bright portions on the light outgoing surface of the linear light guiding body, thereby to prevent light from having light-dark differences on the light outgoing surface. Therefore, the foregoing arrangement ensures that a more uniform, linearly emitting state should be attained.

Furthermore, with the foregoing arrangement, by setting the sum of a width of a notch and a width of a flat portion adjacent to the notch on one side is set not more than 0.05 mm, it is possible to avoid difficulty in forming the notches, in the process of producing the linear light guiding body.

The lighting element of the present invention is preferably further arranged so that:

the linear light guiding body has a second light incident surface one an end surface opposing the light incident surface of the linear light guiding body;

notches that reflect the incident light are arrayed in the lengthwise direction on a surface of the linear light guiding body opposing the light outgoing surface, the number of the notches being J (J is an integer of not less than 2); and an average of tilts of the J notches is greater than 0, the tilt being defined as:

$$TILT = (d_{j+1} - d_j)/(x_{j+1} - x_j)$$

where $x_j$ and $d_j$ are a distance from the light incident surface, and a depth, respectively, of the j'th notch from the second light incident surface (j is an integer ranging from 1 to J).

According to the foregoing arrangement, incident surfaces are provided at both end surfaces of the linear light guiding body in the lengthwise direction, and the notches provided on the surface opposing the light outgoing surface are arranged so that the notch depth thereof averagely increases as becoming farther from each light incident surface. In other words, concrete cases of the foregoing arrangement include a case where the tilts are symmetric with respect to the center of the linear light guiding body. In the foregoing arrangement, it is possible to increase the light quantity by m providing a light source unit at each light incident surface, while achieving the aforementioned effects.

To achieve the aforementioned object, the lighting element of the present invention is arranged so as to include a prismatic linear light guiding body, the linear light guiding body having a light incident surface to which light from a light source unit is incident and a light outgoing surface from which the incident light outgoes, wherein:

the light incident surface is provided on an end surface of the linear light guiding body, the end surface being at an end in a lengthwise direction;

the light outgoing surface is provided on a side surface of the linear light guiding body along the lengthwise direction;

a plurality of notches that reflect the incident light are arrayed on a surface of the linear light guiding body opposing the light outgoing surface in the lengthwise direction;

each notch is a V-shape groove formed with two flat surfaces;

the flat surfaces of the notches are provided at not less than two different angles with respect to the light outgoing surface.

In the foregoing arrangement, when light in the dot emitting state, for example, is incident to the light incident surface, it is possible to convert the light into the linearly emitting state by means of a plurality of notches arrayed along the lengthwise direction on a surface facing the light outgoing surface. Here, each of the plurality of notches is a V-shape groove composed of two flat surfaces, and the flat surfaces of the notches are provided at not less than two different angles with respect to the light outgoing surface. Therefore, it is possible to reflect the light from the same light source unit in different directions. This makes it possible to cause light emitted in the linearly emitting state by the lighting element to reach a peak value in a plurality of light outgoing directions.

Furthermore, considering the case where light incident surfaces are provided at the both ends of the linear light guiding body so that light is caused to enter the same from the both ends, when an angle that each flat surface forms with the light outgoing surface is uniform, the outgoing light reaches a peak value in directions symmetric with respect to the linear light guiding body.

On the other hand, in the foregoing arrangement, it is possible to cause the outgoing light to reach a peak value in directions asymmetric with respect to the linear light guiding body. In this case, it is possible to cause the outgoing light to reach a peak value in a certain set direction tilted with respect to a direction of the normal line of the light outgoing surface.

Therefore, by using the present lighting element, for instance, in order to irradiate a planar light guiding body that is formed asymmetric with respect to a light incident surface to prevent a moire fringe from occurring, it is possible to attain light in a planarly emitting state further uniformly, at higher utilization. Consequently, it is possible to provide an image display device providing bright display images with uniform luminance distribution.

The lighting element of the present invention is preferably further arranged so that (i) each of the notches is a V-shape groove formed with two flat surfaces, and (ii) an angle that each flat surface forms with respect to the light outgoing surface is not less than 30° and not more than 60°.

In the foregoing arrangement, by reflecting light incident to a flat surface that is tilted at an angle ranging from 30° to 60° with respect to the light outgoing surface, so as to convert the light in the linearly emitting state, it is possible to attain a linearly emitting state in which light reaches a peak value of the outgoing luminance in a direction at an angle ranging from 0° to 45° with respect to the normal direction of the light outgoing surface. Therefore, in the case where a planar light guiding body having cyclic structures tilted with respect to a light incident surface is irradiated by means of the present lighting element, it is possible to apply the present arrangement with respect to various tilt angles of the cyclic structures.

The lighting element of the present invention is preferably further arranged so that diffusing means is provided in the vicinity of the linear light guiding body.

In the foregoing arrangement, since the diffusing means is provided in the vicinity of the linear light guiding body, leaked light outgoing from outside the light outgoing surface formed on the linear light guiding body can be diffused and reflected by the diffusing means, whereby utilization of light can be further improved.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a) and 2(b) are views illustrating a display operation principle of the reflecting liquid crystal display element used in Embodiment 1 of the present invention.

FIG. 17(a) is a view illustrating an arrangement of a front light used in Embodiment 3 of the present invention, while FIG. 17(b) is a view illustrating a position of an LED array in relation to a light guiding body in Embodiment 3 of the present invention.

FIG. 25(a) is a view illustrating an arrangement of a front light used in Embodiment 4 of the present invention, while FIG. 25(b) is a view illustrating a position of an LED array in relation to a light guiding body in Embodiment 4 of the present invention.

FIG. 26(a) is a view illustrating another arrangement of a front light used in Embodiment 4 of the present invention, while FIG. 26(b) is a view illustrating another position of an LED array in relation to a light guiding body in Embodiment 4 of the present invention.

FIGS. 50(a) through 50(d) are concept views illustrating relationship between a unit width of a linear light guiding body and light distribution across a light outgoing surface.

FIGS. 60(*a*) and 60(*b*) are cross-sectional views illustrating in detail an arrangement of a reflecting liquid crystal display used in Embodiments.

THE BEST MODE TO IMPLEMENT THE INVENTION

The following will describe the best mode to implement the present invention with reference to the accompanying drawings.

Embodiment 1

Figure 1:
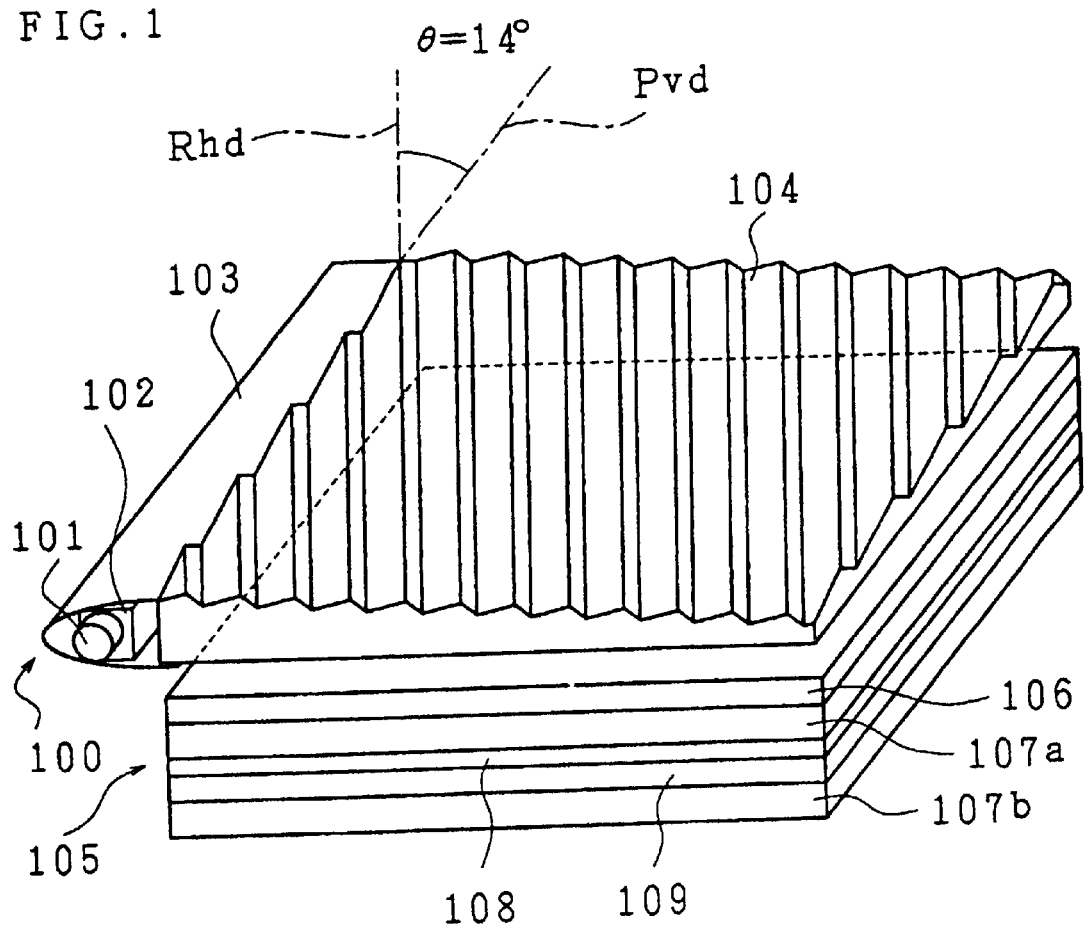
FIG. 1 is a view illustrating an arrangement of a reflecting liquid crystal display including a front light and a reflecting liquid crystal display element used in Embodiment 1 of the present invention.

FIG. 1 is a view showing an arrangement of a reflecting liquid crystal display composed of a lighting system (lighting means, hereinafter, referred to as front light) 100, and a reflecting liquid crystal display element (image display element) 105.

As shown in the drawing, the reflecting liquid crystal display comprises the front light 100 and reflecting liquid crystal display element 105, and the former includes a dot light emitting source (light source unit) 101, a linear light guiding body (lighting element) 102, a diffusing and reflecting sheet (diffusing means) 103, and a light guiding body (planar light guiding body, plane light guiding body) 104, while the latter includes a polarizing plate 106, a liquid crystal layer 108 sandwiched by glass substrates 107*a* and 107*b*, and a reflecting plate 109.

The dot light emitting source 101 is provided at an end portion of the linear light guiding body 102, and a dot of light emitted from the dot light emitting source 101 goes into the linear light guiding body 102, whereupon it is converted into light in the linearly emitting state. The linear light guiding body 102 is provided at one side surface of the light guiding body 104, and light converted to light in the linearly emitting state by the linear light guiding body 102 further goes into the other light guiding body 104, whereupon it is converted into light in the planarly emitting state.

Also, the diffusing and reflecting sheet (for example, a silver reflecting sheet) 103 is provided to surround the linear light guiding body 102 (other than the side surface at the light guiding body 104 side), so that light utilization is improved by reflecting and thereby returning light coming from the linear light guiding body 102 and leaked to outside of the light guiding body 104 to the linear light guiding body 102.

The glass substrate (counter glass substrate) 107*a* is provided with a color filter, a counter electrode, etc. (not shown). The glass substrate (TFT glass substrate) 107*b* is provided with thin film transistor (TFT) elements, pixel electrodes, etc. (not shown). Also, the liquid crystal layer 108 and reflecting plate 109 are sandwiched by the glass substrates 107*a* and 107*b*. These components are layered sequentially in a vertical direction from the light guiding body 104 side in the order of the polarizing plate 106, glass substrate 107*a*, liquid crystal layer 108, reflecting plate 109, and glass substrate 107*b*.

FIGS. 2(*a*) and 2(*b*) are views showing an operating principle of the reflecting liquid crystal display element of the present embodiment.

In the drawings, an alternate long and short dash arrow indicates a polarizing direction of light in each layer. Also, a straight line indicates linearly polarized light and an ellipse indicates elliptically polarized light in each layer.

As shown in the drawings, the polarizing plate 106 is composed of a polarizing layer 106*a* and a λ/4 plate 106*b*. While incident lighting light 50 passes through the polarizing layer 106*a* and λ/4 plate 106*b* to reach the reflecting plate 109 to be reflected, the polarization state of the lighting light 50 is modulated by the liquid crystal layer 108, whereby a quantity of light reflected from the reflecting liquid crystal element 105 is controlled so that an image is displayed.

More specifically, the transmitting axis or absorbing axis of the polarizing layer 106*a* is provided such that an angle of 45° is given with respect to the slow axis or fast axis of the λ/4 plate 106*b*. Linearly polarized light out of the lighting light 50 that has passed through the polarizing layer 106*a* is converted to circularly polarized light by the λ/4 plate 106*b*, and reaches the reflecting liquid crystal display element 105. Then, in case that the liquid crystal layer 108 of the reflecting liquid crystal display element 105 does not modulate the circularly polarized light, the direction of rotation of the circularly polarized light is inverted when reflected by the reflecting plate 109. Then, the circularly polarized light passes through the λ/4 plate 106*b* again and is converted to linearly polarized light (reflected light 51) that intersects with the transmitting axis of the polarizing layer 106*a* at right angles and absorbed, whereby black is displayed.

On the other hand, in case that the liquid crystal layer 108 in the reflecting liquid crystal display element 105 modulates the incident circularly polarized light such that it goes out intact, the circularly polarized light passes through the λ/4 plate 106*b* and goes out as linearly polarized light (reflected light 51) that matches with the transmitting axis of the polarizing layer 106*a*, whereby white is displayed.

The directions of the transmitting axis of the transmitting layer 106*a* and the slow axis of the λ/4 plate 106*b* are determined in consideration of the liquid crystal materials, orientation direction, and characteristics of the angle of visibility, etc.

In the present embodiment, in order to display a color image, each pixel (picture element) is provided with color filters of three primary colors including red (R), green (G), and blue (B), so that passing light is colored. A variety of alignment patterns of the RGB pixels are known, and typical examples are the delta alignment and stripe alignment shown in FIGS. 3(*a*) and 3(*b*), respectively, in which pixels are formed repetitively both in the horizontal and vertical directions. The number and size of the pixels also vary. The reflecting liquid crystal display element 105 (FIG. 1) used in the present embodiment is a 2.5-in. type which includes sixty-one thousand pixels in total (the number of pixels in a horizontal line multiplied by the number of pixels in a vertical line) with the delta alignment, and the pixel pitches are 180 μm and 169 μm in the horizontal direction Ph and vertical direction Pv, respectively.

Figure 3:
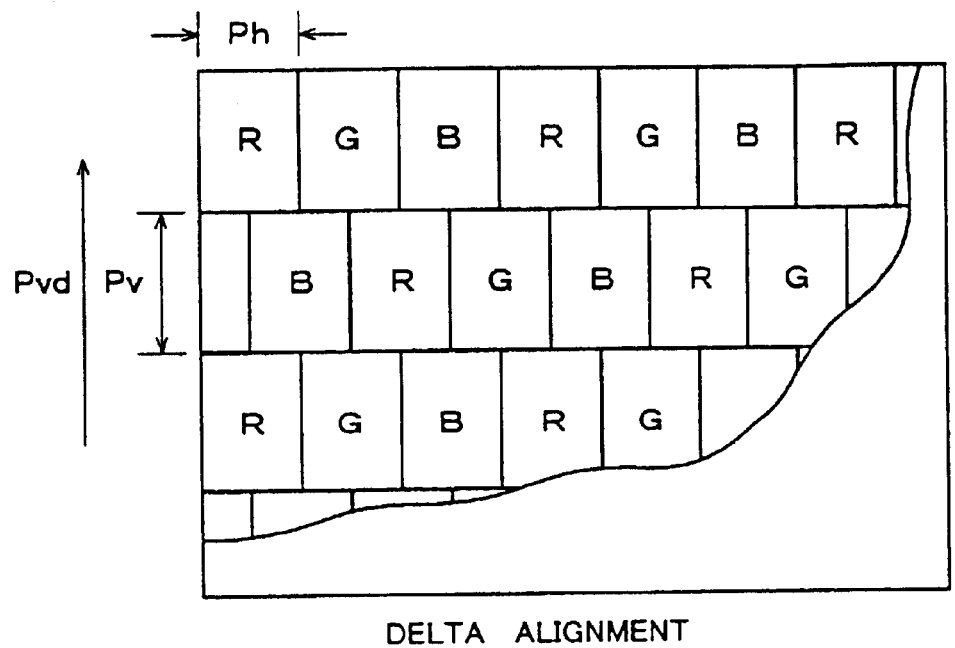
FIGS. 3(a) and 3(b) are views illustrating pixel alignment patterns of the reflecting liquid crystal display element used in Embodiment 1 of the present invention.
Figure 3:
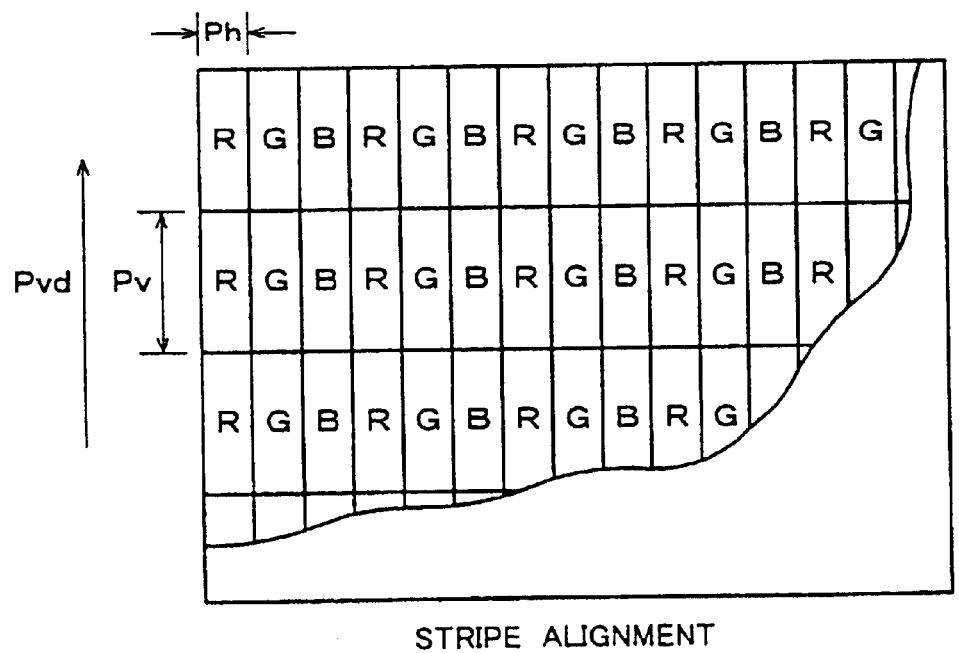

The alignment pattern shown in FIG. 3(*a*) is the delta alignment, in which RGB pixels are repetitively aligned in lines in the landscape (horizontal) direction of the display screen. Pixels of the same color adjacent in the portrait direction (vertical direction, the pixel's repeating direction, the direction Pvd indicated by an arrow in FIGS. 3(a) and 3(b)) is shifted in the landscape direction by 1.5 pixel with respect to each other. The alignment pattern shown in FIG. 3(b) is the stripe alignment, and RGB pixels are repetitively aligned in lines in the landscape direction. The pixels of the same color are aligned in stripes in the portrait direction.

FIGS. 4(a) and 4(b) are views showing an arrangement of the front light 100 used in the present embodiment.

As shown in the drawings, in the present embodiment, a white LED (Light Emitting Diode) (commercially known as NSCW100 of Nichia Corporation) is used as the dot light emitting source 101, and provided at a light incident surface 102a (FIG. 5(a)) of the linear light conducting body 102, which will be described below. The product #4596 of Minnesota Mining and Manufacturing Co., (3M) is provided as the diffusing and reflecting sheet 103 to surround the linear light guiding body 102. This arrangement makes it possible to convert light emitted from the dot light emitting source 101 to light in the linearly emitting state.

Next, the following will describe the light guiding body 104 of Embodiment 1 with reference to FIGS. 4(a) and 4(b).

As shown in the drawings, the light guiding body 104 of Embodiment 1 converts incident light in the linearly emitting state to light in the planarly emitting state to light the foregoing reflecting liquid crystal element 105 (FIG. 1).

The light guiding body 104 is provided in such a manner that its light incident surface 104a opposes a light outgoing surface 102b (FIG. 5(a)) of the linear light guiding body 102 which will be described below.

In the present embodiment, an injection molded article made of polymethyl methacrylate is used as the light guiding body 104, which includes the light incident surface 104a, a light outgoing surface 104b substantially perpendicular to the light incident surface 104a, and a counter surface 104c opposing the light outgoing surface 104b. The counter surface 104c is provided with cyclic structures 104f, each of which is a prism having a propagating portion 104d and a reflecting portion 104e at a pitch Pd. Here, the thicknesses of the light incident surface 104a and a surface 104g opposing the same are set to tin=1.2 mm and tout=0.8 mm, respectively.

Hereinafter, the direction along a line of intersection between the surface forming the propagating portion 104d and the surface forming reflecting portion 104e in the cyclic structure 104f is referred to as a cyclic direction Rhd.

In the present embodiment, transmittance of the light guiding body 104 is improved by applying an anti-reflection treatment (not shown) to the light outgoing surface 104b of the light guiding body 104. More specifically, the anti-reflection treatment is applied in the following manner. That is, an anti-reflection film is made by alternately forming thin films having a thickness of approximately 0.1 μm, such as $MgF_2$ and $SiO_2$ films, which reduces reflection energy by interference with these thin films, and the anti-reflection film is vapor deposited directly on the light outgoing surface 104b. Consequently, surface reflection can be reduced from 4% to 1% or less, thereby improving transmittance of the light guiding body 104 and making bright display possible.

The specific shape of each cyclic structures 104f is designed in such a manner that light emitted from the dot light emitting source 101 is converted to light in the linearly emitting state by the linear light conducting body 102, and then travels in the light guiding body 104 so as to effectively reach the side of the reflecting liquid crystal display element 105 (FIG. 1). Let Pd be a cyclic pitch of the cyclic structures 104f, P1 be a pitch of the propagating portion 104d, P2 be a pitch of the reflecting portion 104e, and h be a height of the prism formed by the propagating portion 104d and reflecting portion 104e. Each pitch (Pd, P1, P2) is perpendicular to the direction along the line of intersection between the surface forming the propagating portion 104d and the surface forming the reflecting portion 104e, and parallel to the light outgoing surface 104b. Also, the height h of the prism is perpendicular to the light outgoing surface 104b.

It should be noted that the cyclic structures 104f are designed in such a manner that the display quality will not be degraded by a moire fringe caused at the occurrence of the interference with the pixel pattern in the reflecting liquid crystal display element 105 (hereinafter, see FIG. 1 and FIGS. 3(a) and 3(b) as necessity arises). In the present embodiment, each cyclic structure 104f is given with 390 μm as the cyclic pitch Pd, and shaped in such a manner so as to form an angle of 14° with respect to the vertical direction (pixels' repeating direction) Pvd of the pixel pattern in the reflecting liquid crystal display element 105.

It should be appreciated that prevention of a moire fringe is not limited to the method explained herein. For example, as shown in Table 1 below, an angle θ for preventing the occurrence of a moire fringe may be determined with respect to the pitch Pd of the cyclic structures 104f formed on the surface of the light guiding body 104 (a sum of the pitch P1 of the propagating portion 104d and the pitch P2 of the reflecting portion 104e) and the pitch P1c (herein, a direction along which the pitch PV in the vertical direction of the pixels [the vertical direction Pvd in the pixel pattern]) in the pixels' repeating direction formed on the reflecting liquid crystal display element 105.

TABLE 1

| | PIXEL PITCH P1c→ | | | | |
| | DELTA ALIGNMENT | | STRIPE ALIGNMENT | | |
| ↓LIGHT GUIDING PITCH Pd | 2.0-in. 0.139 (mm) | 2.5-in. 0.169 (mm) | 3.9-in. 0.240 (mm) | 8.4-in. 0.270 (mm) | 11.3-in. 0.288 (mm) |
|---|---|---|---|---|---|
| 0.160 (mm) MOIRE PREVENTION ANGLE (°) | — | 75–80 | 12–30 | 15–65 | 17–65 |
| 0.200 (mm) MOIRE PREVENTION ANGLE (°) | 55–65 | — | — | 24–35 | 10–30 |
| 0.240 (mm) MOIRE PREVENTION ANGLE (°) | — | — | 23–75 | — | — |
| 0.280 (mm) MOIRE PREVENTION ANGLE (°) | — | — | 30–50 | 27–50 | — |
| 0.300 (mm) MOIRE PREVENTION ANGLE (°) | 55–75 | — | 27–60 | 20–55 | 23–55 |
| 0.390 (mm) MOIRE PREVENTION ANGLE (°) | 10–25 | 10–20 | 20–55 | 15–35 | 20–55 |
| 0.500 (mm) MOIRE PREVENTION ANGLE (°) | 10–15 | — | 15–75 | 15–75 | 17–75 |

— indicates the occurrence of a moire fringe irrespective of the angles

Table 1 reveals that a range of the angle θ that prevents the occurrence of a moire fringe varies depending on the pixel alignment formed on the reflecting liquid crystal display element 105, the pixel pitch P1c, and light guiding pitch Pd, but by determining the pitch P1c in the reflecting liquid crystal display element 105, an angle of the cyclic structure 104f formed on the surface of the light guiding body 104 with respect to the pitch Pd can be determined.

For example, when a 2.0-in. reflecting liquid crystal display element employing the delta alignment (the number of pixels in the horizontal line×the number of pixels in the vertical line=280×220), or a 2.5-in. reflecting liquid crystal display element employing the delta alignment (the number of pixels in the horizontal line×the number of pixels in the vertical line=280×220) is used as the reflecting liquid crystal display element 105, a moire fringe can be prevented by setting the angle in a range from 10° to 25° and in a range from 55° to 80°.

Also, when a 3.9-in. reflecting liquid crystal display element employing the stripe alignment (the number of pixels in the horizontal line×the number of pixels in the vertical line=320×240), a 8.4-in. reflecting liquid crystal display element employing the stripe alignment (the number of pixels in the horizontal line×the number of pixels in the vertical line=640×480), or a 11.3-in. reflecting liquid crystal display element employing the stripe alignment (the number of pixels in the horizontal line×the number of pixels in the vertical line=600×800) is used as the reflecting liquid crystal display element 105, a moire fringe can be prevented by setting the angle in a range from 15° to 75°. It should be appreciated that the angle $\theta$ is determined by considering an assembly accuracy when the reflecting liquid crystal display device is assembled.

Herein, the linear light guiding body 102 and light guiding body 104 are provided in such a manner that their respective light outgoing surface 102b and light incident surface 104a are parallel to the pixels' repeating direction Pvd on the reflecting liquid crystal display element 105, and that the cyclic direction Rhd of the cyclic structures 104f forms the moire preventing angle with respect to the pixels' repeating direction Pvd.

However, the arrangement is not limited to the foregoing. The linear light guiding body 102 and light guiding body 104 may be provided in such a manner that their respective light outgoing surface 102b and light incident surface 104a are parallel to the cyclic direction Rhd of the cyclic structures 104f, and that the pixels' repeating direction Pvd may form the moire preventing angle with respect to the cyclic direction Rhd. In short, only the moire preventing angle has to be formed between the cyclic direction Rhd and pixels' repeating direction Pvd.

Also, the material of the light guiding body 104 is not limited to the material used herein. The light guiding body 104 can be manufactured by mold processing, such as injection mold, by using acrylic resin represented by polymethyl methacrylate, transparent resin represented by polycarbonate resin and epoxy resin, and glass as necessary.

In the present embodiment, each cyclic structure 104f formed on the counter surface 104c of the light guiding body 104 was a prism (triangular). However, the cyclic structure 104f can be of a concave or convex structure having pits and projections, such as trapezoidal, lenticular, and spherical shapes.

Figure 5:
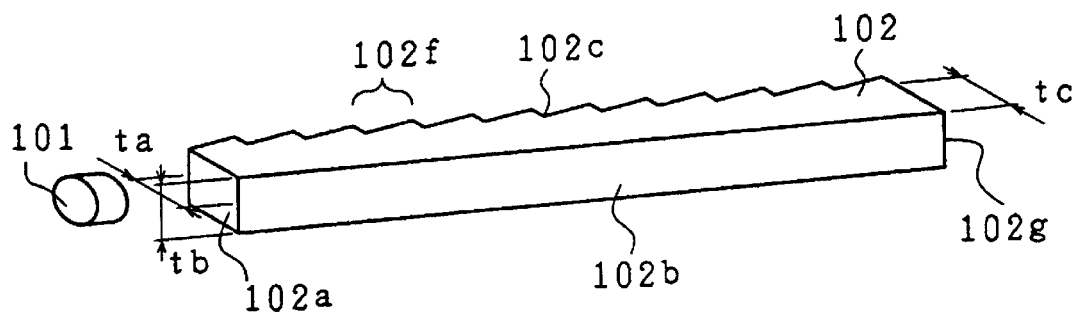
FIGS. 5(a) and 5(b) are views illustrating a shape and a position of a linear light guiding body used in Embodiment 1 of the present invention.
Figure 5:
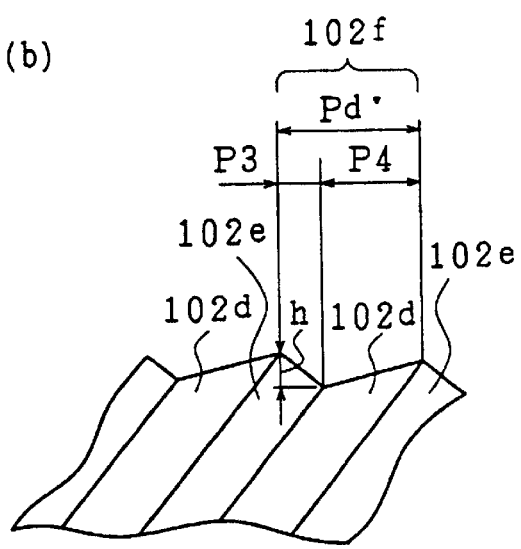

FIGS. 5(*a*) and 5(*b*) are views showing the shape and the position of the linear light guiding body 102 used in the present embodiment.

Figure 4:
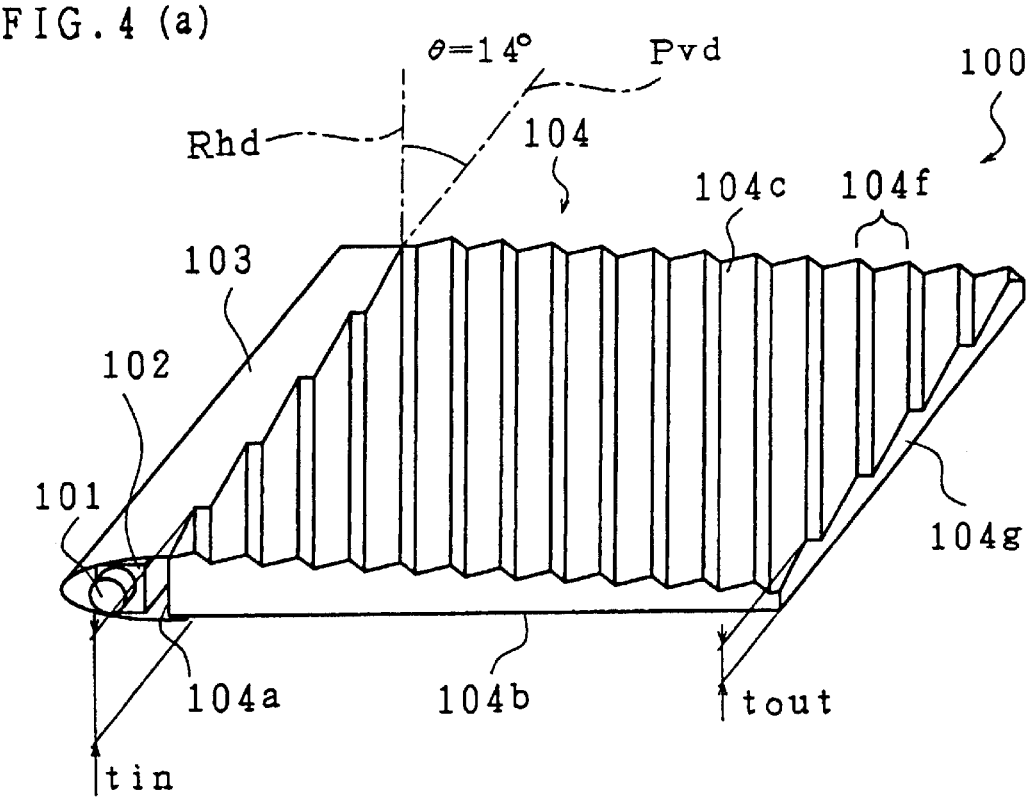
FIGS. 4(a) and 4(b) are views illustrating an arrangement of the front light used in Embodiment 1 of the present invention.
Figure 4:
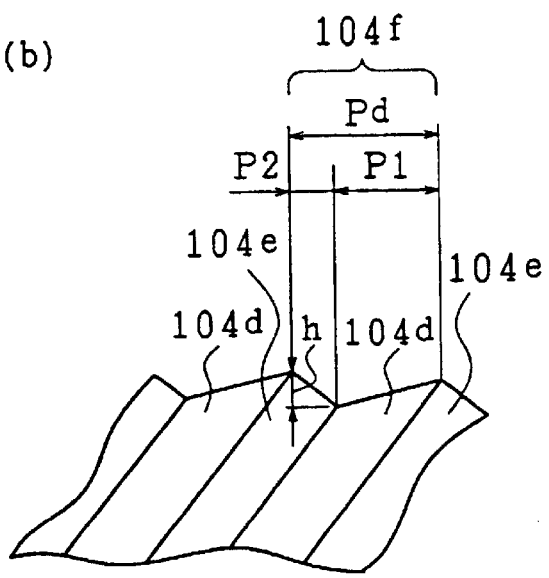

As shown in the drawings, like the light guiding body 104 (FIG. 4(*a*)), an injection molded article made of polymethyl methacrylate is used as the linear light guiding body 102 of the present embodiment. The dimension of the light incident surface 102a is as follows: ta=2.0 mm (ta: thickness in the vertical direction with respect to the light outgoing surface 102b), and tb=1.2 mm (tb: thickness in the direction along the light outgoing surface 102b). The dimension of the counter surface 102g is as follows: tc=1.0 mm (tc: thickness in the vertical direction with respect to the light outgoing surface 102b). Also, the dot light emitting source 101 is provided at the light incident surface 102a.

Cyclic structures 102f are formed on a surface 102c opposing the light outgoing surface 102b of the linear light guiding body 102. The cyclic structures 102f are formed repetitively in a direction substantially in parallel to the light incident surface 102a with a pitch Pd' of 500 $\mu$m. In addition, the shape of each cyclic structure 102f is designed in such a manner that light emitted from the dot light emitting source 101 goes into the light incident surface 102a of the linear light guiding body 102 and goes out therefrom as light in the linearly emitting state effectively. To be more specific, of each 500-$\mu$m long cyclic structure, 490 $\mu$m is given as a pitch P4 of a propagating portion 102d, 10 $\mu$m is given as a pitch P3 of a reflecting portion 102e, and 10 $\mu$m is given as the height of the prism formed by the propagating portion 102d and reflecting portion 102e.

Figure 6:
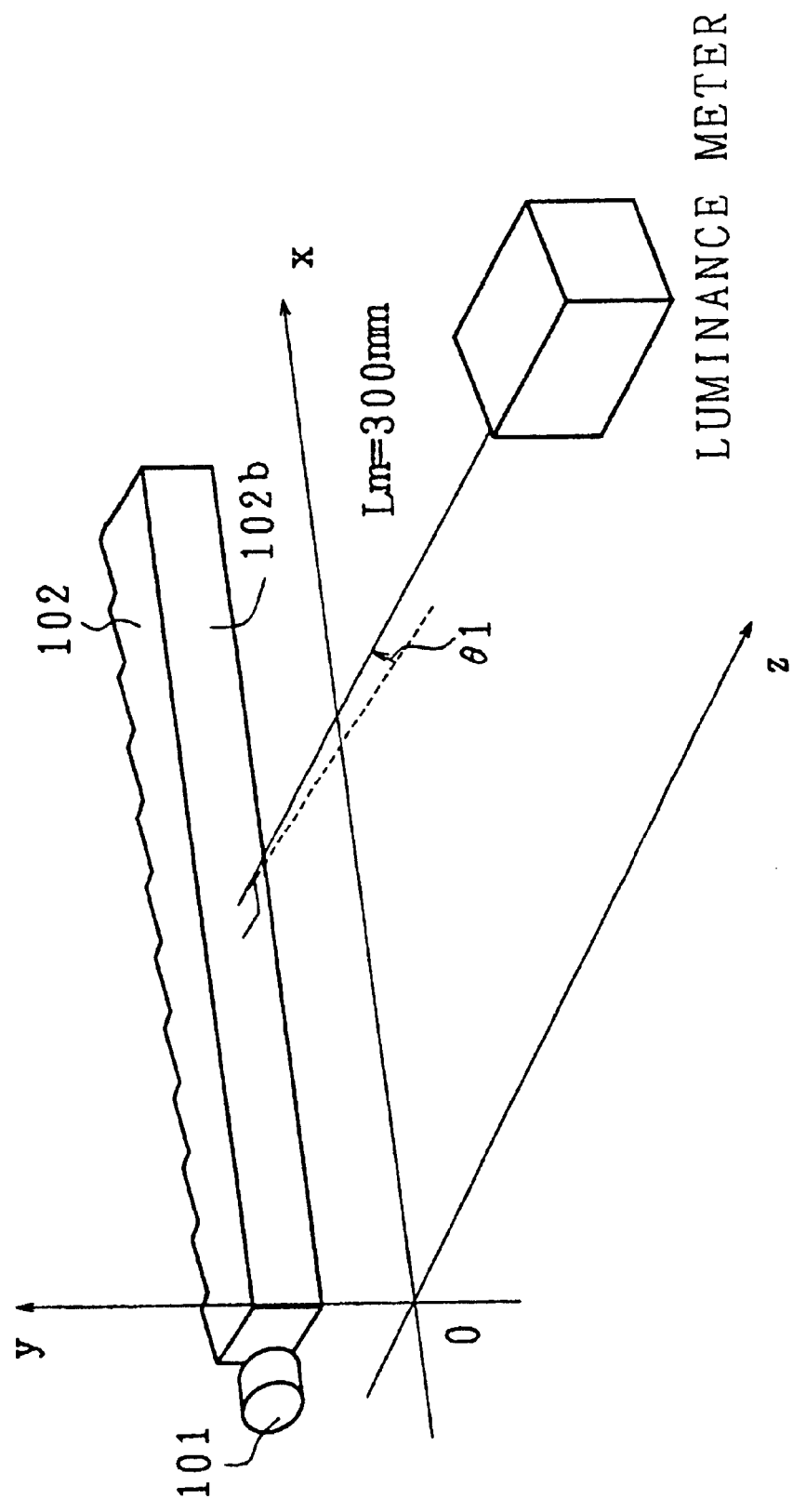
FIG. 6 is a view illustrating measurement of a light emitting state of the linear light guiding body used in Embodiment 1 of the present invention.

Luminance distribution across the linear light guiding body 102 is measured by a measuring device shown in FIG. 6. FIG. 6 is a perspective view showing the measuring device for measuring the luminance distribution across the linear light guiding body 102.

The measuring device is arranged in the following manner. A luminance meter (commercially known as BM5A of Topcon Corporation having a light receiving angle of 0.2°) is spaced apart by Lm=300 mm (measurement distance) from the light outgoing surface 102b of the fixed linear light guiding body 102, and the optical axis of the luminance meter is arranged to constantly intersect with the light outgoing surface 102b. The measuring device is arranged in such a manner that the luminance meter can be moved along the lengthwise direction of the linear light guiding body 102 (line direction, indicated by a capital letter x in FIG. 6), and that an angle (light outgoing angle) $\theta 1$ formed by the optical axis direction and the normal direction of the light outgoing surface 102b can be varied with respect to the intersection of the optical axis of the luminance meter and the light outgoing surface 102b.

When the linear light guiding body 102 and light guiding body 104 are assembled (FIG. 4(*a*)), the angle 61 is positive if measured in the counterclockwise direction (direction indicated by an arrow in FIG. 6) with respect to the counter surface 104c of the light guiding body 104.

Figure 7:
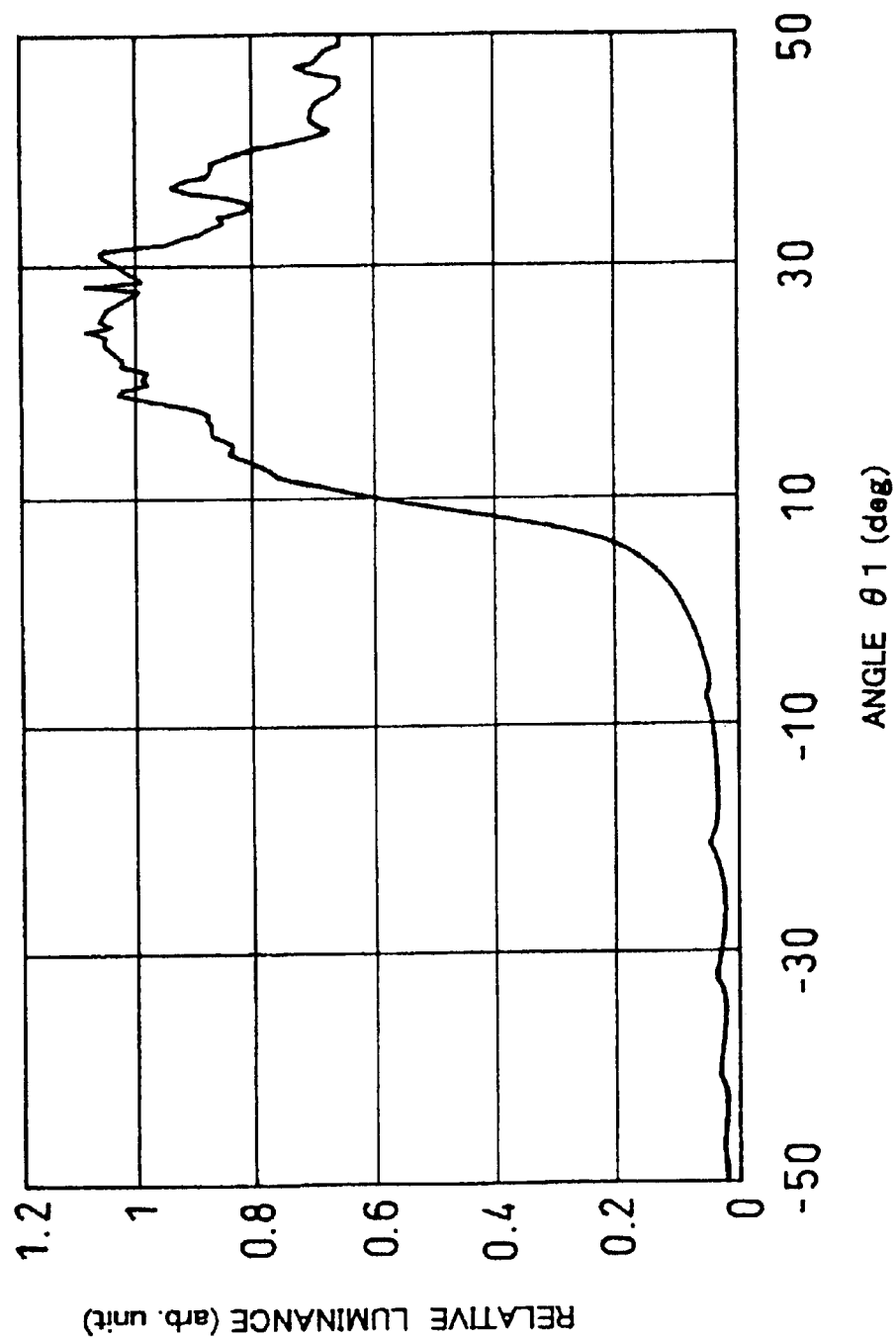
FIG. 7 is a view illustrating a light emitting state depending on an angle of outgoing light at the center of a light outgoing surface of the linear light guiding body used in Embodiment 1 of the present invention.

FIG. 7 shows an angle distribution of the outgoing light at the center of the light outgoing surface 102b of the linear light guiding body 102 designed as described above.

The angle distribution was measured by varying the angle $\theta 1$ in the measuring device of FIG. 6.

As shown in FIG. 7, outgoing light from the linear light guiding body 102 reaches a peak value (maximal value) when the angle $\theta 1$ is approximately 20° (first outgoing direction), and intersects at substantially right angles with the angle $\theta=14°$ given to each cyclic structure 104f (FIG. 4(*a*)) formed on the light guiding body 104 (refractive index n=1.49).

This is because when there is an air layer (refractive index n0=1) between the light outgoing surface 102b of the linear light guiding body 102 (FIG. 5(*a*)) and the light incident surface 104a of the light guiding body 104 (FIG. 4(*a*)), the outgoing angle $\theta 1$ of the outgoing light from the linear light guiding body 102 and the angle $\theta 2$ formed between the light traveling direction within the light guiding body 104 and the normal direction of the light incident surface 104a thereof has a relation expressed by Equation 1:

$$n0 \times \sin \theta1 = n \times \sin \theta2 \qquad \text{Equation 1.}$$

Hence, given θ1=20°, then θ2=13.3°, and the light traveling direction within the light guiding body 104 intersects substantially at right angles with the angle θ=14° given to each cyclic structure 104f formed on the light guiding body 104.

In other words, it is preferable to set the direction at which the outgoing light from the linear light guiding body 102 reaches the outgoing luminance peak value to the θ1 direction (first outgoing direction) that satisfies:

$$\theta1 = \sin^{-1}(n \times \sin) \qquad \text{Equation 2.}$$

When set in this manner, light can effectively go into the cyclic structures 104f formed on the light guiding body 104.

As has been discussed, by arranging the outgoing light in the above manner, utilization of light that travels through and reflects in the light guiding body 104 can be improved, thereby making it possible to obtain a bright front light system.

The reason why is as follows. That is, it is set such that light travels forward within the light guiding body 104 (FIG. 4(a)) in a direction that intersects substantially at right angles with respect to the angle-e given to each cyclic structure 104f formed on the light guiding body 104, by adjusting the reflecting portion 104e of the light guiding body 104, light can go out perpendicularly from the light outgoing surface 104b of the light guiding body 104, that is, it becomes possible to light the reflecting liquid crystal display element 105 (FIG. 1) perpendicularly.

It should be appreciated that the first outgoing direction is not limited to the θ1 direction in Equation (2), and it can be any direction closer to the θ1 direction in Equation 2 than the direction perpendicular to the light incident surface 104a of the light guiding body 104.

Figure 8:
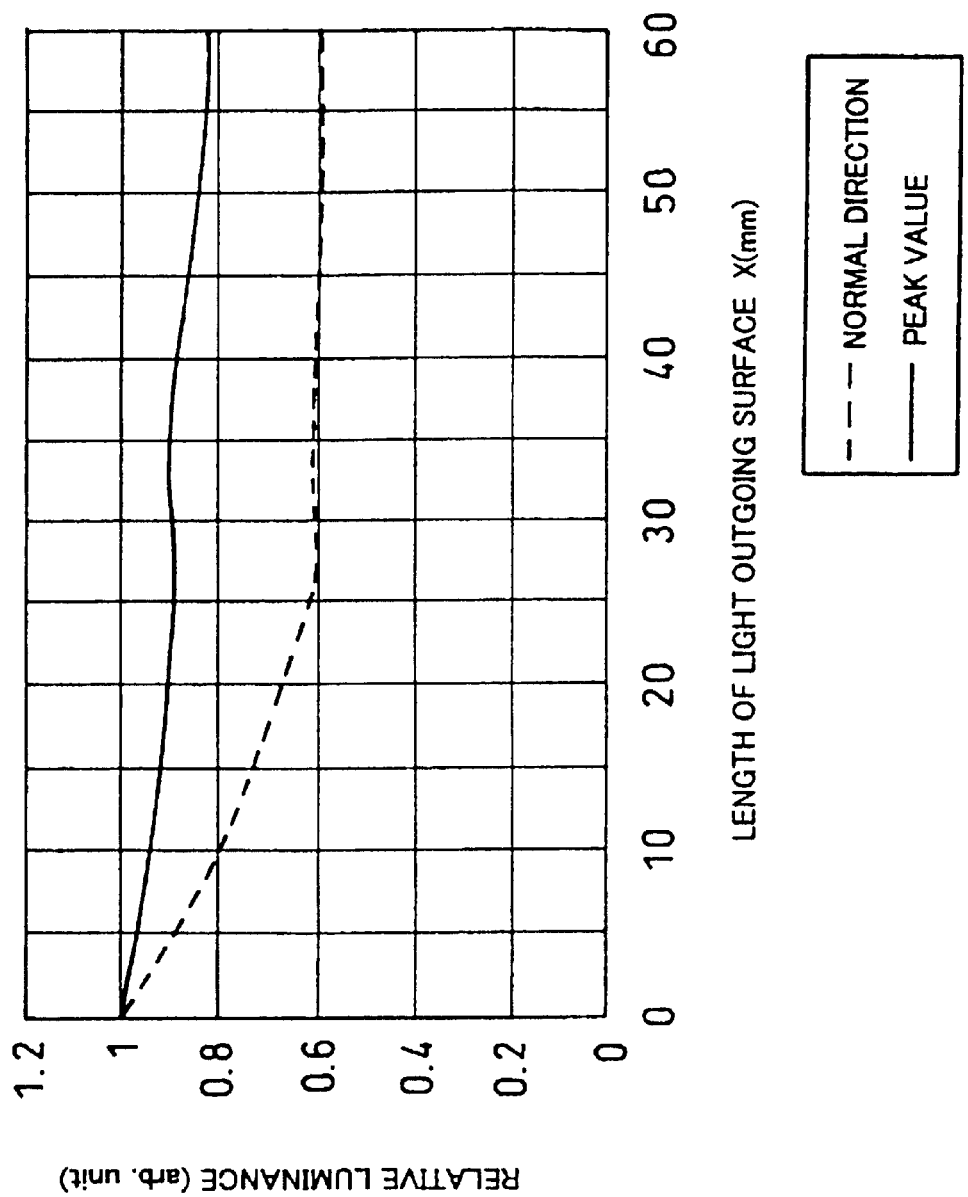
FIG. 8 is a view illustrating a light emitting state of the linear light guiding body of the front light used in Embodiment 1 of the present invention.

FIG. 8 is a view showing the linearly emitting state obtained by the foregoing structure. In the drawing, the horizontal axis indicates the lengthwise direction of the light outgoing surface 102b of the linear light guiding body 102 (FIG. 5(a)), and the vertical axis indicates the luminance (relative value) of outgoing light in the normal direction of the light outgoing surface 102b and at the peak value. In the present embodiment, the luminance distribution across the light outgoing surface 102b realized a satisfactory linearly emitting state of (max/min)=1.7 or below in the normal and peak value directions. The luminance distribution was measured by employing the luminance meter (commercially known as BM-5A of Topcon Corporation) as shown in FIG. 6. In addition, the peak value of the outgoing light is found by measuring luminance in the range of the angle θ1 with respect to the normal direction of the light outgoing surface 102b of the linear light guiding body 102.

The data in the normal direction shown in FIG. 8 is the luminance distribution by scanning the luminance meter in the X-axis direction while keeping the optical axis of the luminance meter perpendicular to the light outgoing surface 102b of the linear light guiding body 102 (that is, when θ1=0°) (FIG. 5(a)) On the other hand, the data in the peak value direction is the luminance distribution by scanning the luminance meter in the X-axis direction (lengthwise direction of the linear light guiding body 102, line direction) while keeping the optical axis of the luminance meter in the peak value direction of the outgoing light from the linear light guiding body 102 (that is, when θ1=20°). Hereinafter, the luminance distribution is also defined by a ratio of the maximum value and minimum value (max/min) of luminance within the measuring range.

An affect given to the actual image display by the outgoing luminance distribution of outgoing light from the linear light guiding body 102 was analyzed. Although the arrangement of the device is substantially the same as that shown in FIG. 1, the following will explain in detail the arrangement with reference to FIGS. 60(a) and 60(b), which are cross sections each depicting an arrangement of the reflecting liquid crystal display of the present embodiment.

Although it was partly omitted in the previous explanation, as shown in FIGS. 60(a) and 60(b), the glass substrate 107b is provided with a reflecting electrode serving as the reflecting plate 109, and the glass substrate 107a is provided with a transparent conducting film (for example, ITO film) 110 serving as a counter electrode. Thus, by applying a voltage across the reflecting plate 109 and transparent conducting film 110 for each pixel, the polarization state is modulated as described above by the liquid crystal layer 108. The display mode is not limited to the polarization mode, and it can be also the Guest-Host mode or the like.

When an image is displayed actually, outgoing light from the light guiding body 104 in the planarly emitting state is diffused by each layer (optical member) as it travels through the same until it reaches the reflecting plate 109, thereby realizing more uniform luminance distribution. In addition, in order to attain the further uniform luminance distribution, it is preferable to provide the diffusing layer. In case of FIG. 60(a), a diffusing layer 111a is provided adjacently to the polarizing plate 106, and in case of FIG. 60(b), a diffusing layer 111b is provided to the reflecting plate 109 at the liquid crystal layer 108 side. These diffusing layers 111a and 111b are provided to attain a further uniform luminance distribution by diffusing light from the light guiding body 104.

The reflecting liquid crystal display is formed by the foregoing reflecting liquid crystal display element 105 and front light 100, and an image was actually displayed. The one shown in FIG. 4(a) is used herein as the front light 100, and the same reference numerals are given to the like components in FIGS. 60(a) and 60(b), and the explanation of these components is not repeated for ease of explanation.

In addition, the linear light guiding body 102 is as shown in FIG. 5(a), which was used as the linear light guiding body 102 having each luminance distribution as shown in Table 2 by changing a luminance distribution (peak value direction [θ1=+20° direction]).

The display conditions were evaluated in four levels including fairly good (◎), good (○), acceptable in practical use (Δ), poor (irregularity is noticeable) (x) by viewing the actual image display, and the result is set forth in Table 2 below.

TABLE 2

| LUMINANCE DISTRIBUTION (max/min) | 1.2 | 1.7 | 2 | 3 | 3.6 |
|---|---|---|---|---|---|
| DISPLAY STATE | ◎ | ◎ | ◎ | ○ | x |

Table 2 reveals that the luminance distribution of the linear light guiding body 102 is preferably 3 or less, and more preferably 2 or less.

Figure 40:
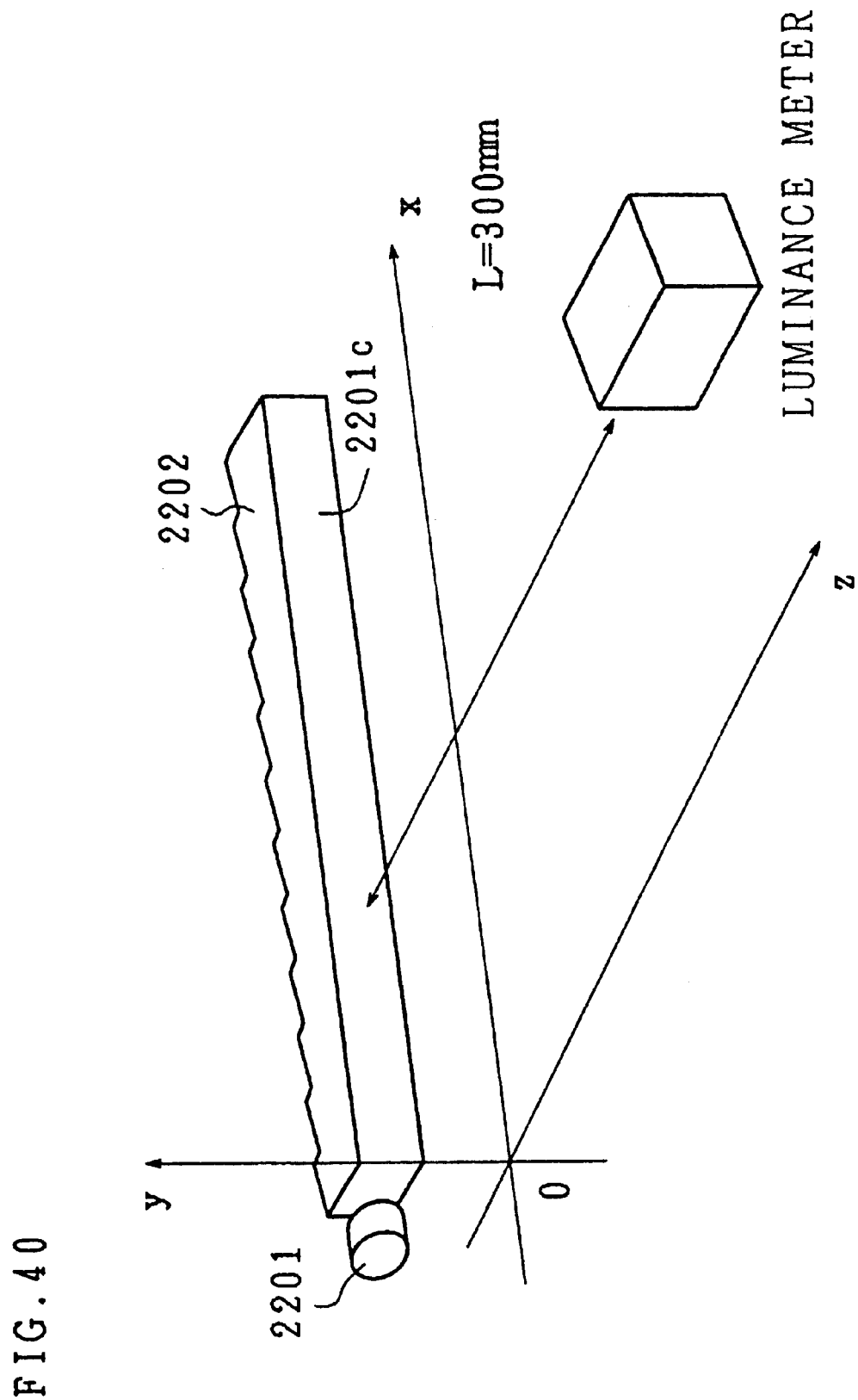
FIG. 40 is a view illustrating measurement of a light emitting state of light from a light guiding body.

Further, an effect of the outgoing luminance distribution of the outgoing light from a typical linear light guiding body 2202 as shown in FIG. 40 was checked. The linear light guiding body 2202 converts light emitted from a light source 2201 to light in the linearly emitting state, and outputs the same from a light outgoing surface 2201c. The outgoing light from the linear light guiding body 2202 reaches the outgoing luminance peak value in the normal direction of the light outgoing surface 2201c. FIG. 40 shows an arrangement for measuring a luminance distribution of the linear light guiding body 2202, and is identical with the arrangement shown in FIG. 6.

Figure 41:
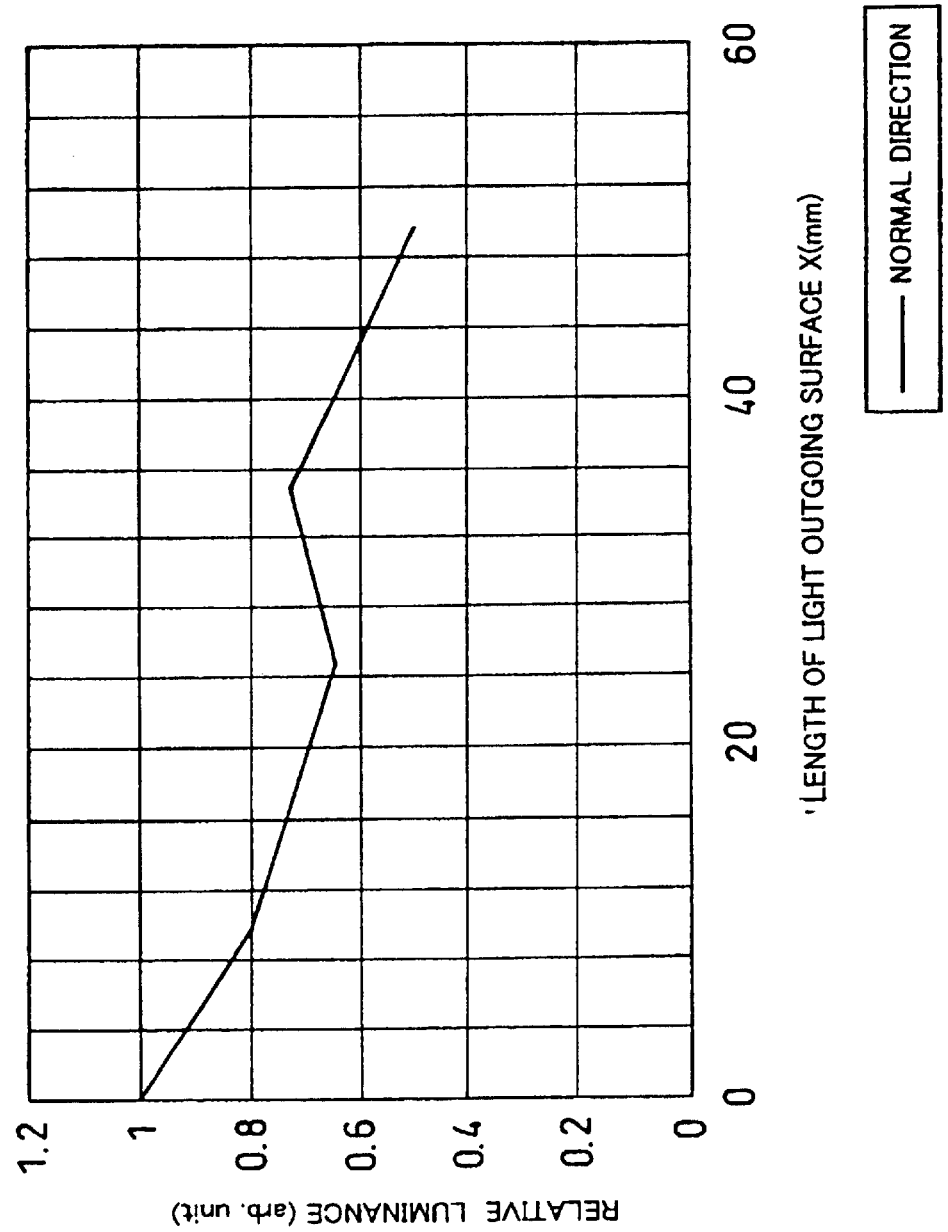
FIG. 41 is a view illustrating a light emitting state of light that is emitted from a linear light guiding body of a front light.
Figure 42:
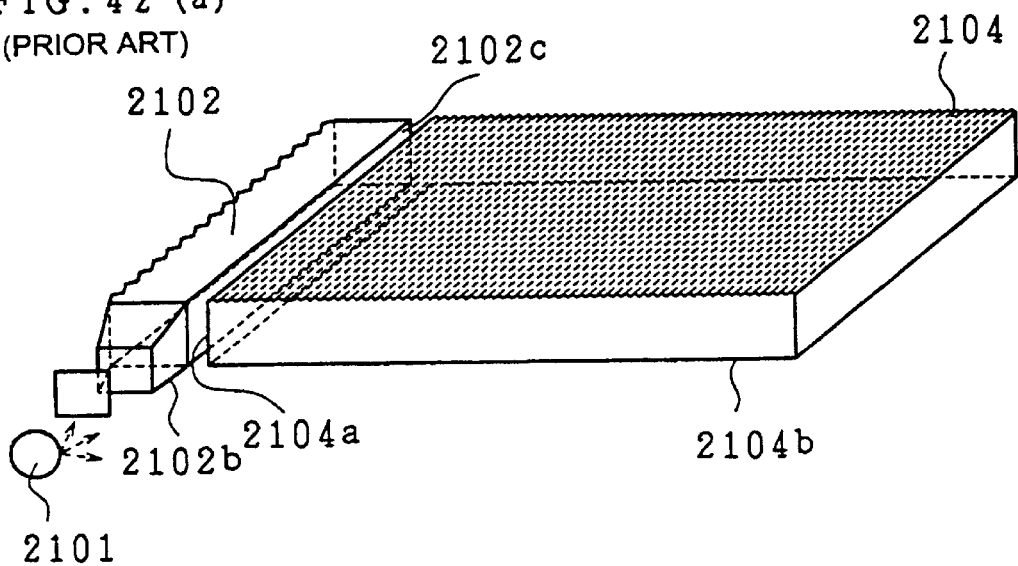
FIG. 42(a) is a view illustrating a lighting system of prior art.
FIG. 42(b) is a view illustrating occurrence of shadows in the lighting system of prior art.
Figure 42:
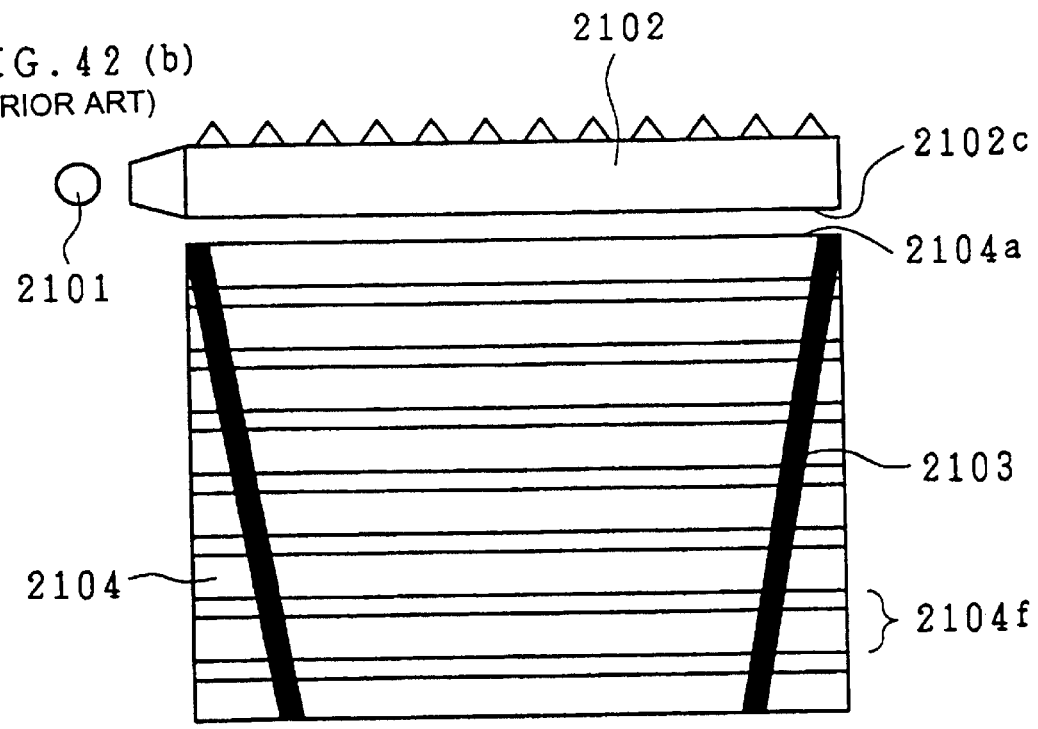

The luminance distribution of the linear light guiding body 2202 is shown in FIG. 41. An affect of the luminance distribution was measured by using the linear light guiding body 2202 in the same manner as above. Here, a light guiding body having a moire preventing angle θ=0° was used as the light guiding body corresponding to the light guiding body 104 (FIG. 4(a)) by considering the direction of the outgoing luminance peak value of the linear light guiding body 2202. Also, the emitting state was evaluated in four levels including fairly good (⊚), good (o), acceptable in practical use (Δ), poor (irregularity is noticeable) (x) by viewing the actual image display by directly observing light in the planarly emitting state from the light guiding body without using the reflecting liquid crystal display element 105 (FIG. 1), and the result is set forth in Table 3 below.

TABLE 3

| LUMINANCE DISTRIBUTION (max/min) | 1.5–1.7 | 2 | 3 | 3.4 | 4 |
|---|---|---|---|---|---|
| EMITTING STATE | | ⊚ | o | Δ | x | x |

Table 3 reveals that the luminance distribution of the linear light guiding body 2202 is preferably 3 or less, and more preferably 2 or less.

In this case, also, by assembling the reflecting liquid crystal display by incorporating the reflecting liquid crystal display element 105 (FIG. 1), the display condition of the actual image display can be improved due to the diffusion function of the above liquid crystal display element 105.

Next, the following will describe the position of the linear light guiding body 102 in relation to the light guiding body 104.

Figure 9:
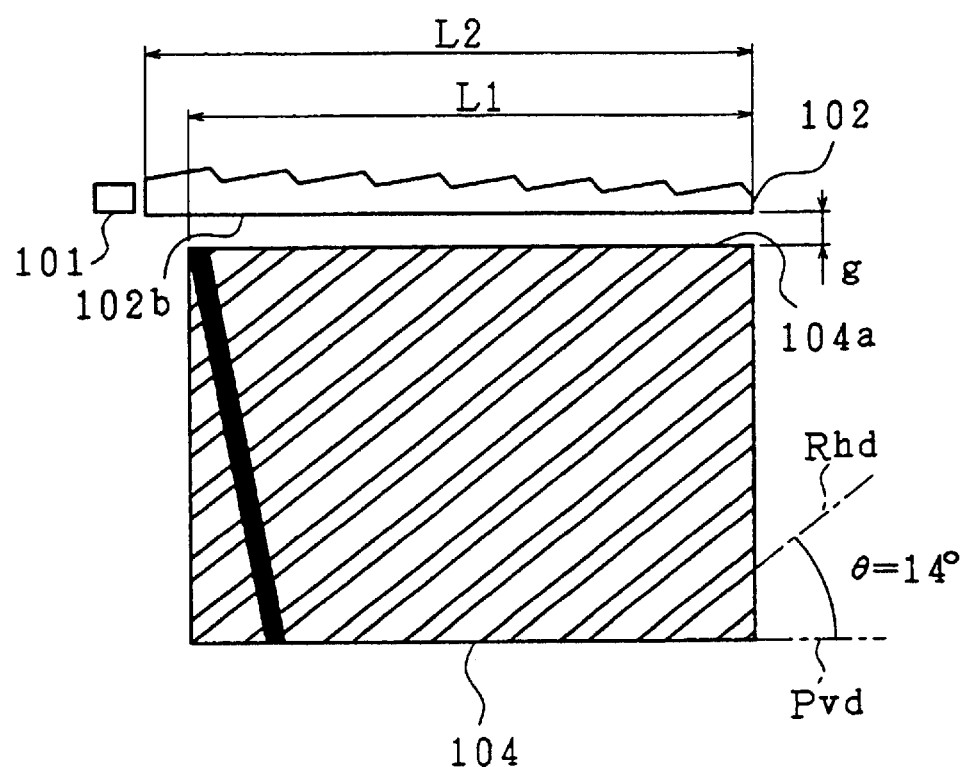
FIG. 9 is a view illustrating a position of the linear light guiding body in relation to the light guiding body in Embodiment 1 of the present invention.

FIG. 9 is a view showing the position of the linear light guiding body 102 in relation to the light guiding body 104 of the present embodiment.

As shown in the drawing, the light outgoing surface 102b of the linear light guiding body 102 is provided so as to oppose the light incident surface 104a of the light guiding body 104, and a distance g of 0.5 mm is secured therebetween. The length L2 of the light outgoing surface (light outgoing end surface) 102b of the linear light guiding body 102 is arranged in such a manner that the left end is 0.12 mm longer than the length L1 of the light incident surface (light incident end surface) 104a of the light guiding body 104.

According to the above arrangement, light can effectively go into the left end of the light incident surface (end surface in the light source side) of the light guiding body 104, and the width of a shadow made at the corner portions (dark portion indicated by the medium thick line in FIG. 9) can be reduced to 1 mm or less, thereby preventing deterioration of an image.

As has been discussed, according to the present embodiment, by using the LED as the dot light emitting source 101, converting incident light from the dot light emitting source 101 to light in the linearly emitting state by the linear light guiding body 102 and allowing the same to go into the light guiding body 104, light can go into the light guiding body 104 efficiently, thereby making it possible to obtain a bright front light 100 and a reflecting liquid crystal display (FIGS. 1, 4(a), and 5(a) as necessary).

Also, by forming the cyclic structures 104f on the light guiding body 104 in such a manner so as to form an angle of 14° with respect to the repeating direction of the pixels formed on the reflecting liquid crystal display element 105, a moire fringe can be prevented, which occurs when the cyclic structures interfere with each other. In the present embodiment, the angle of 14° is given, but the angle is not limited to the foregoing value, and can be in a range from 0° to 80°. To be more specific, the moire fringe can be prevented by setting the angle in a range from 10° to 25° or from 55° to 80° in case of the delta alignment, and from 15° to 75° in case of the stripe alignment.

Also, the light outgoing surface 102b of the linear light guiding body 102 is placed such that the length thereof becomes longer than the light incident surface 104a of the light guiding body 104. To be more specific, by satisfying (L2−L1)=0.12 mm, light can effectively go into the light guiding body 104 from its light incident surface 104a including the corner portions even if a tilt is given to each cyclic structure 104f formed on the light guiding body 104, thereby making it possible reduce the occurrence of unwanted shadows at the corners of the light guiding body 104. The occurrence of these unwanted shadows at the corners can be reduced further by making (L2−L1) longer. However, it is preferable to keep (L2−L1) to 10 mm or less in order not to impair the portability as an electronics device.

It is also preferable to set (L2−L1) to not less than g×tan θ, where θ is the angle given to each cyclic structure 104f formed on the light guiding body 104 and g is a distance between the light outgoing surface 102b of the linear light guiding body 102 and the light 1 incident surface 104a of the light guiding body 104. According to this arrangement, the occurrence of unwanted shadows at the corners of the light guiding body 104 can be reduced more effectively.

Also, by arranging such that light in the linearly emitting state from the linear light guiding body 102 reaches the cyclic structures 104f formed on the light guiding body 104 in a direction that intersects at right angles with the angle θ given to each cyclic structure 104f, more specifically, by approximating the peak value in the direction that forms the angle θ1=20°, the light can effectively go into the cyclic structures 104f (propagating portion 104d and reflecting portion 104e in each). Consequently, brighter front light 100 and reflecting liquid crystal display can be obtained.

The present embodiment described the reflecting liquid crystal display using the linear light guiding body 102 and light guiding body 104 as the front light 100. However, the use of the linear light guiding body 102 and light guiding body 104 is not limited to the foregoing and can be used as lighting system of various purposes. For example, when provided behind the liquid crystal layer 108, the light guiding body 104 can serve as the back light in the transmitting liquid crystal display.

As has been discussed, the front light 100 of the present embodiment comprises the light source unit and the light guiding body 104 that includes the light incident surface 104a into which light from the light source unit enters, and the light outgoing surface 104b from which the incident light from the light incident surface 104a goes out, and is characterized in that light from the light source unit is in the linearly emitting state at least when it goes into the light incident surface 104a of the light guiding body 104b. According to this characteristic, light emitted from the light source unit can effectively go into the light guiding body 104, thereby realizing the bright front light 100.

The linearly emitting state referred to in the present embodiment is the state shown in FIGS. 40 and 41. That is, when light is emitted from the light source 2201 in the normal direction of the light outgoing surface 2201c of the light outgoing body 2202, a ratio of the maximum value and minimum value (hereinafter, referred to as max/min) of the outgoing light luminance for an effective emission length x is in a range from 1 to 3 both inclusive, and more preferably in a range from 1 to 2 both inclusive.

Consequently, the luminance distribution of outgoing light in the planarly emitting state from the light guiding body 104 can be uniform, thereby reducing uneven display on the reflecting liquid crystal display.

For example, an ideal linearly emitting state is the state where a value 1 is given to the luminance distribution with respect to the effective emitting length like in a cold cathode tube. In case of using the cold cathode tube, however, an inverter is necessary to light the same, which raises power consumption and cost problems.

On the contrary, the front light 100 can employ the dot light emitting source 101 that can omit the inverter, such as an LED, and therefore, the front light 100 can offer low-power consuming and space-saving effects.

Further, a more bright front light 100 can be realized by forming the front light 100 from at least one dot light emitting source 101, and converting light from the dot light emitting source 101 into light in the linearly emitting state by at least one linear light guiding body 102 provided in the vicinity of the light incident surface 104a of the light guiding body 104 before the light reaches the light incident surface 104a of the light guiding body 104.

The front light 100 of the present embodiment includes the linear light guiding body 102 that converts light emitted from the dot light emitting source 101 into light in the linearly emitting state, and the light guiding body 104 provided with the cyclic structures 104f that convert outgoing light from the linear light guiding body 102 into light in the planarly emitting state. In addition, a tilt is given to the cyclic direction Rhd of the cyclic structures 104f with respect to the repeating direction Pvd (a direction in parallel to the light outgoing surface 102b of the linear light guiding body 102 and the light incident surface 104a of the light guiding body 104) of the pixels on the reflecting liquid crystal display element 105 to be lit. Light from the linear light guiding body 102 reaches its luminance peak value in the first outgoing direction, which is any direction on a side of a direction perpendicular to the cyclic direction Rhd with respect to the normal direction of the light outgoing surface 102b of the linear light guiding body 102. In other words, light from the linear guiding body 102 reaches the luminance peak value in the direction which forms an angle in closer approximation to an orthogonal than the angle that the normal direction of the light outgoing surface 102b of the linear light guiding body 102 forms with respect to the cyclic direction Rhd.

In particular, it is preferable that the first outgoing direction is the direction in which light travels in the light guiding body 104 in a direction perpendicular to the cyclic direction Rhd.

Consequently, a moire fringe, which occurs when the cyclic structures 104f interfere with the pixels, can be prevented. In addition, even if an LED which can readily emit light on a DC current is used as the dot light emitting source 101, light emitted from the dot light emitting source 101 can be converted efficiently to light in the planarly emitting state, thereby making it possible to light the reflecting liquid crystal display element 105 with bright light.

Embodiment 2

The following will describe an example in accordance with Embodiment 2 of the present invention with reference to accompanying drawings.

Hereinafter, like components are labeled with like reference numerals with respect to Embodiment 1, and the description of these components is not repeated for ease of explanation.

Figure 10:
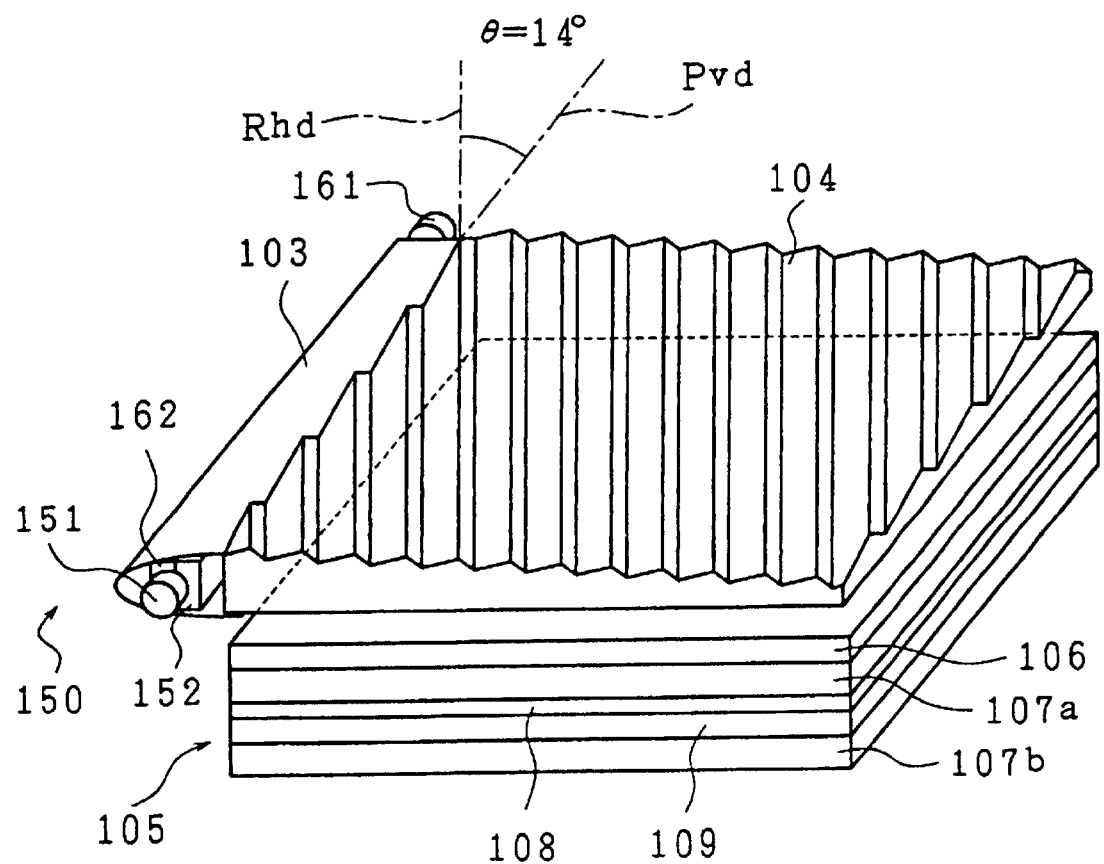
FIG. 10 is a view illustrating an arrangement of a reflecting liquid crystal display including a front light and a reflecting liquid crystal display element used in Embodiment 2 of the present invention.

As shown in FIG. 10, a reflecting liquid crystal display composed of a front light (lighting system) 150 m and the reflecting liquid crystal display element 105 is of an identical structure with the counterpart in Embodiment 1 except that two LEDs are provided as dot light emitting sources (light source units) 151 and 161 and two linear light guiding bodies (lighting elements) 152 and 162 are provided.

Figure 11:
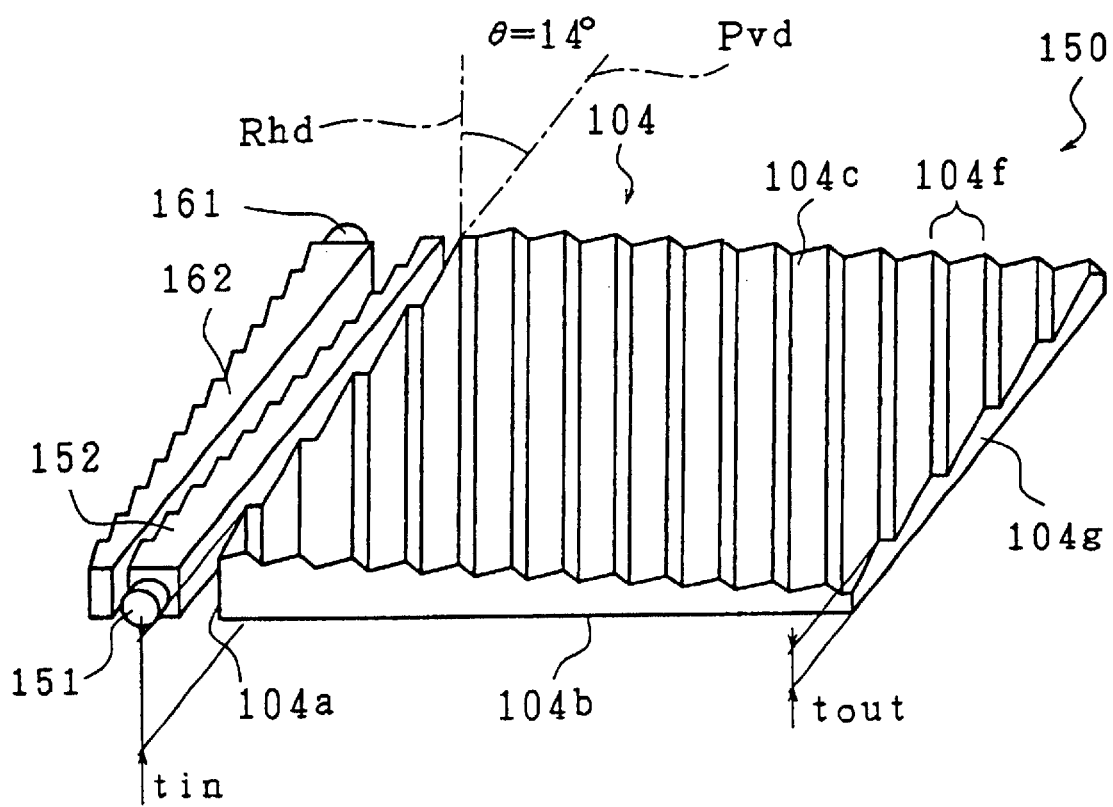
FIG. 11 is a view illustrating an arrangement of the front light used in Embodiment 2 of the present invention.

FIG. 11 is a view depicting an arrangement of the front light 150 used in the present embodiment.

As shown in FIG. 11, in the present embodiment, two white LEDs are used as the dot light emitting sources 151 and 161, and the light incident surfaces 152a of the linear light guiding body 152 and the light incident surface 162a of the linear light guiding body 162, which will be discussed later, are respectively provided for the dot light emitting sources 151 and 161. In addition, the diffusing and reflecting sheet 103 (not shown) is provided to surround the linear light guiding bodies 152 and 162. According to this arrangement, light emitted from the dot light emitting sources 151 and 161 can be converted to light in the linearly emitting state. The light guiding body 104 used in Embodiment 1 is also used herein as the light guiding body 104.

Figure 12:
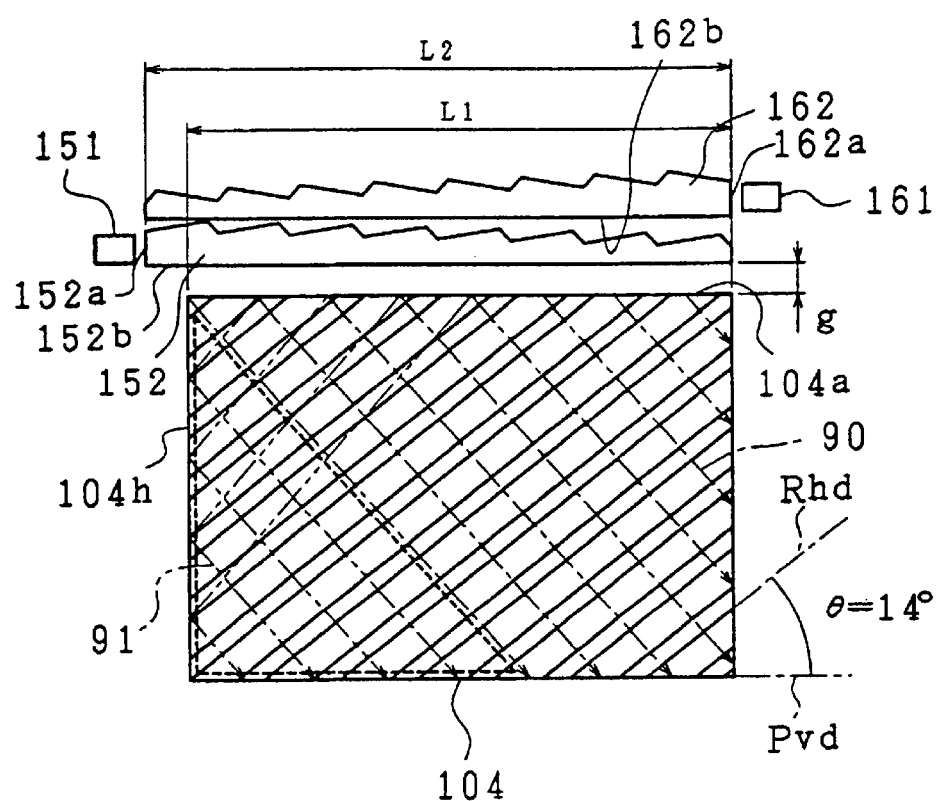
FIG. 12 is a view illustrating a position of the linear light guiding body in relation to the light guiding body in Embodiment 2 of the present invention.

Next, the following will describe the positions and shapes of the linear light guiding bodies 152 and 162 of the present embodiment with reference to FIG. 12.

As shown in the drawing, the linear light guiding bodies 152 and 162 of the present embodiment are the linear light guiding bodies 102 used in Embodiment 1 overlapped symmetrically with respect to each other in such a manner that their respective light outgoing surfaces 152b and 162b oppose the light incident surface 104a of the light guiding body 104 (FIG. 4(a)).

In other words, each of the dot light emitting sources 151 and 161 is identical with the dot light emitting source 101, and each of the linear light guiding bodies 152 and 162 is identical with the linear guiding body 102. The dot light emitting source 151 and linear light guiding body 152 are provided in the same manner as the dot light emitting source 101 and linear light guiding body 102 with respect to the light guiding body 104. The dot light emitting source 161 and linear light guiding body 162 are provided behind the linear light guiding body 152 (at the surface opposing the light outgoing surface 152b), so that they and the dot light emitting source 151 and linear light guiding body 152 are symmetrical with respect to the light guiding body 104.

Figure 13:
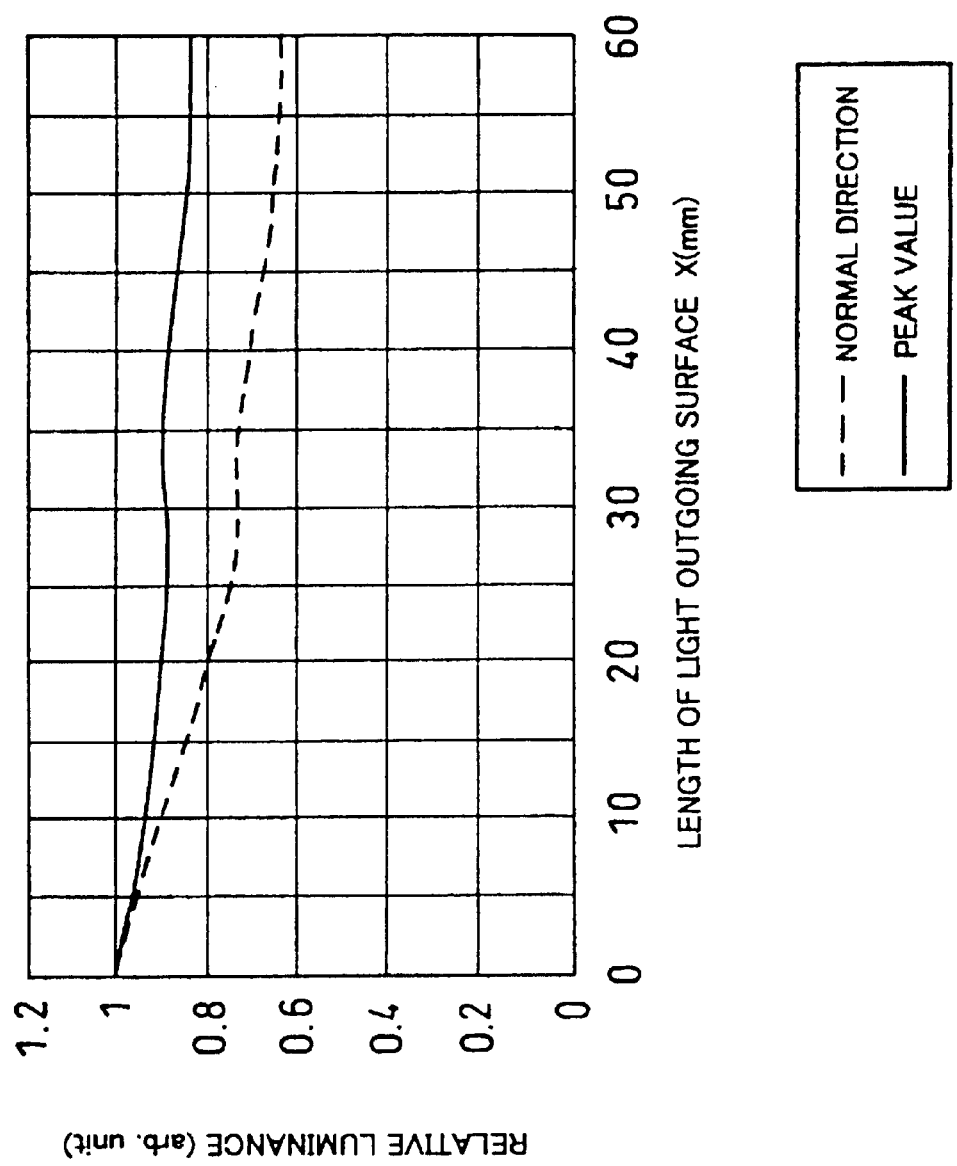
FIG. 13 is a view illustrating a light emitting state of the linear light guiding body of the front light used in Embodiment 2 of the present invention.

FIG. 13 is a view showing the linearly emitting state obtained by the foregoing arrangement. In the drawing, the horizontal axis indicates the lengthwise direction (X-axis) of the outgoing surfaces 152b and 162b of the linear light guiding bodies 152 and 162, and the vertical axis indicates the outgoing light luminance (relative value) in the normal direction of the light outgoing surface and at the peak value. In the present embodiment, the luminance distribution across the light outgoing surface 152b was satisfactory in the linearly emitting state at (max/min)=1.54 in the normal direction and peak value direction.

Figure 14:
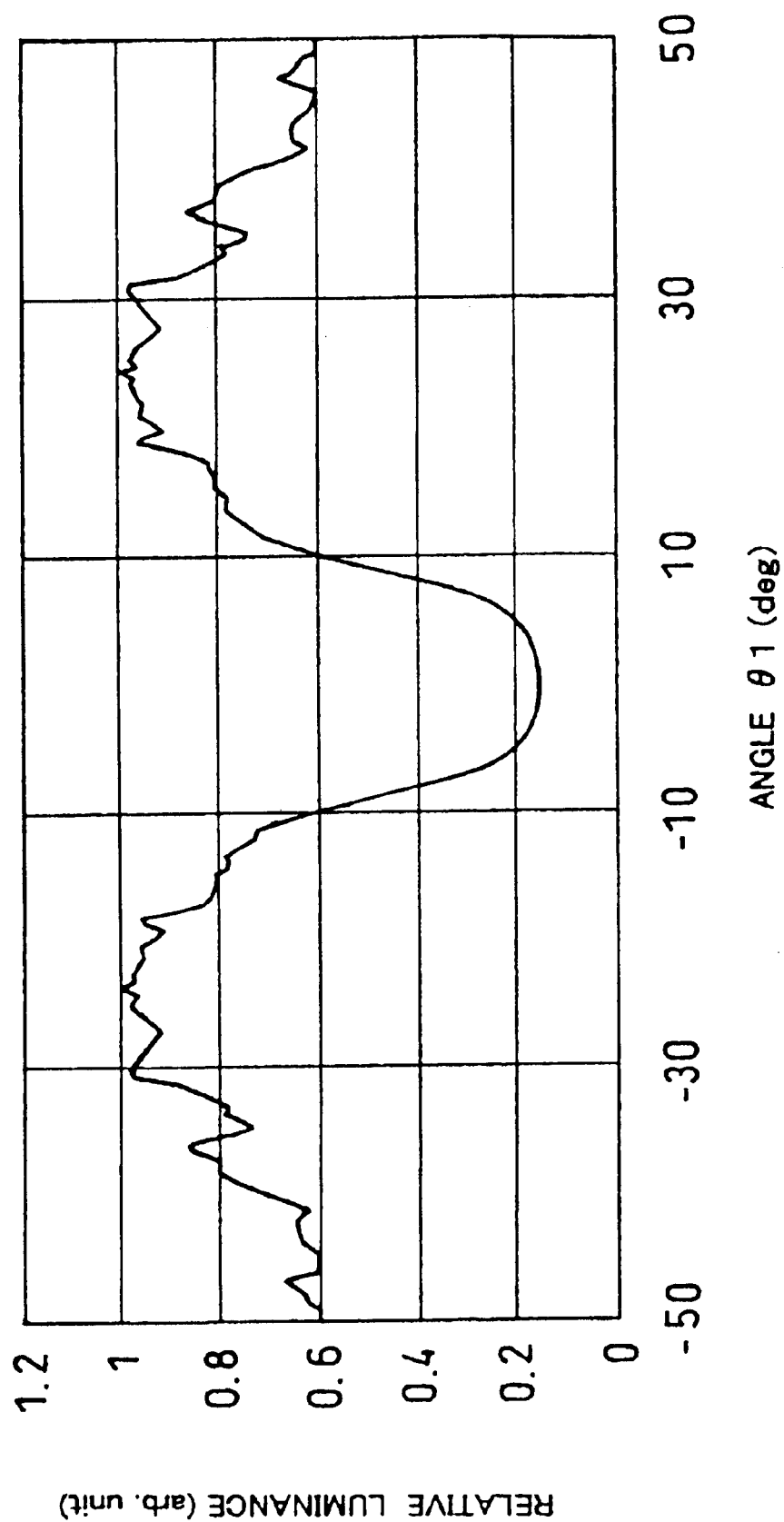
FIG. 14 is a view illustrating a light emitting state depending on an angle of outgoing light at the center of a light outgoing surface of the linear light guiding body used in Embodiment 2 of the present invention.

FIG. 14 shows the angular distribution of the outgoing light at the center of the light outgoing surface 152b across the linear light guiding bodies 152 and 162 designed as above.

As shown in the drawing, outgoing light from each of the linear guiding bodies 152 and 162 reaches the peak value in a direction (first outgoing direction) with an angle of 20° and a direction (second outgoing direction with an angle of −20°, and goes into the cyclic structures 104f formed on the light guiding body 104 (refractive index n=1.49) substantially at right angles with respect to an angle given to each cyclic structure 104f.

In other words, it is preferable that the direction along which the outgoing luminance of the outgoing light from each of the linear light guiding bodies 152 and 162 reaches the peak value is set in the +θ1 direction (first outgoing direction) and −θ1 direction (second outgoing direction) with respect to the angle θ1 satisfying Equation 2 above. By setting in this manner, light can go into the cyclic structures 104f formed on the light guiding body 104 (FIG. 4(a)) effectively. Moreover, light can efficiently go into the light incident surface 104a of the light guiding body 104 at an area other than the area that can be reached by light incident from the light incident surface 104a in the +θ1 direction.

The foregoing will be explained again with reference to FIG. 12. In the drawing, a part of outgoing light from the linear light guiding bodies 152 and 162 is schematically illustrated.

Light 90 (indicated by a single dot chain line in the drawing) having a luminance peak value in the outgoing light angle θ1=+20° from the linear light guiding body 152 travels in the light guiding body 104 along a direction that intersects at right angles with the cyclic direction Rhd. Thus, light 90 is reflected by the reflecting portion 104e (FIG. 4(b)) toward the reflecting liquid crystal display element 105 (FIG. 10), thereby irradiating the reflecting liquid crystal display 105 effectively. In short, the presence of light 90 can improve utilization of light.

On the other hand, light 91 (indicated by a two-dot chain line in the drawing) having the luminance peak value in the outgoing angle θ1=−20° from the linear light guiding body 162 travels in the light guiding body 104 in a direction almost parallel to the cyclic direction Rhd. Thus, the light 91 is hardly effected by a reflecting function of the reflecting portion 104 (FIG. 4(b)). Thus, the light 91 reaches the side surface 104h of the light guiding body 104 (herein, the side surface at the dot light emitting source 151a side), and is reflected thereon. The reflected light 91 from the side surface 104h travels in a direction that intersects at right angles with the cyclic direction Rhd.

The light 91 reflected from the side surface 104h reaches an area (triangle indicated by a broken line in the drawing) where the light 90 does not reach directly, thereby making a compensation for the light 90. Consequently, outgoing light in the planarly emitting state from the light guiding body 104 can be distributed more evenly.

Hence, the light 91 having the luminance peak value in the direction at the outgoing angle θ1=−20° from the linear light guiding body 162 is the light that makes a better distribution of outgoing light in the planarly emitting state from the light guiding body 104 by returning from the side surface 104h of the light guiding body 104 as reflecting light, and lighting the entire light guiding body 104 uniformly.

The light 90 reaches the light incident surface 104a of the light guiding body 104 and travels therein along the direction at the outgoing angle θ1=+20°. In practice, however, the light 90 diffuses within the entire light guiding body 104 by being reflected repetitively. Thus, the light 90 alone can make a uniform distribution of outgoing light in the planarly emitting state from the light guiding body 104, but the presence of the light 90 can make a better distribution.

In addition, it is preferable to provide a reflecting film over the side surface 104h, because by so doing, reflection efficiency of the light 91 can be improved.

In the foregoing description, the second outgoing direction and first outgoing direction are symmetric with respect to the light incident surface 104a of the light guiding body 104. However, the direction of the second outgoing direction is not limited to the foregoing, and can be any direction as long as it is different from the first outgoing direction.

As with Embodiment 1, an effect given to the actual image display by the outgoing luminance distribution of outgoing light from each of the linear guiding bodies 152 and 162 was analyzed. Here, the reflecting liquid crystal display (FIG. 10) is formed by assembling the front light 150 and reflecting liquid crystal display element 105, on which an image is displayed.

The linear light guiding bodies 152 and 162 are the ones illustrated in FIG. 11(a). However, a constant value is given to the luminance distribution (peak value direction (direction at θ1=+20°)) of the linear light guiding body 152, while the luminance distribution (peak value direction (direction at θ1=−20°)) of the linear light guiding body 162 was varied.

The display conditions were evaluated by visual observation of an actual image display in the four levels including fairly good (⊚), good (○), acceptable in practical use (Δ), too noticeable (x), and the results are set forth in Table 4 below.

TABLE 4

| | | | | | |
|---|---|---|---|---|---|
| BRIGHTNESS DISTRIBUTION (max/min) (θ1 = +20°) | | | 3 | | |
| BRIGHTNESS DISTRIBUTION (max/min) (θ1 = −20°) | 1.2 | 1.7 | 2 | 3 | 3.6 |
| DISPLAY STATE | ⊚ | ⊚ | ⊚ | ⊚ | Δ |

Table 4 reveals that a preferable luminance distribution for both the linear light guiding bodies 152 and 162 is 3 or less.

In the present embodiment, by emitting light in a direction at the angle of −200 from the linear light guiding bodies 152 and 162, light reflected from the side surface 104h of the light guiding body 104 (the side surface at the end where the dot light emitting source 151 is provided, FIG. 12) can be effectively directed to the cyclic structures 104f on the light guiding body 104, thereby making it possible to obtain a brighter front light system with a satisfactory luminance distribution.

The distance g of 0.5 mm was secured between the linear light guiding body 152 and light guiding body 104, and the length L2 of the light outgoing surface (outgoing end surface) 152a of the linear light guiding body 152 is 2 mm longer than the length L1 of the light incident surface (light incident end surface) 104a of the light guiding body 104.

According to the foregoing arrangement, in the present embodiment, light can go into the light guiding body 104 at the left end of the light incident surface thereof (a portion at the side surface 104h end) effectively, thereby making it possible to prevent unwanted shadows (dark portions) made at the corners.

Figure 15:
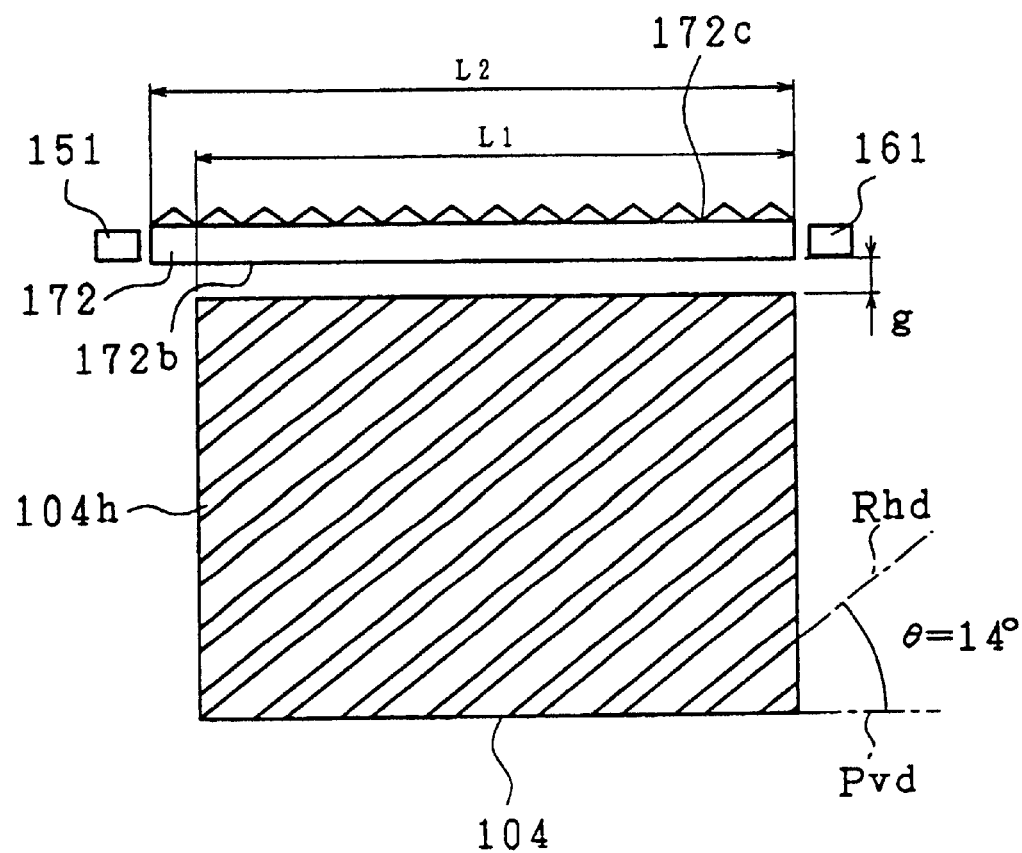
FIG. 15 is a view illustrating a position of the linear light guiding body in relation to the light guiding body in Embodiment 2 of the present invention.

The present embodiment described the arrangement using two linear light guiding bodies (linear light guiding bodies 152 and 162). However, the present invention is not limited to the foregoing, and can be arranged such that using a linear light guiding body (lighting element) 172 illustrated in FIG. 15. The linear light guiding body 172 is provided with a reflecting portion having isosceles triangles on its surface 172c opposing a light outgoing surface 172b. The shape of each isosceles triangle has a pitch of 20 μm and a height of 9 μm. Even when the linear light guiding body 172 designed as above is used, by providing the dot light emitting sources 151 and 161 at the two ends, respectively, outgoing light from the linear light guiding body 172 can have the peak value at the direction at the angle of 20° and the direction at the angle of −20°. Consequently, a compact and bright front light system can be obtained.

As has been explained, according to the above embodiment, by using two LEDs as the dot light emitting sources (dot light emitting sources 151 and 161) and using two linear light guiding bodies (liner light guiding bodies 152 and 162), bright front light 150 and reflecting liquid crystal display with a satisfactory luminance distribution can be provided.

In addition, the light outgoing surface (light outgoing surfaces 152b and 172b) of the linear light guiding bodies (linear light guiding bodies 152 and 172) are made longer than the light incident surface 104a of the light guiding body 104. To be more specific, given (L2−L1)=2 mm, then if a tilt is given to each cyclic structure 104f formed on the light guiding body 104, light can go into the corners of the light incident surface 104a, thereby making it possible to reduce the occurrence of unwanted shadows made at the corners of the light guiding body 104.

In addition, outgoing light in the linearly emitting state from the linear light guiding bodies (linear light guiding bodies 152 and 172) reaches the peak value in the first and second outgoing directions each heading a different direction, respectively. Further, it is preferable that the first and second outgoing directions are symmetric with respect to the normal direction of the light outgoing surface 152b of the linear light guiding body 152.

More specifically, given 14° as the angle θ of each cyclic structure 104 formed on the light guiding body 104, then by approximating the peak value in the directions at the angle θ1=20° and −20°, light can effectively go into the cyclic structures 104f (propagating portion 104d and reflecting portion 104e in each) formed on the light guiding body 104, thereby making it possible to obtain brighter front light 150 and reflecting liquid crystal display having a better luminance distribution.

Further, it is preferable that the luminance distribution of outgoing light in the first and second outgoing directions is 3 or less. In this case, outgoing light in the planarly emitting state from the light guiding body 104 can attain a more uniform luminance distribution.

Embodiment 3

The following will describe another example in accordance with Embodiment 3 of the present invention with reference to the accompanying drawings.

Hereinafter, like components are labeled with like reference numerals with respect to Embodiments 1 and 2, and the description of these components is not repeated for ease of explanation.

Figure 16:
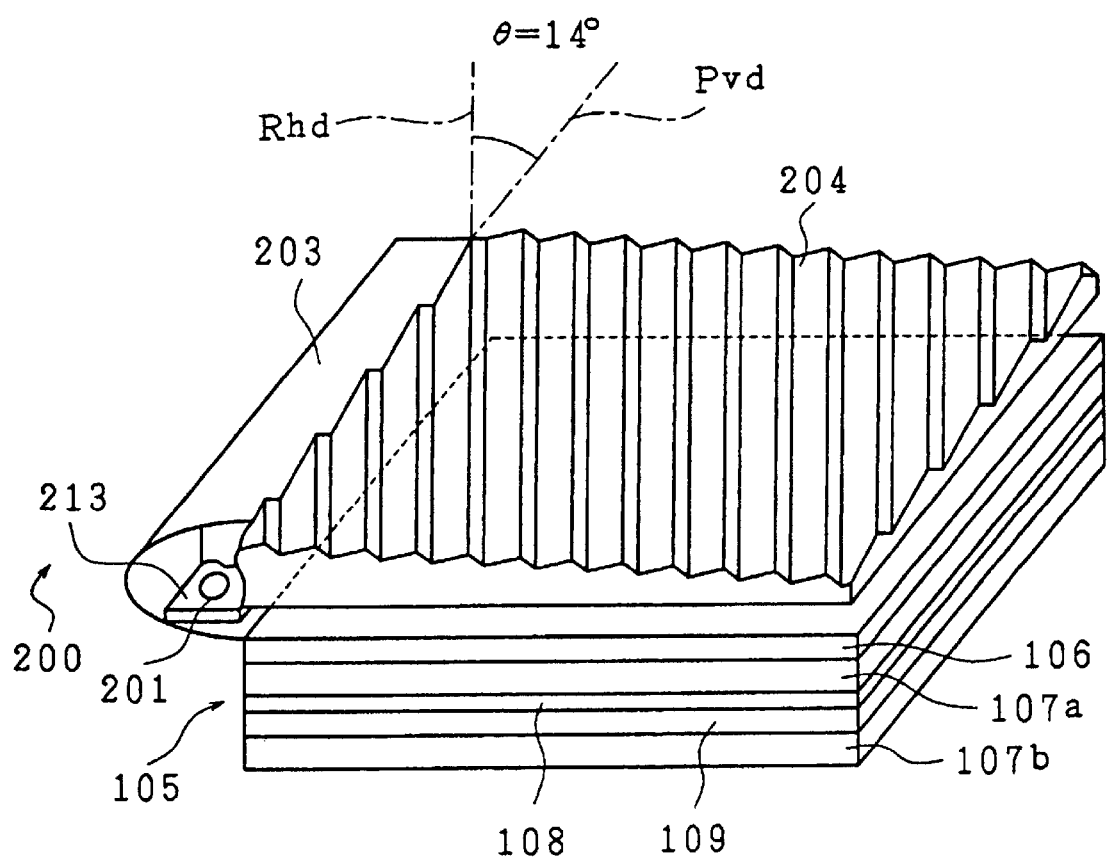
FIG. 16 is a view illustrating an arrangement of a reflecting liquid crystal display including a front light and a reflecting liquid crystal display element used in Embodiment 3 of the present invention.

As shown in FIG. 16, a reflecting liquid crystal display composed of a front light (lighting system) 200 and the reflecting liquid crystal display element 105 is of an identical structure with the counterpart in Embodiment 1 except that 3-light LED array is provided as a dot light emitting sources (light source units) 201 (FIG. 17(b)), so that light converted in light in the linearly emitting state is emitted.

FIGS. 17(a) and 17(b) are views depicting an arrangement of the front light 200 of the present embodiment.

As shown in the drawings, in the present embodiment, three LEDs are used as the dot light emitting sources 201, and each is bonded onto a substrate 213, and placed at the lower end of the light outgoing surface 204b of the light guiding body (planar light guiding body) 204 (below the light incident surface 204a). A diffusing and reflecting sheet (converting means, diffusing means) 203 is provided to surround a plurality of dot light emitting sources 201. According to this arrangement, light emitted from each dot light emitting source 201 can be converted into light in the linearly emitting state. The dot light emitting sources 201 are provided at such positions that uniformly quarter the effective display area (breadth: 50.2 mm×length: 37.1 mm) of the reflecting liquid crystal display in the breadth direction (with intervals of approximately 10 mm).

The light guiding body 204 of the present embodiment is longer than the reflecting liquid crystal display element 105 (FIG. 16) in the lengthwise direction, and the substrate 213 is provided at a portion of the light outgoing surface 204b of the light guiding body 204 protruding from the reflecting liquid crystal display element 105. In addition, the diffusing sheet 203 is provided at the portion of the light guiding body 204 protruding from the reflecting liquid crystal display element 105. Hence, the dot light emitting sources 201 oppose the diffusing sheet 203 through the light guiding body 204 (FIG. 18 which will be referred to below).

Here, the light outgoing surface 204b and cyclic structures 204f of the light guiding body 204 correspond to the light outgoing surface 104b and cyclic structures 104f of the light guiding body 104 of Embodiment 1, respectively (FIG. 4(a)).

Figure 18:
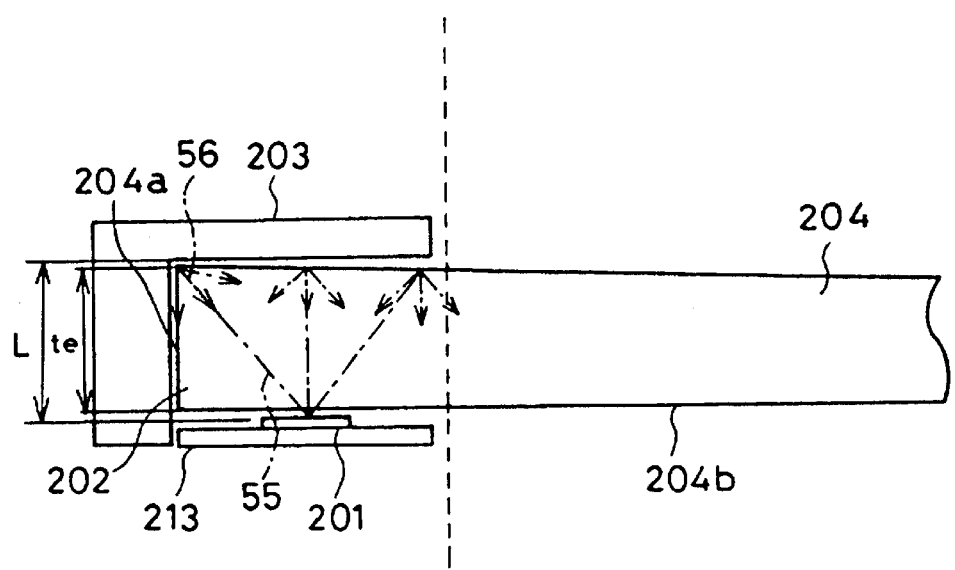
FIG. 18 is a view illustrating a position of an LED array in relation to a light guiding body in Embodiment 3 of the present invention.

FIG. 18 is a view showing the position and shape of the linear light guiding body 202 of the present embodiment and the light emitting state.

As shown in the drawing, in the present embodiment, let L be a distance from the light emitting portion of each dot light emitting source 201 to the diffusing and reflecting sheet 203, and te be the thickness of the light incident surface 204a of the light guiding body 204.

It should be appreciated that the linear light guiding body 202 is an integral part of the light guiding body 204, and is formed by a portion of the light guiding body 204 protruding from the reflecting liquid crystal display element 105 (FIG. 16).

Figure 19:
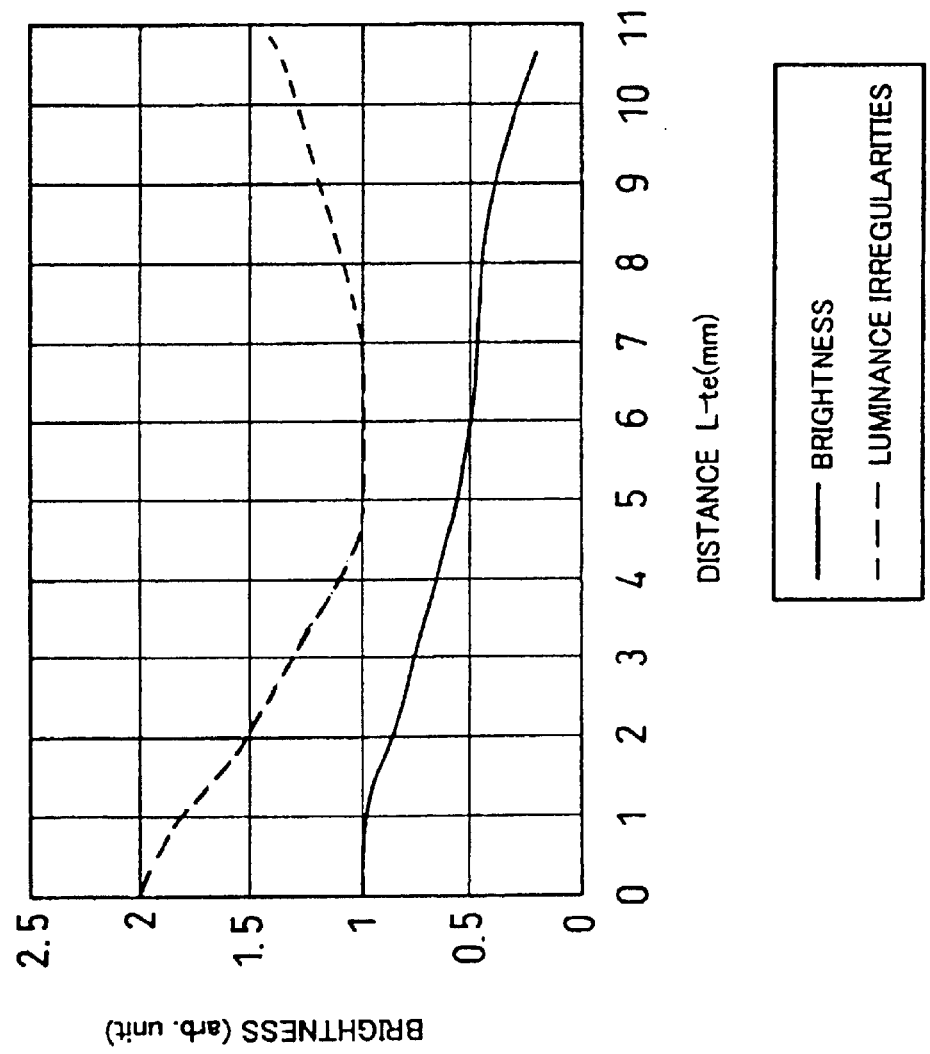
FIG. 19 is a view illustrating brightness after panel reflection that varies with a distance between a dot light emitting source and a diffusing and reflecting sheet used in Embodiment 3 of the present invention.

Here, referring to FIG. 19, a relation of the position (a difference between the distance L and thickness te) of each dot light emitting source 201 and diffusing and reflecting sheet 203 versus brightness and a luminance light-dark difference in the linearly emitting state after reflected from the panel, according to the present embodiment, will be explained. According to the present arrangement, if the distance L approximates to the thickness te, brightness can increase, but a light-dark difference undesirably increases as well. Moreover, if a larger difference (L-te) is given to L and te, a light-dark difference in luminance also undesirably increases. If such a difference exceeds 10 mm, in particular, an overall size of the apparatus undesirably increases as well. Therefore, it is preferable that the difference is in a range from 0 mm to 10 mm. Also, FIG. 19 reveals that, in order to further improve the display quality, a range from 0 mm to 5 mm is preferable. In view of the foregoing, in the present embodiment, the distance L between each dot light emitting source 201 and diffusing reflecting sheet 203 is set to the same as the thickness te of the light incident surface 204*a* of the light guiding body 204.

Also, as shown in FIG. 18, light 55 emitted from each dot light emitting source 201 is converted to light 56 as it is diffused and reflected repetitively by the diffusing and reflecting sheet 203 before it goes into the light guiding body 204. In the present embodiment, the luminance distribution across the light incident surface 204*a* of the light guiding body 204 obtains a satisfactory linearly emitting state with (max/min)=2.0 or less in the normal direction.

Figure 20:
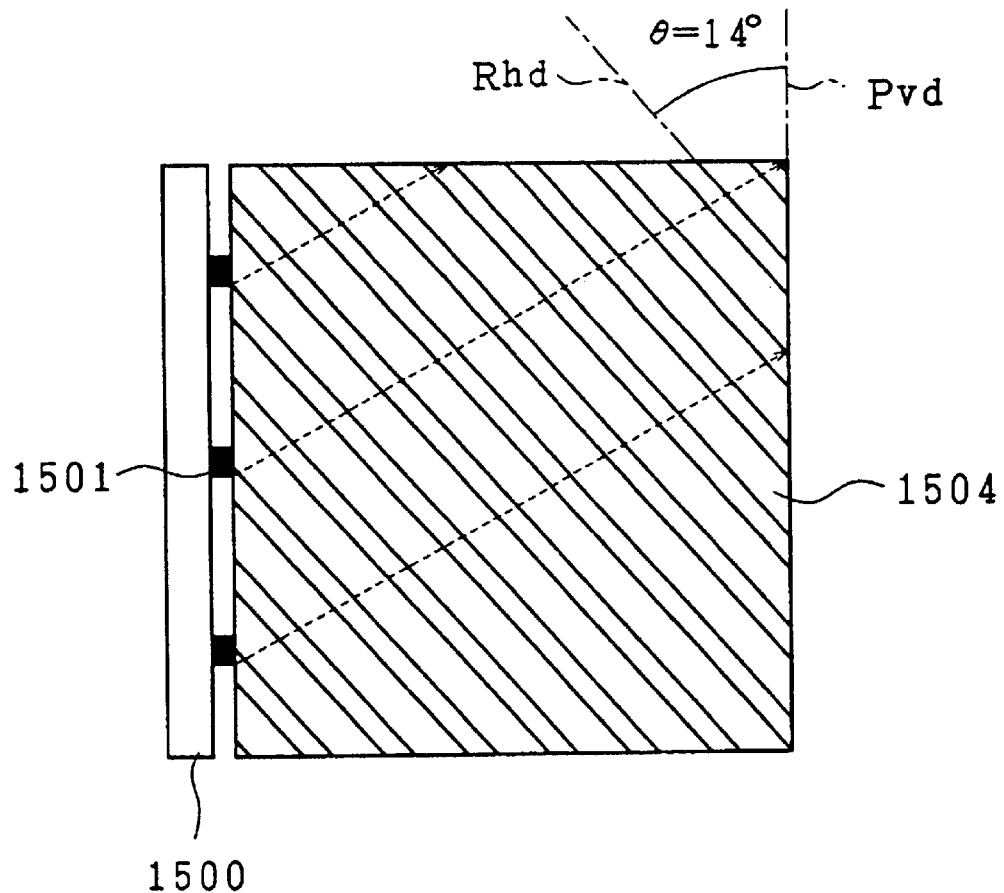
FIGS. 20(a) and 20(b) are views illustrating an arrangement in which three dot light emitting sources used in Embodiment 3 are provided directly on a light incident surface of a light guiding body.
Figure 20:
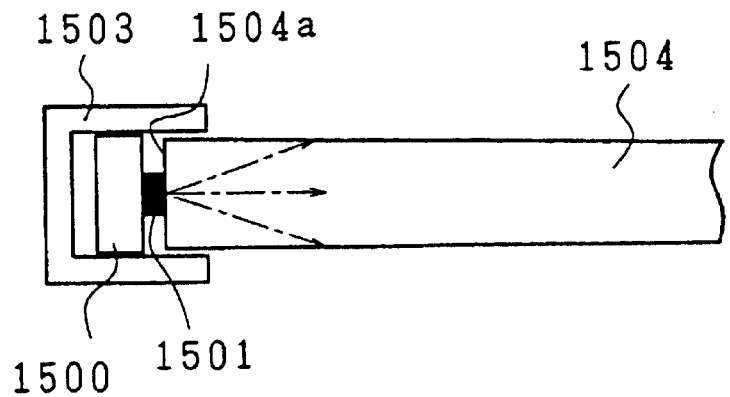

FIGS. 20(*a*) and 20(*b*) show a comparative example of the present embodiment, in which three dot light emitting sources (LEDs) 1501 are provided directly on a light incident surface 1504*a* of a light guiding body 1504. As shown in the drawings, according to this arrangement, a portion (indicated by a broken line in FIG. 20(*a*)) having high luminance appears intermittently at the portion where each dot light emitting source 1501 is positioned, thereby deteriorating the display quality markedly.

In the comparative example, each dot light emitting source 201 is provided onto a substrate 1500, and the dot light emitting sources 1501 and substrate 1500 is covered with the diffusing and reflecting sheet 1503.

Figure 17:
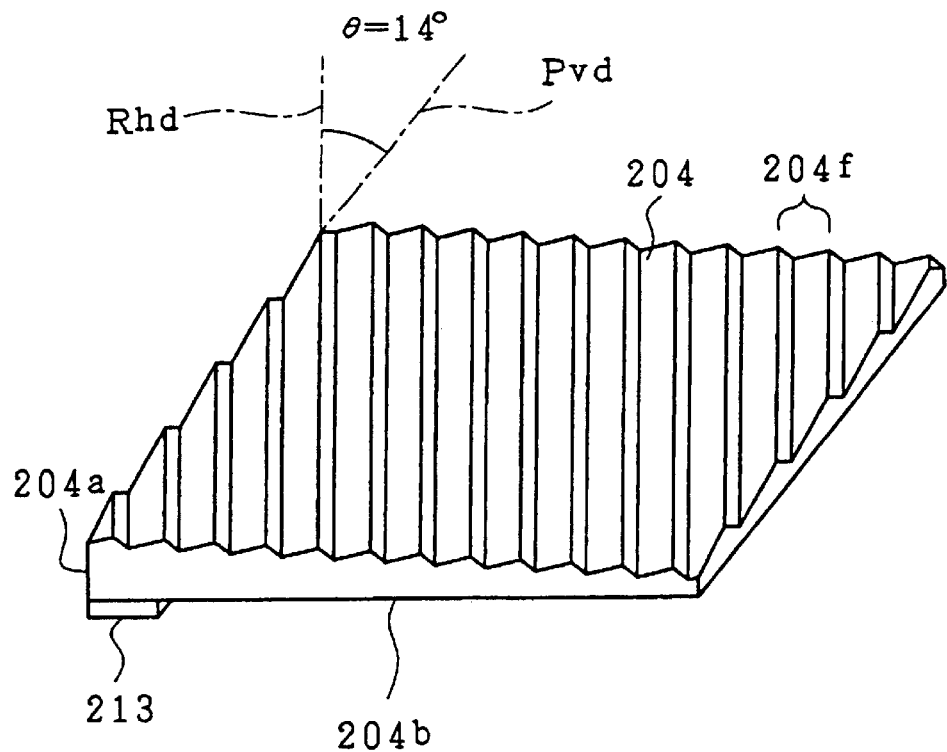
Figure 17:
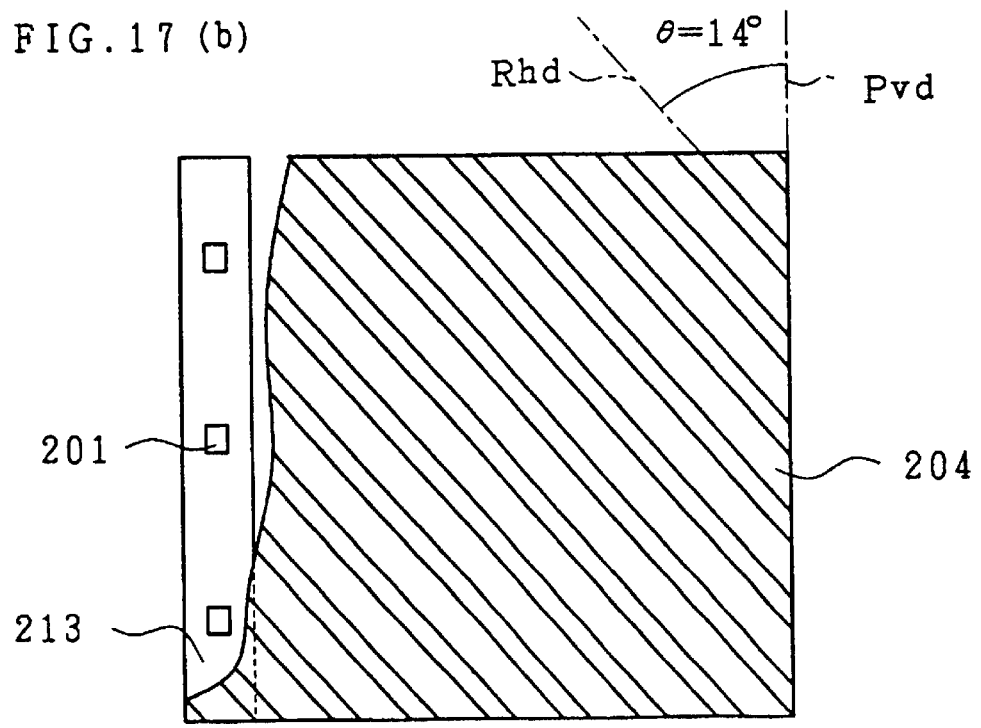

As has been discussed, according to the present embodiment, light emitted from the dot light emitting source 201 (FIG. 17(*b*)) can be converted to light in the linearly emitting state having a small light irregularity, thereby making it possible to obtain a compact front light system producing a small light-dark difference in luminance.

The present embodiment described the arrangement using three LEDs as the dot light emitting sources 201. However, the present invention is not limited to the foregoing, and the number of the dot light emitting sources 201 can be increased in accordance with the size of the display screen, so that the brightness of the display can be increased. It should be noted, however, that power consumption is also increased in this case, and for this reason, it is preferable to use the least necessary number of dot light emitting sources 201 to form the front light 200.

Also, the present embodiment described the arrangement, by which the LED array (composed of a plurality of dot light emitting sources 201) and the diffusing and reflecting sheet 203 are provided with the light guiding body 204 therebetween. However, the present invention is not limited to the foregoing, and these components may be provided with an air layer therebetween.

Figure 21:
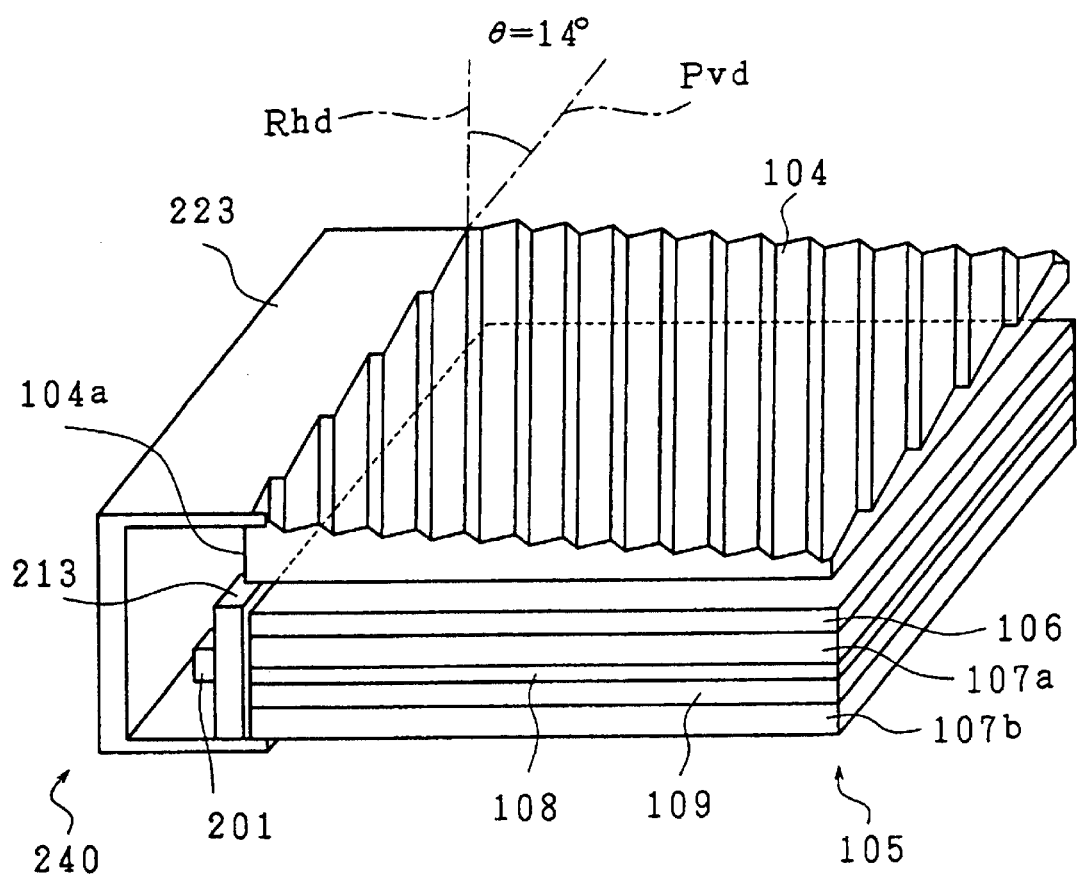
FIG. 21 is a view illustrating another arrangement of a reflecting liquid crystal display including a front light and a reflecting liquid crystal display element used in Embodiment 3 of the present invention.

The following will describe another arrangement of the reflecting liquid crystal display of the present embodiment composed of a front light (lighting system) 240 and the reflecting liquid crystal display element 105 with reference to FIG. 21.

As shown in the drawing, the present arrangement is identical with the firstly described arrangement in that the LED array is provided below the light incident surface 104*a* of the light guiding body 104, but different in that light is emitted along the horizontal direction of the panel. Also, in the present arrangement, approximately 2.0 mm is secured as a distance L' (see FIG. 22) between the light emitting portion of the dot light emitting sources 201 and the diffusing and reflecting sheet (converting means, diffusing means) 223.

In other words, it is arranged in such a manner that outgoing light from each dot light emitting source 201 is directed to travel from the inner side to the outer side of the light guiding body 104 in the normal direction of the light incident surface 104*a* thereof.

Figure 22:
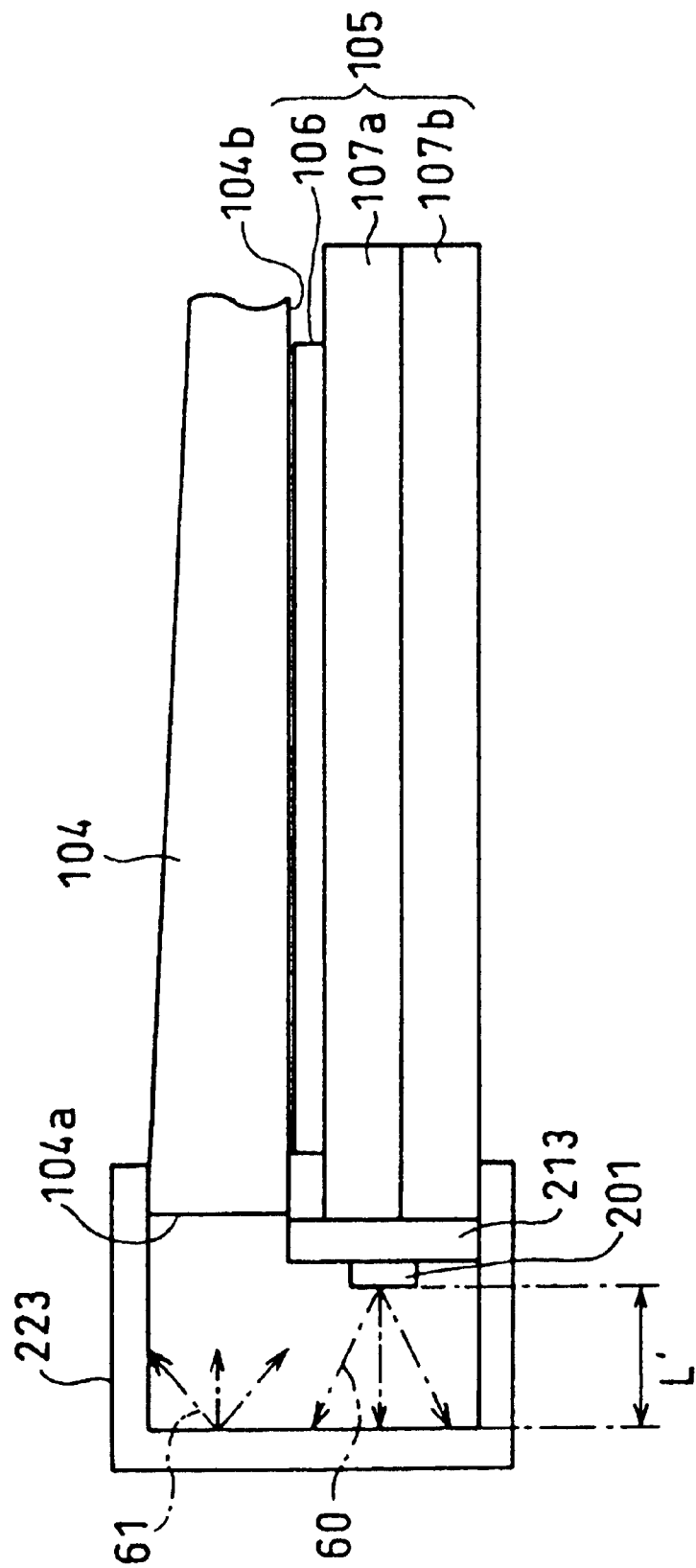
FIG. 22 is a view illustrating a shape, a position, and a light emitting state of a front light used in Embodiment 3 of the present invention.

FIG. 22 is a view showing the shape and position of the front light 204, and the light emitting state of the present arrangement in accordance with Embodiment 3.

As shown in FIG. 22, according to the present embodiment of Embodiment 3, three LEDs are used as the dot light emitting sources 201, and each is bonded to the substrate 213 and provided below the light outgoing surface 104*b* of the light guiding body 104. Here, the dot light emitting sources 201 are positioned such that light is emitted to the side face of the panel (a direction perpendicular to the display screen of the reflecting liquid crystal display) along a light emitting direction 60. Further, the diffusing and reflecting sheet 223 is provided to surround each dot light emitting sources 201. By providing the foregoing components in the above manner, it has become possible to convert light emitted from the dot light emitting sources 201 to light in the linearly emitting state (light 61).

Figure 23:
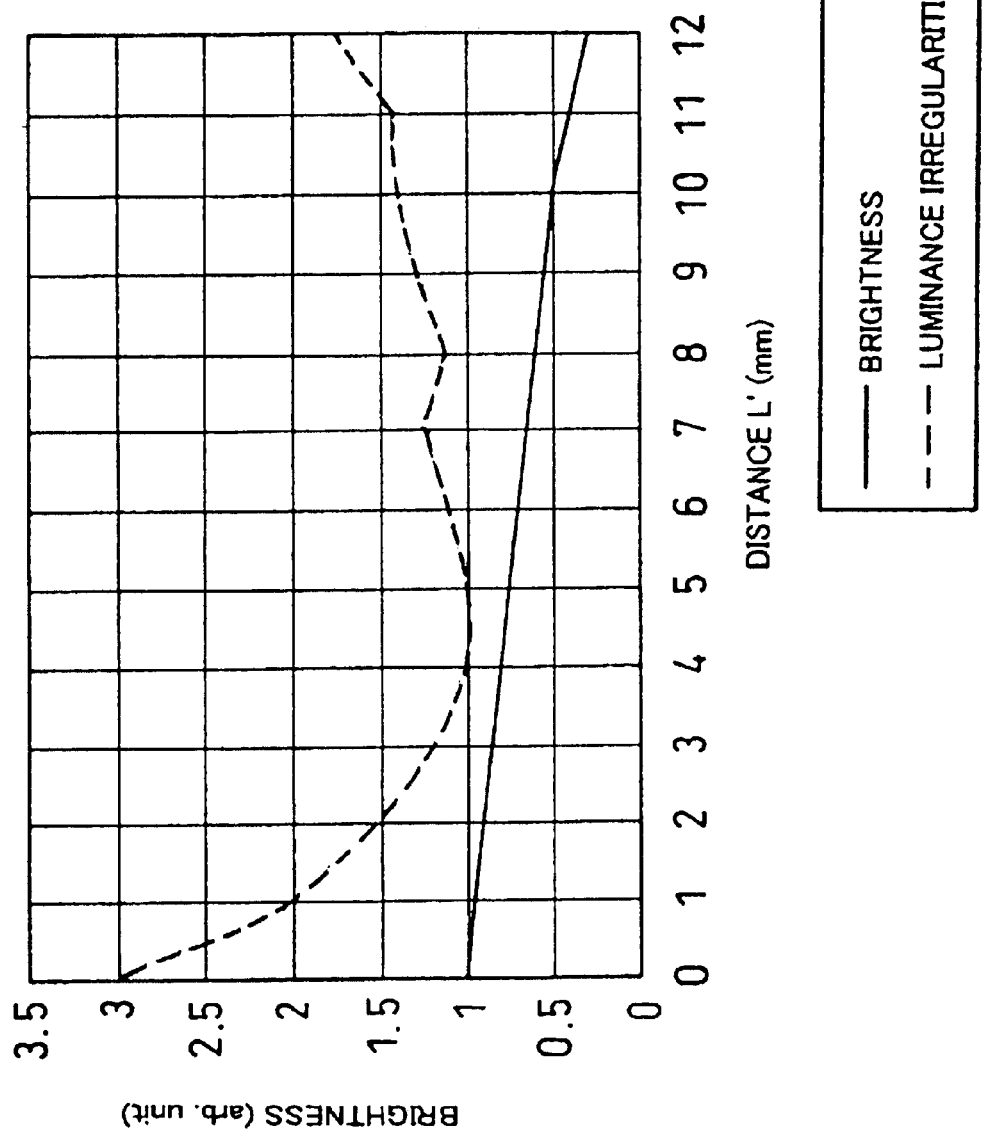
FIG. 23 is a view illustrating brightness after panel reflection that varies with a distance between a dot light emitting source and a diffusing and reflecting sheet used in Embodiment 3 of the present invention.

The following description will explain, with reference to FIG. 23, the relation between the distance L' secured between the dot light emitting sources 201 and diffusing and reflecting sheet 223 and a light-dark difference in luminance of light reflected from the panel in the bright linearly emitting state.

As shown in the drawing, according to the present arrangement, brightness can increase as the distance L' secured between the dot light emitting sources 201 and diffusing and reflecting sheet 223 becomes smaller. However, in this case, a light-dark difference in luminance also increases undesirably. In addition, if the distance L' 1 is extended, a light-dark difference in luminance decreases, but so does the brightness. In particular, if the distance L' exceeds 10 mm, the overall display is upsized undesirably, and for this reason, the distance L' is preferably in a range from 0 mm to 10 mm, and in order to further improve the display quality, the distance L' is more preferably in a range from 1 mm to 3 mm.

According to the present arrangement of Embodiment 3, the luminance distribution across the light outgoing surface 104*b* of the light guiding body 104 was (max/min)=1.5 or less in the normal direction, and a satisfactory linearly emitting state was obtained.

As has been discussed, with the foregoing arrangement of Embodiment 3, light emitted from the dot light emitting sources 201 can be converted to light in the linearly emitting state having less light irregularity, thereby making it possible to obtain a compact front light system having a small light-dark difference in luminance.

In other words, the front light 200 and 240 of the present embodiment is provided with sheet-state converting means (diffusing and reflecting sheet 203 and 223) that converts light emitted from each dot light emitting source 201 into light in the linearly emitting state. The sheet-state converting means is provided in such a manner that a part of the same opposes the dot light emitting sources 201, and a part of the same opposes the light incident surfaces 204*a* and 104*a* of the light guiding body 204 and 104, respectively.

Consequently, light emitted from each dot light emitting source 201 can be converted to light in the linearly emitting state having less light irregularity, while the number of components is reduced, thereby making it possible to produce a compact front light system having a small light-dark difference in luminance. In addition, more light sources can be provided while maintaining the size of the display without complicating the arrangement thereof. Hence, a quantity of light can be readily increased.

It should be appreciated that the sheet-state converting means may be provided in the vicinity of the dot light emitting sources 201. In this case, the utilization of light can be improved by preventing attenuation of light emitted from each dot light emitting source 201.

The present embodiment described the arrangements respectively using the diffusing and reflecting sheets 203 and 223 (FIGS. 18 and 22, respectively). However, the present invention is not limited to the foregoing, and a reflecting sheet may be used instead.

Embodiment 4

The following will describe another example in accordance with Embodiment 4 of the present invention with referring to the accompanying drawings.

Hereinafter, like components are labeled with like reference numerals with respect to Embodiments 1–3, and the description of these components is not repeated for ease of explanation.

Figure 24:
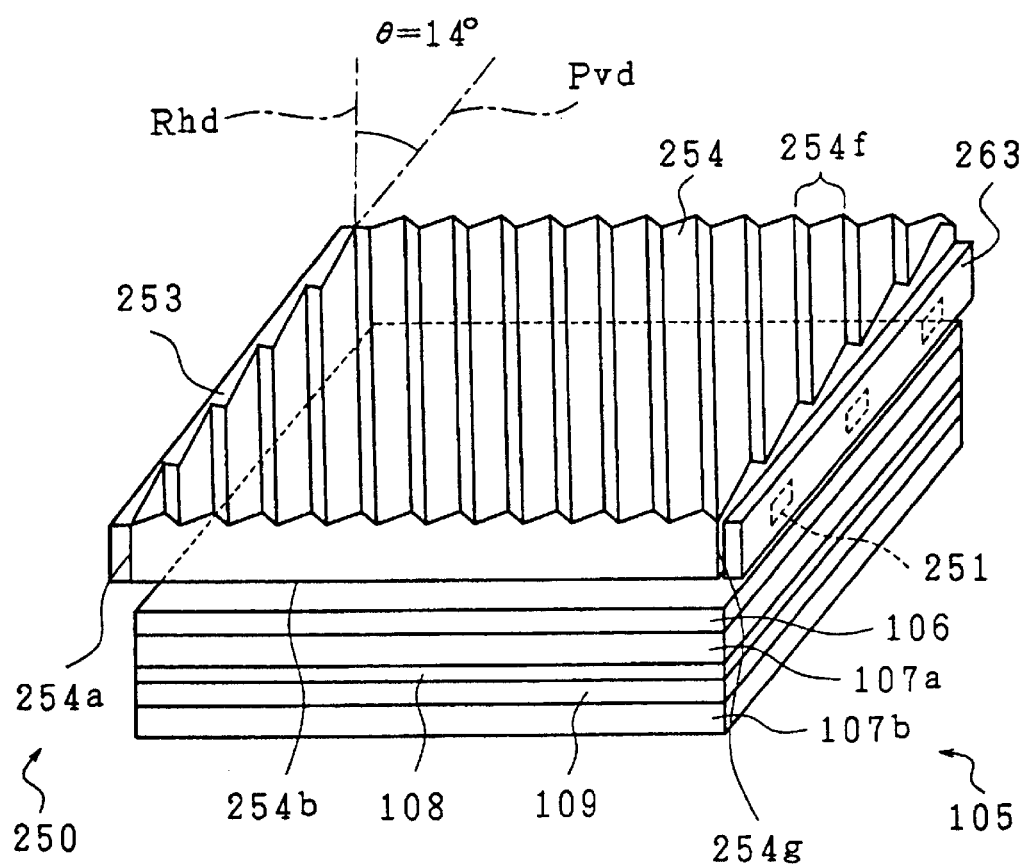
FIG. 24 is a view illustrating an arrangement of a reflecting liquid crystal display including a front light and a reflecting liquid crystal display element used in Embodiment 4 of the present invention.

FIG. 24 is a view depicting an arrangement of a reflecting liquid crystal display composed of a front light (lighting system) 250 used in the present embodiment and the reflecting liquid crystal display element 105.

As shown in the drawing, the present embodiment is identical with Embodiment 3 above in that a substrate 263 (corresponding to the substrate 213 of FIG. 17(b)) provided with dot light emitting sources (light source unit, LED array) 251 (corresponding to the dot light emitting sources 201 of FIG. 17(b)) as a light source, but different in that (1) the dot light emitting sources 251 are provided on a surface 254g opposing a light incidence surface 254a of a light guiding body (planar light guiding body) 254, (2) a diffusing and reflecting sheet (converting means, diffusing means) 253 is provided on the light incident surface 254a of the light guiding body 254, and (3) 1.2 mm is given as the thickness of the surface 254g opposing the light incident surface 254a of the light guiding body 254.

Figure 25:
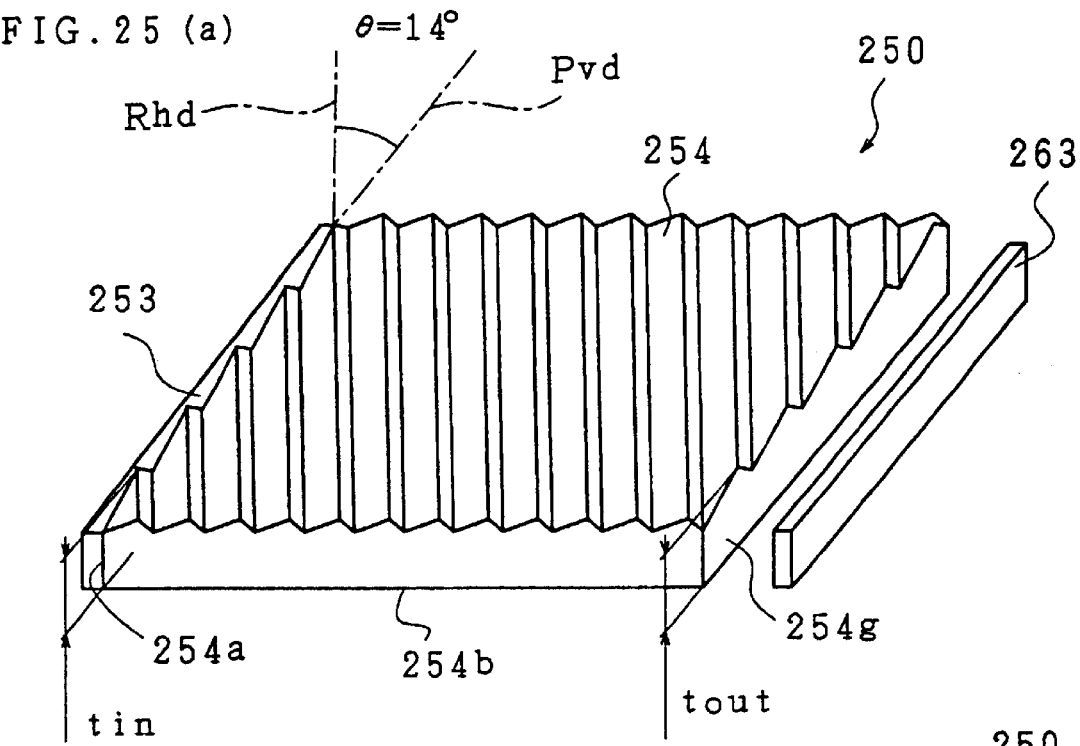
Figure 25:
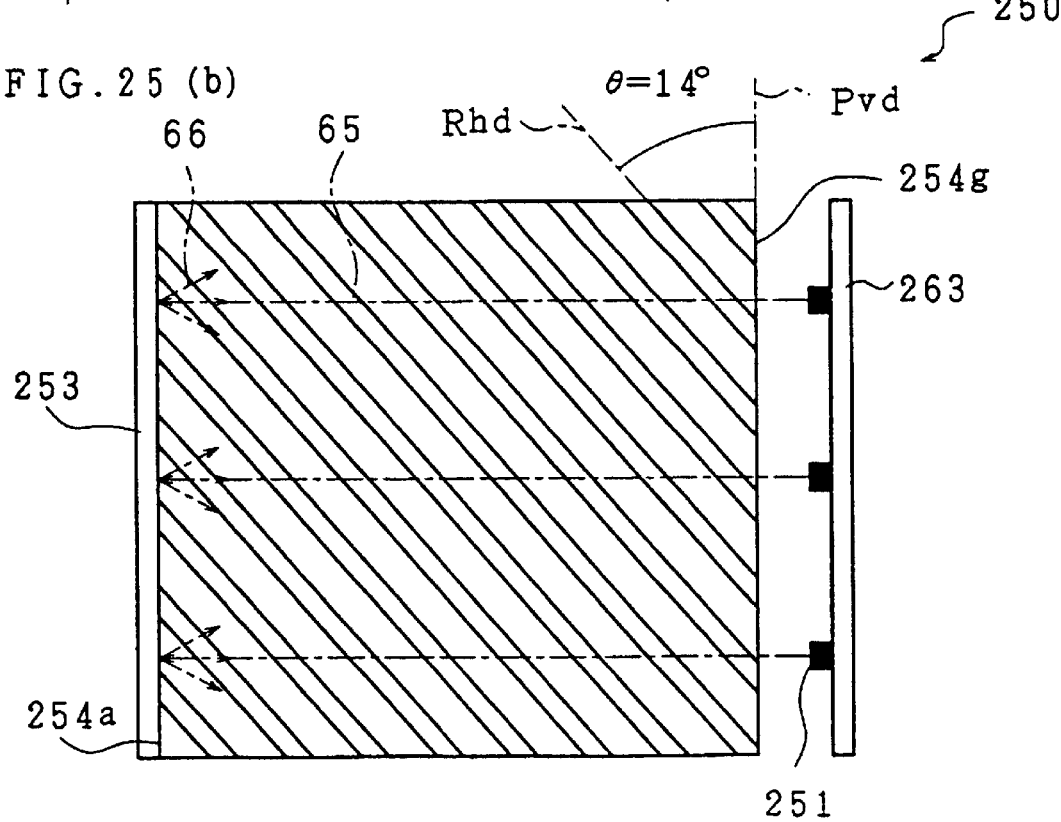

FIGS. 25(a) and 25(b) are views showing the shape and position of the front light 250 used in the present embodiment.

As shown in the drawings, in the present embodiment, the front light 250 is formed in that following manner. That is, the LEDs used as the plurality of dot light emitting sources 251 are bonded on the substrate 263 and provided to the surface 254g opposing the light incident surface 254a of the light guiding body 254. Also, the diffusing and reflecting sheet 253 is provided over the light incident surface 254a of the light guiding body 254.

Here, the thickness (tin) of the light incident surface 254a of the light guiding body 254 and the thickness (tout) of the surface 254g opposing the light incident surface 254a are both set to 1.2 mm (tin=1.2 mm, and tout=1.2 mm, respectively).

According to the above arrangement, light 65 emitted from each of a plurality of the dot light emitting sources 251 can be converted to sufficiently divergent light by the time it reaches the diffusing and reflecting sheet 253, and reflecting light 66 can be converted to almost perfectly diffused light by the diffusing and reflecting sheet 253 so as to reach the light guiding body 254 again. In the present embodiment, according to the above arrangement, the luminance distribution across the light outgoing surface 254b of the light guiding body 254 was satisfactory with (max/min)=1.6 in the normal direction.

As has been discussed, according to the present embodiment, by providing more than one dot light emitting source 251 on the end surface (surface 245g) opposing the light incident surface (light incident surface 254a) of the light guiding body 254, and diffusing light emitted therefrom by the diffusing means (diffusing and reflecting sheet 253) provided on the light incident surface 254a so as to allow the light go into the light incident surface 254a again, thereby making it possible to convert light emitted from each dot light emitting source to light in the linearly emitting state with less light irregularity. Consequently, a compact front light system having a small light-dark difference in luminance can be obtained.

The present embodiment described the arrangement, by which the diffusing and reflecting sheet 253 is provided on the light incident surface 254a of the light guiding body 254. However, the present invention is not limited to the foregoing. For example, a similar effect can be attained when a reflecting plate (converting means, reflecting means) 273 is provided onto the light incident surface 254a of the light guiding body 254 as shown in FIGS. 26(a) and 26(b).

Figure 26:
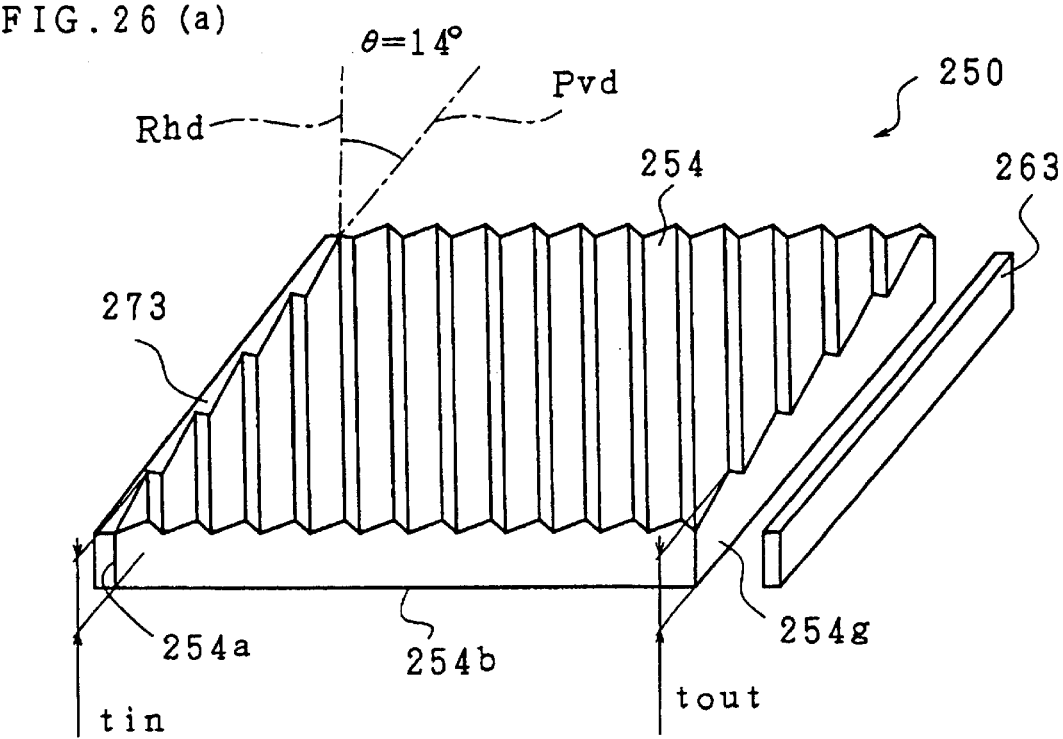
Figure 26:
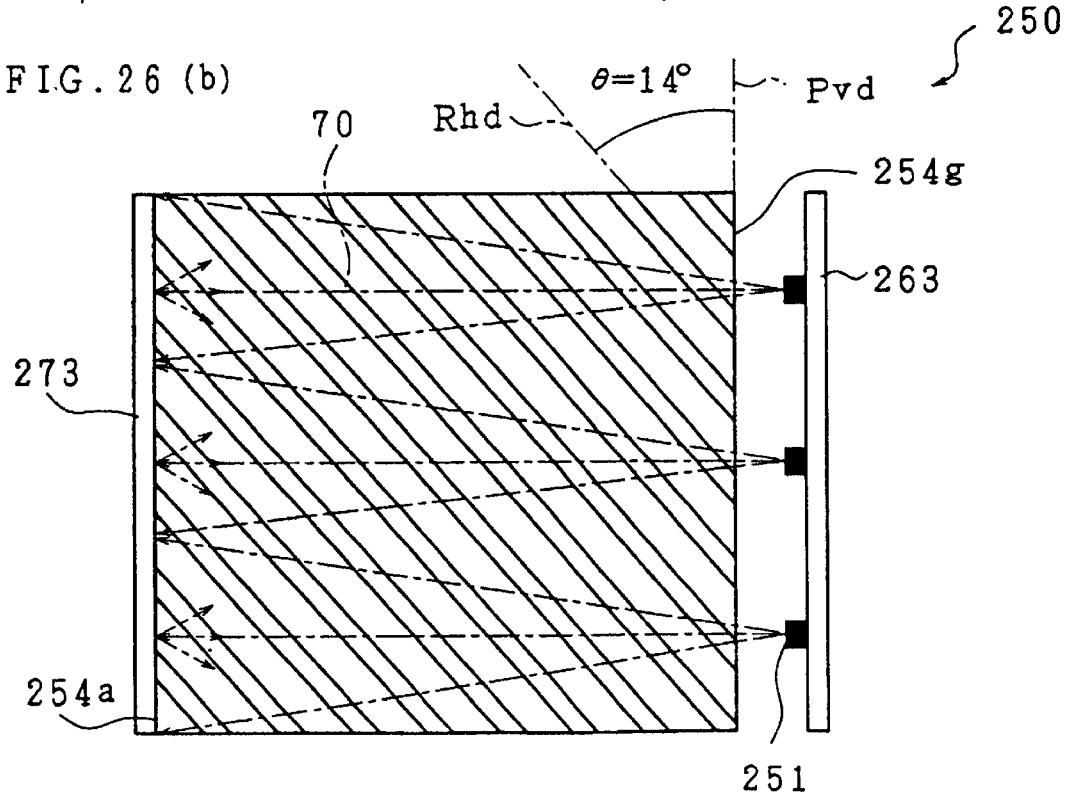

In case that the reflecting plate 273 is provided onto the light incident surface 254a of the light guiding body 254, as shown in FIGS. 26(a) and 26(b), light 70 emitted from each dot light emitting source 251 is converted into sufficiently divergent incident light by the time it is reflected by the reflecting plate 273, thereby allowing the light 70 to reach the incident surface 254a of the light guiding body 254.

According to the above arrangement, compared with the arrangement, by which the diffusing means is provided onto the light incident surface 254a of the light guiding body 254, attenuation in a quantity of reflected light is small, and a light-dark difference in luminance is reduced to (max/min)=1.4 or less. Consequently, a brighter front light system can be obtained.

As has been discussed, according to the present embodiment, by providing more than one dot light emitting source 251 onto the end surface (surface 254g) opposing the light incident end surface (light incident surface 1254a) of the light guiding body 254, and providing the diffusing means (diffusing and reflecting sheet 253 of FIG. 25(a)) or reflecting means (reflecting plate 273 of FIG. 25(a)) on the light incident end surface of the light guiding body 254, light emitted from each dot light emitting source 251 can be diffused more efficiently, thereby making it possible to obtain bright front light 250 and reflecting liquid crystal display having a small light-dark difference in luminance.

Embodiment 5

The following will describe still another example in accordance with Embodiment 5 of the present invention with reference to the accompanied drawings.

Hereinafter, like components are labeled with like reference numerals with respect to Embodiments 1–4, and the description of these components is not repeated for ease of explanation.

Figure 27:
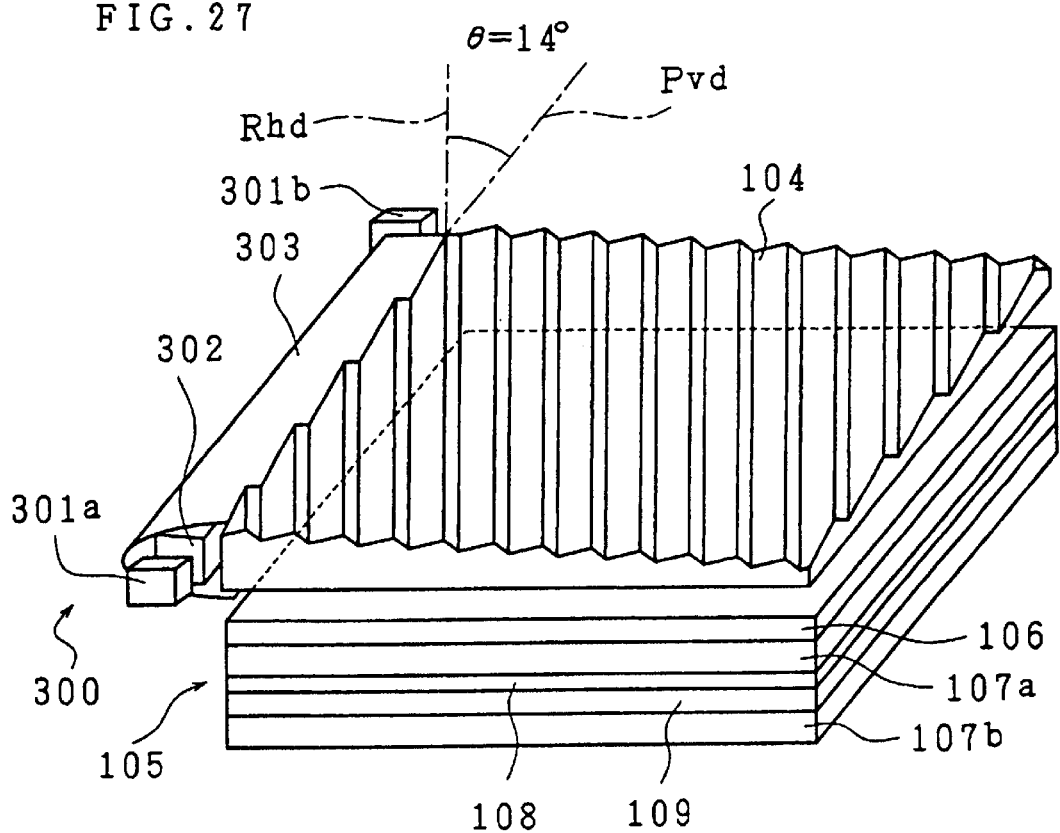
FIG. 27 is a view illustrating an arrangement of a reflecting liquid crystal display element and a front light used in Embodiment 5 of the present invention.

FIG. 27 is a view showing a reflecting liquid crystal display composed of a front light (lighting system) 300 used in the present embodiment and the reflecting liquid crystal display element 105.

As shown in the drawing, the reflecting liquid crystal display of the present embodiment is arranged in the same manner as its counterpart in Embodiment 1 except that a linear light guiding body (lighting element) 302 has a different shape, and dot light emitting sources (white LEDs, light source units) 301a and 301b are provided in a different manner.

Figure 28:
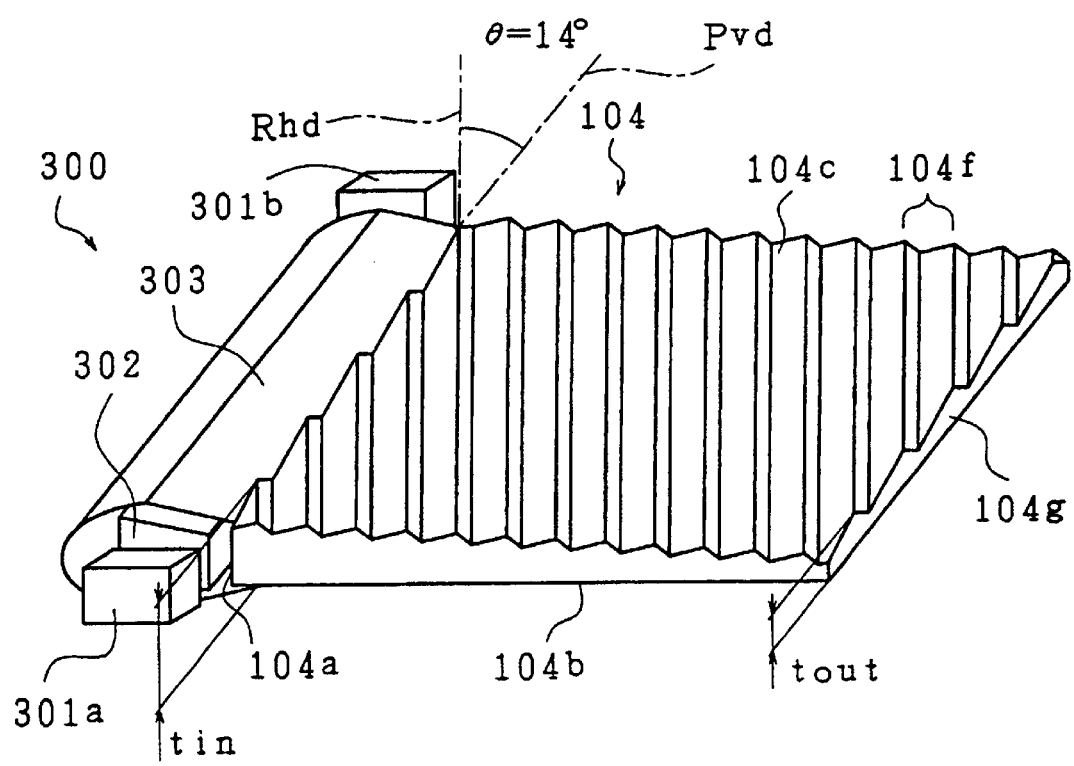
FIG. 28 is a view illustrating an arrangement of the front light used in Embodiment 5 of the present invention.

FIG. 28 is a view showing the shape and position of the front light 300 of the present embodiment. As shown in the drawing, the front light 300 is composed of the dot light emitting sources 301a and 301b, linear light guiding body 302, a diffusing and reflecting sheet (diffusing means) 303, and the light guiding body 104.

Figure 29:
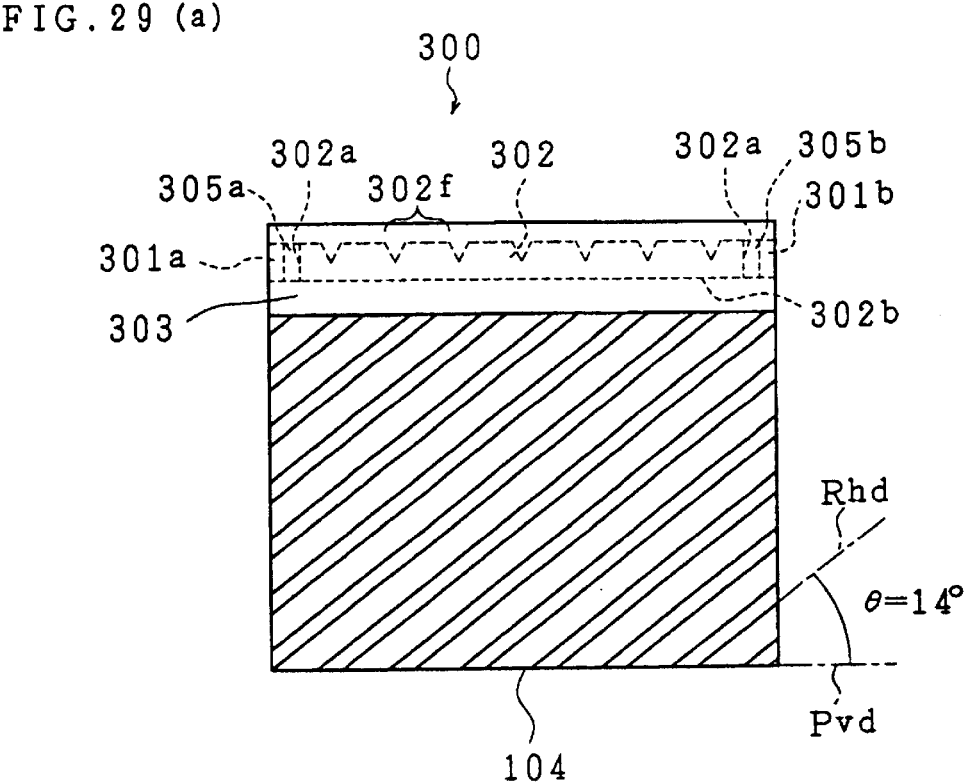
FIG. 29(a) is a plan view illustrating the light guiding body for use in the front light used in Embodiment 5 of the present invention.
FIG. 29(b) is a side view illustrating the light guiding body for use in the front light in Embodiment 5 of the present invention.
Figure 29:
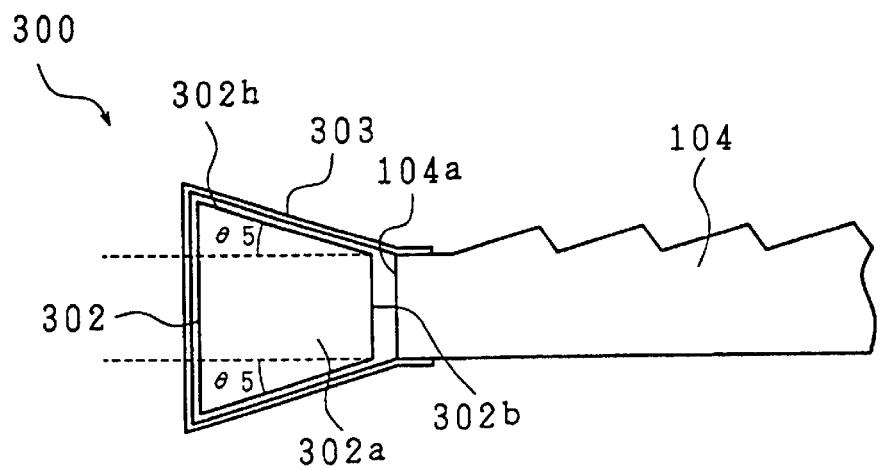

Next, the following will describe in detail the front light 300 used in the present embodiment with reference to FIGS. 29(a) and 29(b). As shown in FIG. 29(a), in the present embodiment, white LEDs (commercially known as NSCW 100 of Nichia Corporation) are used as the dot light emitting sources 301a and 301b, and provided at the end of the light incident surface 302a of a light guiding body 302 described below. Also, a space between the linear guiding body 302 and dot light emitting sources 301a and 301b is filled with UV curable resins (optical matching means, matching means, adhesive resin) 305a and 305b for optical matching. To be more specific, the UV curable resin (commercially known as LO-812 of Loctite (Japan) Corporation) is dropped in a space between the linear guiding body 302 and dot light emitting sources 301a and 301b, and UV rays are irradiated at 1 J/cm$^2$ to cure the UV curable resin. The refractive index n1 of each of the UV curable resins 305a and 305b is 1.52.

Figure 30:
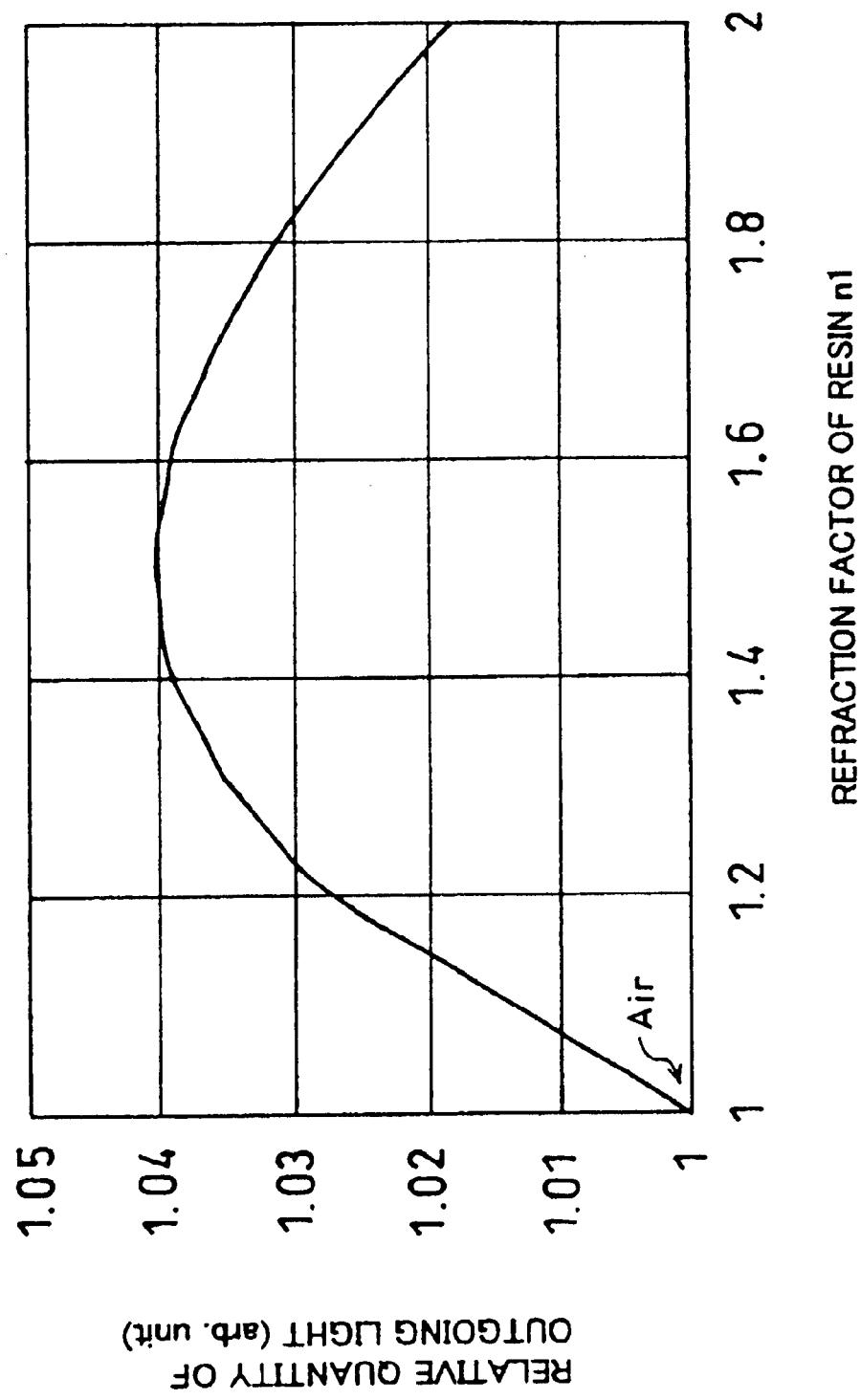
FIG. 30 is an explanatory view illustrating a quantity of outgoing light from a linear light guiding body that varies with a refractive index of resin in Embodiment 5 of the present invention.

FIG. 30 shows a relation of the refractive index n1 of the UV curable resins 305a and 305b (FIG. 29(a)) versus a quantity of outgoing light from the linear light guiding body 302 (FIG. 29(a)).

FIG. 30 reveals that, compared with a case where the UV curable resins 305a and 305b are not provided (that is, when the light emitting sources 301a and 301b are provided onto the linear light guiding body 302 with an air layer therebetween (Air)n0=1.00), a quantity of outgoing light increases when optical matching treatment is applied. In the present embodiment, the UV curable resins 305a and 305b having the refractive index n1=1.52 are used as optical matching means to attain the highest utilization of outgoing light. It should be appreciated, however, that, the present invention is not limited to the foregoing. More specifically, the inventors of the present invention discovered that although the maximum quantity of outgoing light varies with the kinds of the linear light guiding body 302, a sufficient quantity of outgoing light for practical use can be obtained with any kind of linear light guiding body 302 if the UV curable resins 305a and 305b maintain the refractive index n1 in a range from 1.40 to 1.70. If the UV curable resins 305a and 305b having the refractive index n1 of 1.40 or lower, or 1.70 or higher are used, surface reflection increases at the interface between the UV curable resins 305a and 305b and the linear light guiding body 302, thereby reducing a quantity of an outgoing light.

As has been discussed, by conducting optical matching, interface reflection can be reduced by approximately 4% compared with a case where the dot light emitting sources 301a and 301b and linear light guiding body 302 are provided with an air layer therebetween.

In addition, by realizing optical matching by using adhesive resin having a refractive index n ranging from 1.4 to 1.7 both inclusive, light emitted from each of the dot light emitting sources 301a and 301b with a sufficient quantity can be guided to the light guiding body in the linear light guiding body 302 at a low cost and high productivity.

Next, the following will describe the shape of the light incident surface 302a of the linear light guiding body 302 used in the present embodiment with reference to FIG. 29(b).

FIG. 29(b) is a side elevation of the linear light guiding body 302 and light guiding body 104 seen from the dot light emitting source 301a (FIG. 29(a)). In addition, the surface of the linear light guiding body 302 that opposes the light incident surface 302a at the dot light emitting source 301a side, that is, the surface at which the dot light emitting source 301b is provided, is assumed as the light incident surface 302a.

As shown in FIG. 29(b), in the present embodiment, a tapering treatment 302h is applied by making the light incident surface 302a of the linear light guiding body 302 trapezoidal. More precisely, 1.2 mm is given as the thickness of the light outgoing surface 302b of the linear light guiding body 302, so that the light outgoing surface 302b is substantially as thick as the light incident surface 104a of the light guiding body 104. Also, the tapering treatment 302h is applied such that 7.6° is given to the angle θ5 when the surface opposing the light outgoing surface 302b of the linear light guiding body 302 is 2.0 mm thick.

Here, the angle θ5 is an angle formed between the normal direction of the light outgoing surface 302b of the linear light guiding body 302 with the plane applied with the taper treatment 302h.

As has been explained, by applying the tapering treatment 302h to the light incident surface 302a of the linear light guiding body 302, incident light emitted m from each of the dot light emitting sources 301a and 301b can be directed to reach the light outgoing surface 302b effectively, even when the dot light emitting sources 301a and 301b (FIG. 29(a)) are larger than the end of the light incident surface 302a of the linear light guiding body 302. Consequently, a bright front light 300 can be provided.

In other words, a larger light receiving angle can be given to light that has reached to the light incident surface 302a formed on the linear light guiding body 302, thereby reducing a loss of the incident light.

In the present embodiment, the tapering treatment 302h is applied to the both ends of the light incident surface 302a of the linear light guiding body 302. However, if there is a restriction as to the outer size of the linear light guiding body 302, the tapering treatment can be applied to either end alone. Also, the angle θ5 of the tapering treatment 302h is not limited to the value used herein, and light can be directed to reach the light outgoing surface 302b of the linear light guiding body 302 effectively if the angle θ5 is larger than 0° and not larger than 20°.

However, if the angle θ5 exceeds 20°, light reflected by the cyclic structures 302f formed on the linear light guiding body 302 exceeds a total reflecting angle at the tapered portion (a portion applied with the tapering treatment 302h). Consequently, light can not be guided to the light outgoing surface 302b as effective as discussed above, thereby reducing the effect.

As has been discussed, by making the thickness of the light outgoing surface 302b of the linear light guiding body 302 substantially equal to the thickness of the light incident surface 104a of the light guiding body 104, and applying the tapering treatment 302h at the angle θ5 in a range, $0°<θ5≦20°$, light emitted from the dot light emitting sources 301a and 301b can go into the linear light guiding body 302 effectively, and reach the light incident surface 104a of the light guiding body 104.

Figure 31:
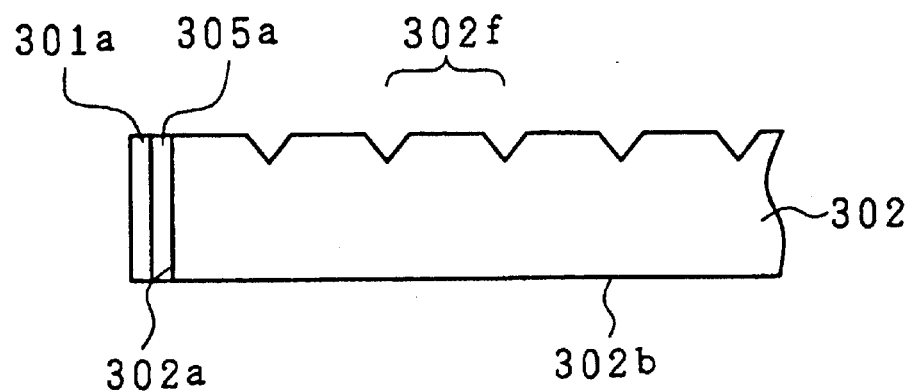
FIG. 31(a) is a side view of the linear light guiding body used in Embodiment S of the present invention.
FIG. 31(b) is a view illustrating in detail a propagating portion and a reflecting portion of the linear light guiding body used in Embodiment 5 of the present invention.
Figure 31:
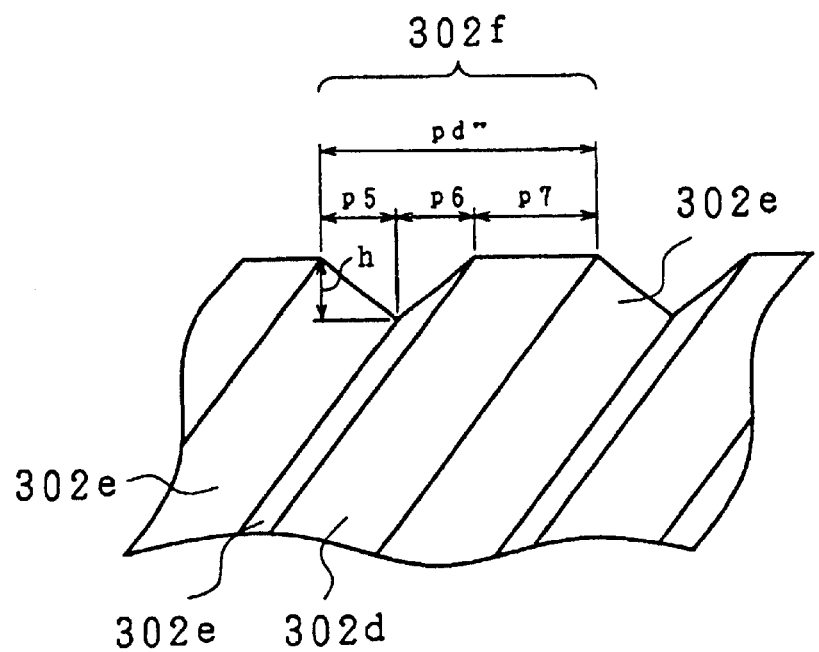

Next, the following will description will describe the shape of the linear light guiding body 302 in the front light 300 (FIG. 28) of the present embodiment with reference to FIGS. 31(a) and 31(b).

As shown in these drawings, the linear light guiding body 302 used in the present embodiment is provided on the surface opposing the light outgoing surface 302b in such a manner that the propagating portion 302d and reflecting portion 302e are formed periodically in alternate order (thereby forming the cyclic structures 302f). Here, the linear light guiding body 302 is designed such that 200 µm is given as the pitch Pd", and the tilting angle of the reflecting portion 302e increases in the vicinity of the light incident surface 302a, and decreases at the center. More specifically, in the vicinity of the light incident surface 302a, the reflecting portion 302e forms an isosceles triangle with the widths P5 and P6 of 15 µm each (therefore, leaving 170 µm as the width P7 of the propagating portion 302d) and a height h of 15 µm. On the other hand, at the center, the reflecting portion 302e forms another isosceles triangle with the widths P5 and P6 of 18 µm each (therefore, leaving 164 µm as the width P7) and the height h of 15 µm. As has been discussed, by designing such that the tilting angle of the reflecting portion 302e decreases in the center, light can go out from the linear light guiding body 302 in a uniform manner.

Figure 32:
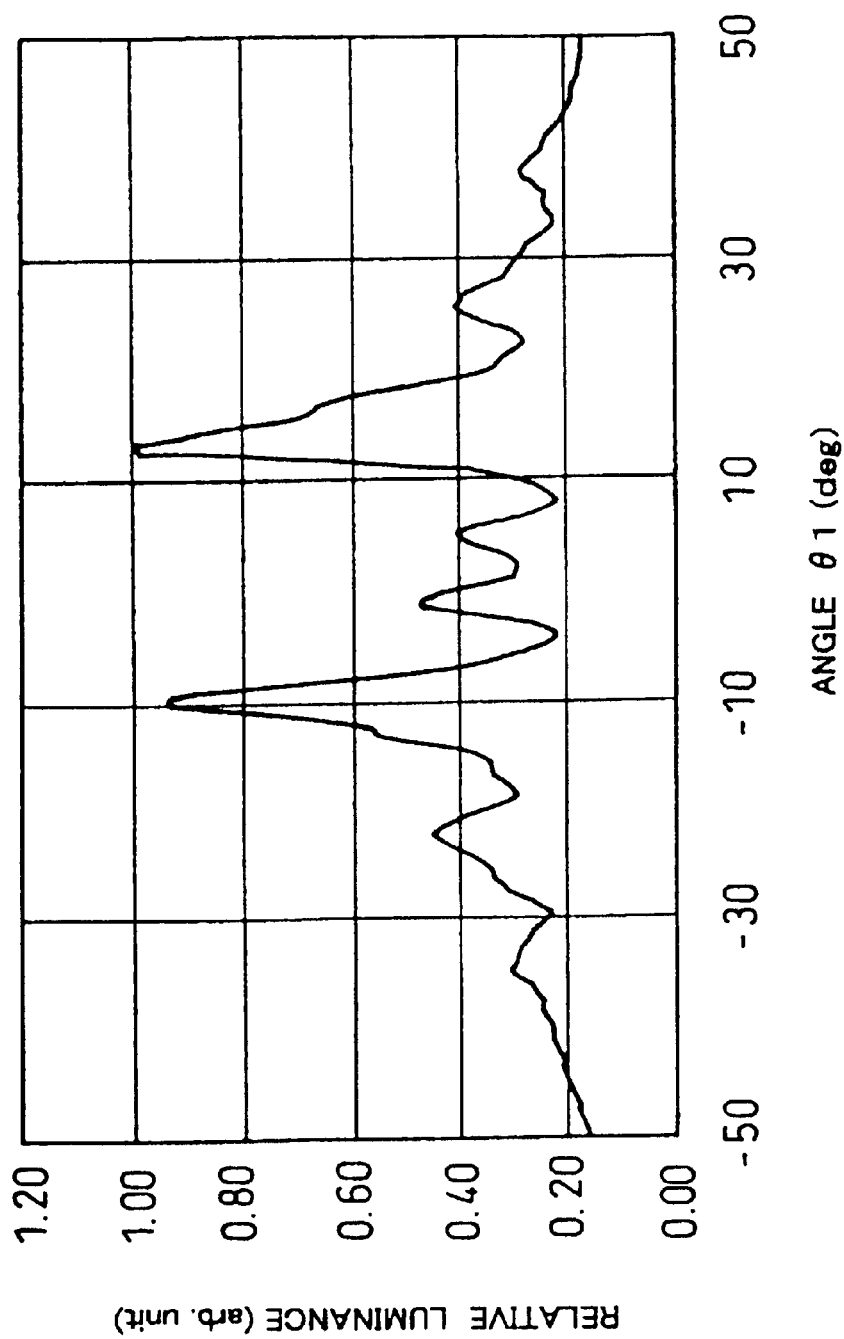
FIG. 32 is a view illustrating a light emitting state of the linear light guiding body used in Embodiment 5 of the present invention.

FIG. 32 shows an angular distribution of the outgoing light at the center of the light outgoing surface 302b in the linear light guiding body 302 having the foregoing design.

FIG. 32 reveals that the outgoing light from the linear light guiding body 302 has the peak value in the direction in which θ1 is 15° (first outgoing direction) and the outgoing light intersects substantially at right angles with the angle θ=14° given to each cyclic structure 104f formed on the light guiding body 104 (refractive index n=1.49). In addition, the luminance distribution across the light outgoing surface 302b of the linear light guiding body 302 is not greater than (max/min)=1.50 in the normal direction and the peak value direction, and a satisfactory linearly emitting state can be obtained.

Strictly speaking, the peak value direction of the outgoing light from the linear light guiding body 302 (direction in which θ1 is 15°) is slightly shifted from the direction that intersects at the right angles with the angle θ=14° given to each cyclic structure 104f formed on the light guiding body 104. The peak value direction does not necessarily be in the direction that intersects at right angles with the angle θ=14° given to each cyclic structure 104f, and a sufficient effect can be obtained if the former shifts from the latter slightly (±10°).

As has been explained, in the present embodiment, by providing the cyclic structures 302f on the linear light guiding body 302 (FIGS. 29(a) and 29(b) and FIGS. 31(a) and 31(b) when necessary), light emitted form each of the dot light emitting sources 301a and 301b can be converted into light in the linearly emitting state effectively. In addition, by providing the UV curable resins (optical matching means) 305a and 305b in a space between the light incident surface 302a of the linear light guiding body 302 and dot light emitting sources 301a and 301b, a quantity of outgoing light can be increased by improving incidence efficiency. Consequently, a bright front light 300 can be provided.

In addition, by applying the tapering treatment 302h to the light incident subrace 302a of the linear light guiding body 302, light reflected from the cyclic structures 302f can be directed to reach the light outgoing surface 302b effectively even if the dot light emitting sources 301a and 301b larger than the light incident surface 302a of the linear light guiding body 302 are provided.

Embodiment 6

The following will describe still another example in accordance with Embodiment 6 of the present invention.

Hereinafter, like components are labeled with like reference numerals with respect to Embodiments 1–5, and the description of these components is not repeated for ease of explanation.

Figure 33:
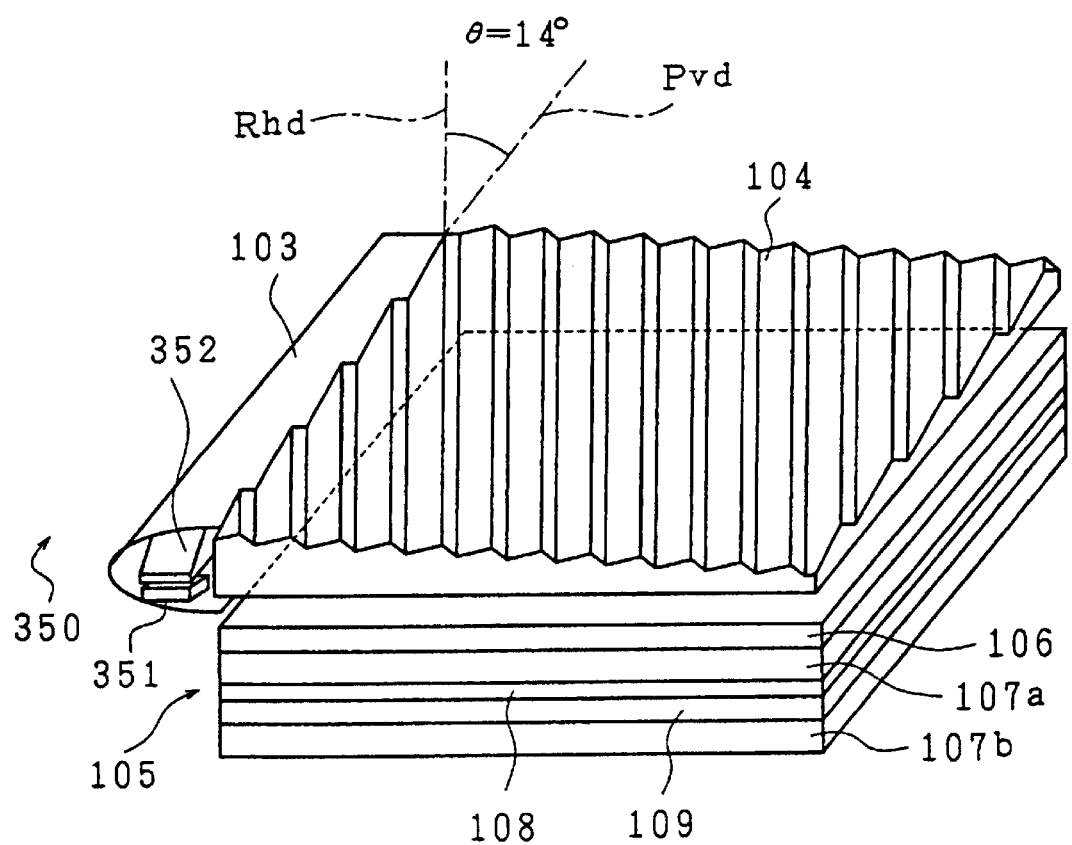
FIG. 33 is a view illustrating an arrangement of a reflecting liquid crystal display element and a front light used in Embodiment 6 of the present invention.

FIG. 33 is a view depicting a reflecting liquid crystal display composed of a front light (lighting system) 305 used in the present embodiment and the reflecting liquid crystal display element 105.

As shown in the drawing, the reflecting liquid crystal display of the present embodiment is arranged substantially in the same manner as its counterpart of Embodiment 5 except that the shape of a linear light guiding body (lighting element) 352 and the position of a dot light emitting source (white LED, light source unit) 351 are different.

Figure 34:
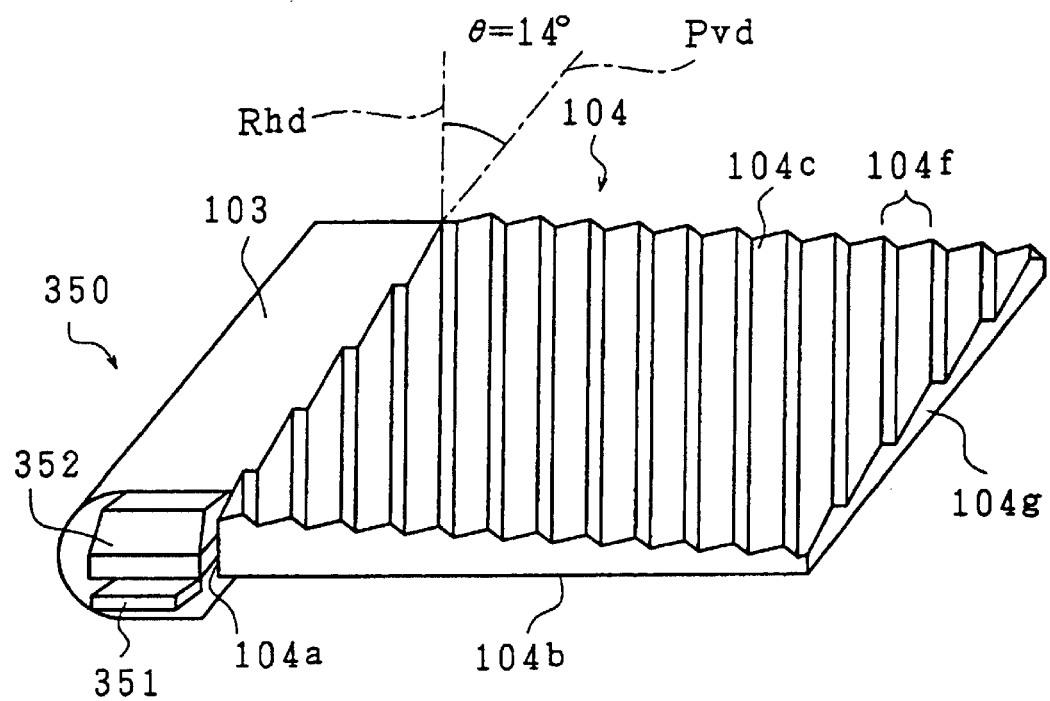
FIG. 34 is a view illustrating an arrangement of the front light used in Embodiment 6 of the present invention.

FIG. 34 is a view showing the shape and position of the front light 350 used in the present embodiment. As shown in the drawing, the front light 350 is composed of the dot light emitting source 351, linear light guiding body 352, diffusing and reflecting sheet 103, and light guiding body 104. In the present embodiment, the dot light emitting source 351 is provided at the bottom surface of the linear light guiding body 352 by taking the advantage of 1.5-mm-thick reflecting liquid crystal display element 105 (FIG. 33). Consequently, a compact front light 350 can be provided.

Figure 35:
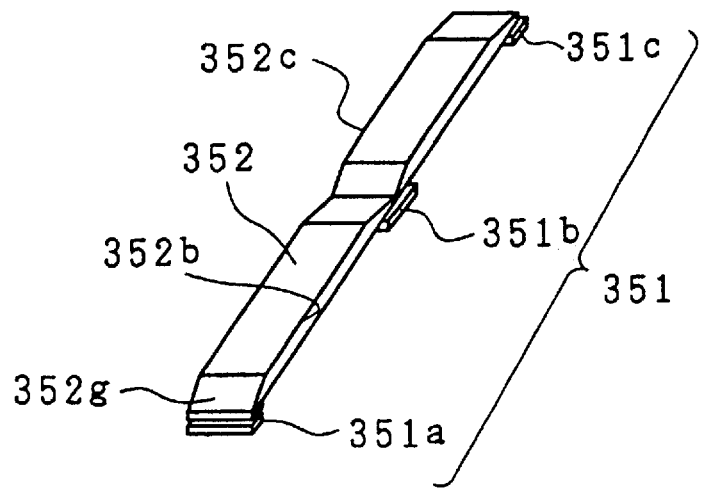
FIG. 35(a) is a perspective view of the linear light guiding body used in Embodiment 6 of the present invention.
FIG. 35(b) is a plan view illustrating a light guiding body for use in a front light used in Embodiment 6 of the present invention.
Figure 35:
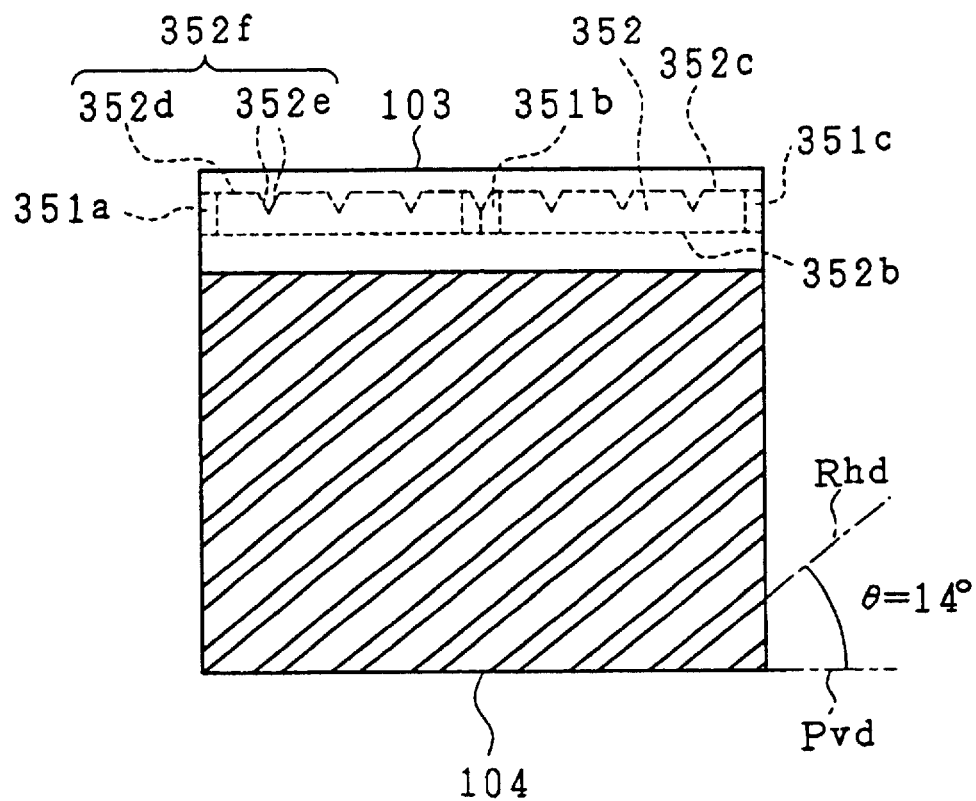
Figure 36:
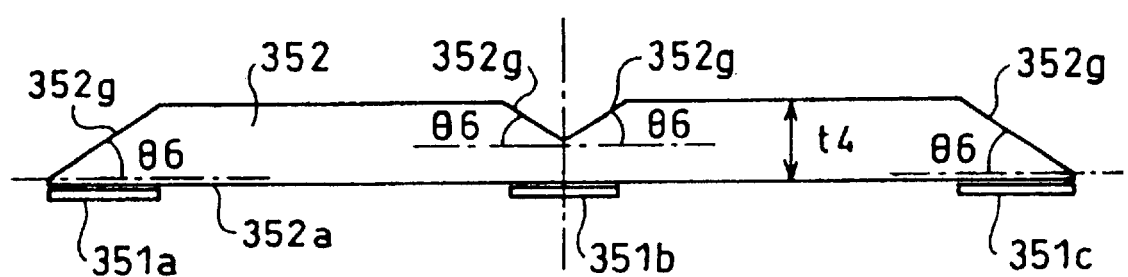
FIG. 36(a) is a front view of the linear light guiding body used in Embodiment 6 of the present invention.
FIG. 36(b) is a side view of the linear light guiding body used in Embodiment 6 of the present invention.
Figure 36:
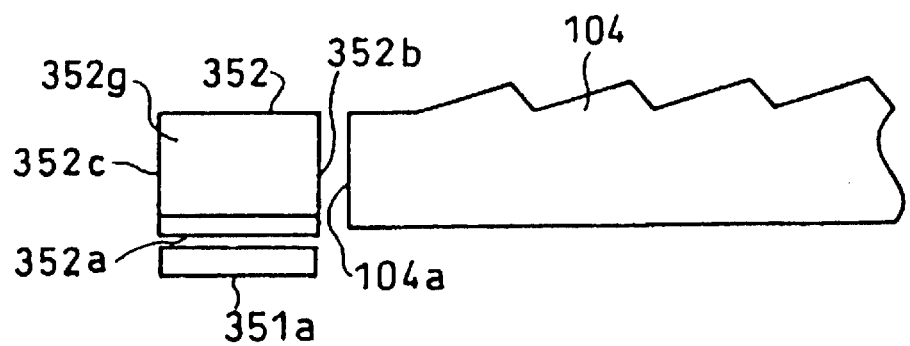

Next, the following will describe in detail the front light 350 used in the present embodiment with reference to FIGS. 35(a) and 35(b) and FIGS. 36(a) and 36(b). FIG. 35(a) is a perspective view showing the positions of the linear light guiding body 352 and dot light emitting source 351 used in the present embodiment. In the present embodiment, three of the dot light emitting sources 351 (dot light emitting sources 351a, 351b, and 351c) are provided at the bottom surface (light incident surface 352a) of the linear light guiding body 352. FIG. 35(b) is a plan view showing the positions of the linear light guiding body 352 and light guiding body 104 used in the present embodiment, and FIG. 36(b) is a side elevation of the linear light guiding body 352 and light guiding body 104. A propagating portion 352d and a reflecting portion 352e are repetitively formed in alternate order on the surface 352c opposing the light outgoing surface 352b of the linear light guiding body 352 (cyclic structures 352f). The shape of the repetitive propagating portion 352d and reflecting portion 352e is the same as the shape of the repetitive reflecting portion 302e and propagating portion 302d (cyclic structures 302f) used in Embodiment 5 above (FIG. 31(b)).

As shown in FIG. 36(a), a cross section of the linear light guiding body 352 is tapered. More specifically, a tapered portion (reflecting portion) 352g having an angle θ6=45% is formed at each end of the linear light guiding body 352 when the thickness t4 of its light outgoing surface 352b is 2 mm. In addition, a tapered portion 352g having the angle θ6=45° is formed at the center in such a manner that the optical axis of the dot light emitting source 351b overlaps the center of the tapered portion 352g. By forming the tapered portions 352g in this manner, incident light from the dot light emitting source 351 provided at the bottom surface of the linear light guiding body 352 is reflected at the tapered portions 352g, so that it can be directed to reach the propagating portion 352d and reflecting portion 352e effectively.

In addition, by providing a greater number of tapered portions 352g in the linear light guiding body 352, the number of light sources can increase when the screen size increases, thereby making it possible to provide a bright front light 350.

If a metal reflecting film is formed on the surface forming the taper, light emitted from the dot light emitting source 351 can go into the linear light guiding body 352 efficiently.

As has been discussed, in the present embodiment, by forming a reflecting surface (tapered portions 352g) on the light incident surface 352a of the linear light guiding body 352 in such a manner that incident light from the dot light emitting source 351 is reflected toward the cyclic structures 352f formed on the liner light guiding body 352, the number of the dot light emitting source 351, which used to be limited up to two, can be increased in accordance with the screen size, thereby making it possible to provide a bright front light 350.

Embodiment 7

The following will describe still another example in accordance with Embodiment 7 of the present invention.

Hereinafter, like components are labeled with like reference numerals with respect to Embodiments 1–6, and the description of these components is not repeated for ease of explanation.

Figure 37:
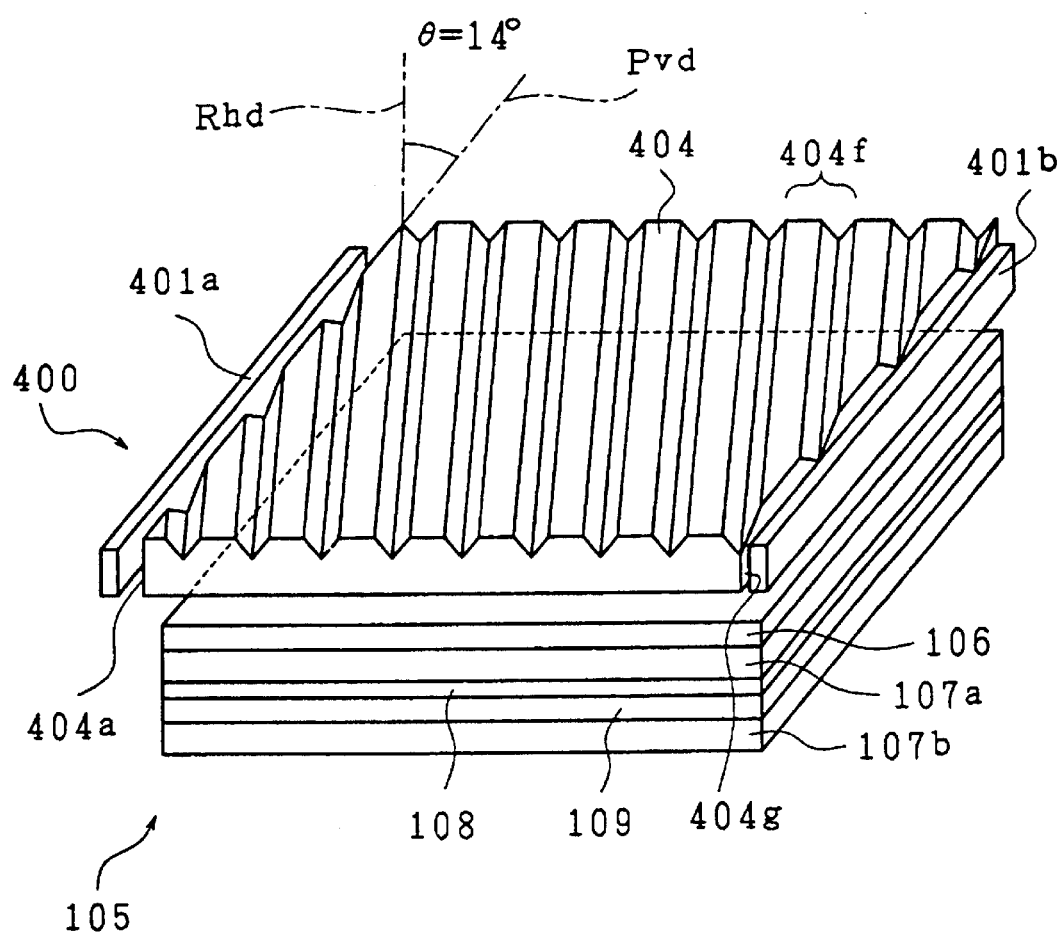
FIG. 37 is a view illustrating an arrangement of a reflecting liquid crystal display element and a front light used in Embodiment 7 of the present invention.

FIG. 37 is a view showing a reflecting liquid crystal device composed of a front light (lighting system) 400 used in the present embodiment and the reflecting liquid crystal display.

Figure 38:
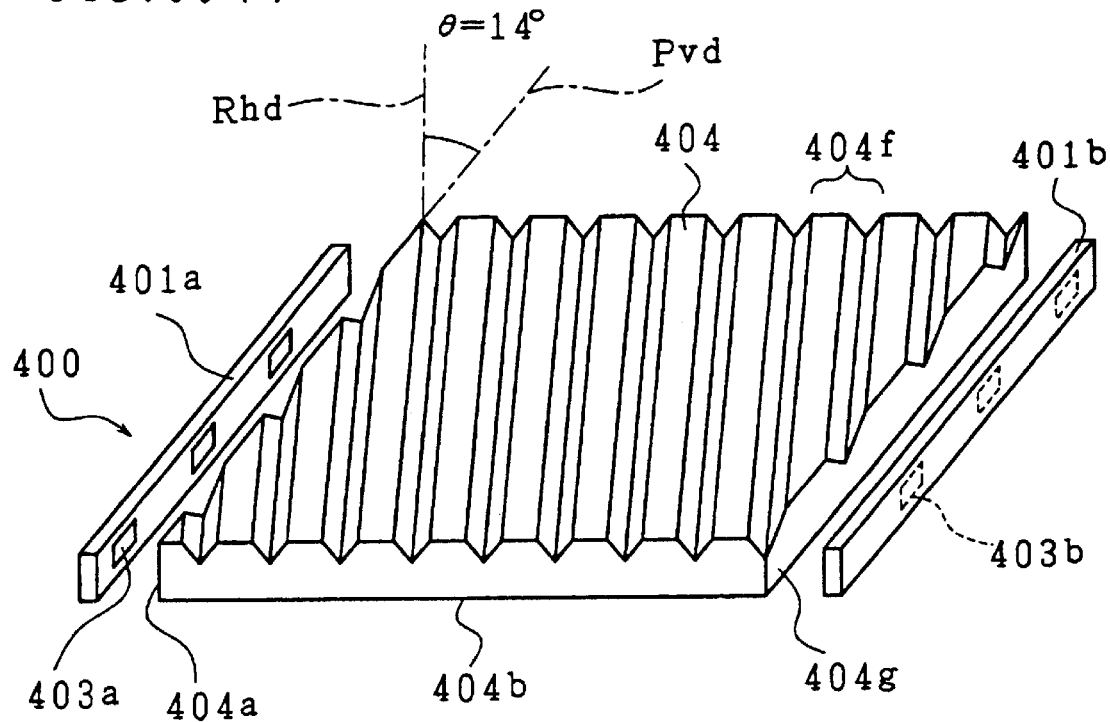
FIG. 38(a) is a view illustrating an arrangement of the front light used in Embodiment 7 of the present invention.
FIG. 38(b) is a view illustrating in detail a propagating portion and a reflecting portion of a light guiding body used in Embodiment 7 of the present invention.
Figure 38:
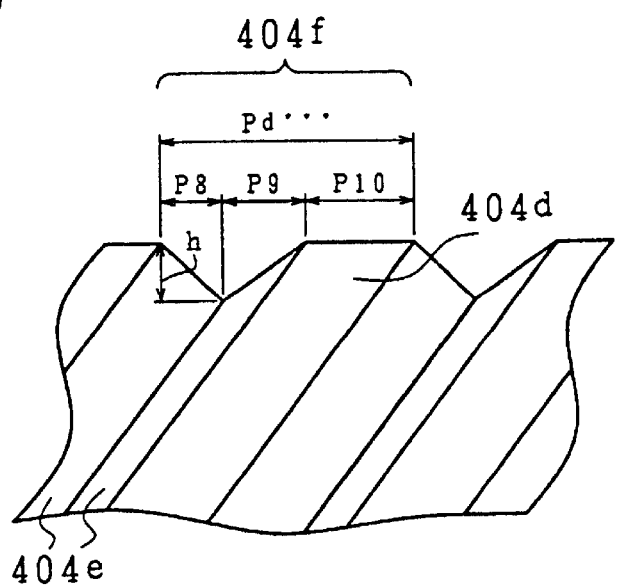
Figure 39A:
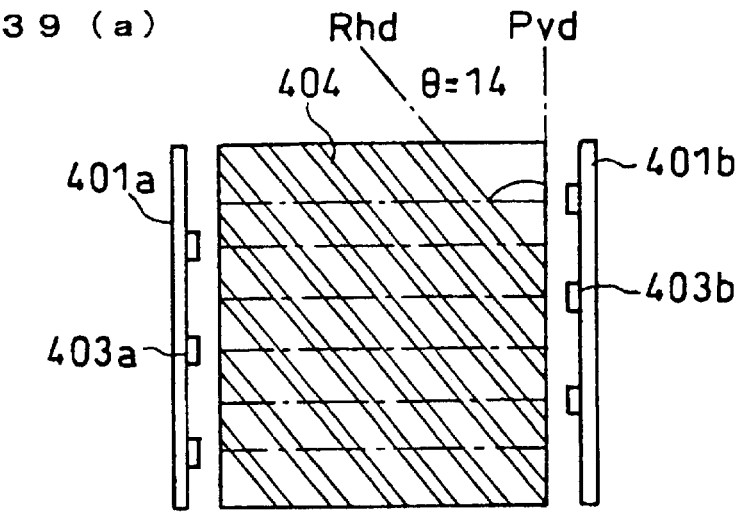
FIG. 39(a) is a plan view illustrating positions of the light guiding body and a light source used in Embodiment 7 of the present invention.

As shown in FIG. 38(a), the front light 400 used in the present embodiment, a first LED array 401a provided with three LEDs and a second LED array 401b also provided with three array are provided on a light incident surface 404a and a surface 404g opposing the light incident surface 404a of a light guiding body (planar light guiding body) 404, respectively. As shown in FIG. 39(a), the first LED array 401a and second LED array 401b are provides in such a manner that an LED 403a and an LED 403b are positioned in a staggered manner.

In other words, the light guiding body 404 has two opposing light incident surfaces: the light incident surface 404a and the surface 404g opposing the light incident surface 404a.

Next, the following will describe the shape of a propagating portion 404d and a reflecting portion 404e (the shape of each cyclic structure 404f) of the light guiding body 404 of the present embodiment with reference to FIGS. 38(a) and 38(b). As shown in the drawings, 390 µm is given to the propagating portion 404d and reflecting portion 404e as a pitch Pd''', and an isosceles triangle is formed by giving 5 µm to each of the widths P8 and P9 of the reflecting portion 404e and 0.5 µm to the height h. By forming the isosceles in the reflecting portion 404e of the light guiding body 404, incoming light from the light incident surface 404a side and incoming light from the surface 404g side opposing the light incident surface 404a can be directed to reach the reflecting liquid crystal display element 105 (FIG. 37) in a uniform manner.

It should be appreciated that the surface 404b is the surface of the light guiding body 404 opposing the surface on which the propagating portions 404d and reflecting portions 404e are formed.

Next, the following will describe a driving method of the foregoing LED arrays 401a and 401b.

Figure 39B:
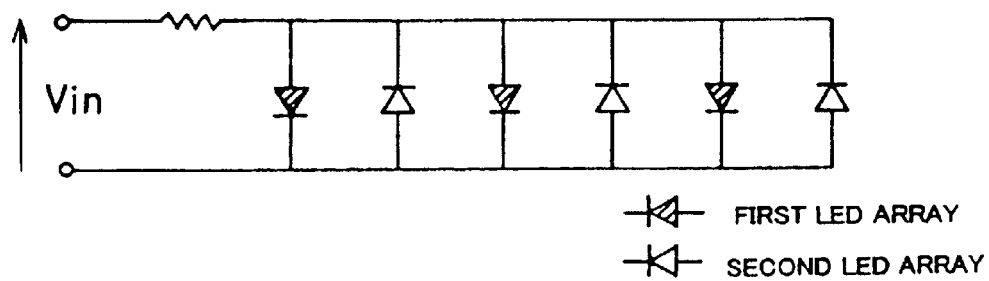
FIG. 39(b) is a wiring diagram of the light source used in Embodiment 7 of the present invention.
Figure 39C:
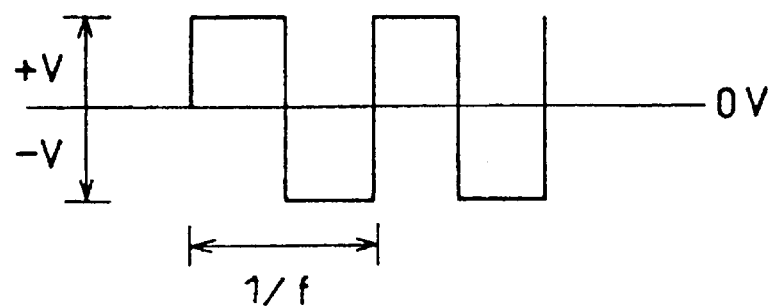
FIG. 39(c) is a diagram of input signals to the light source used in Embodiment 7 of the present invention.

FIG. 39(b) is a connection diagram of the first LED array 401a and second LED array 401b. As shown in FIG. 39(b), the first LED array 401a and second LED array 401b are connected in such a manner so as to have opposite polarities. In addition, signals shown in FIG. 39(c) are applied to the LED array 401a and 401b.

In the present embodiment, by using an input signal having a frequency f=120 Hz and applying ±5V to a voltage Vin, the first LED array 401a and second LED array 401b are operated to emit light in turn.

In this manner, by switching ON the LED arrays 401a and 401b respectively displayed on the light incident surface 404a and the surface 404g opposing the light incident surface 404a of the light guiding body 404 (FIG. 38(a)) in turn, the occurrence of irregularity of light emitted from the LEDs 403a and 403b can be controlled.

In addition, by lighting the light on a frequency of 60 Hz or above, the occurrence of unwanted flickers can be prevented. The flicker of the light can be prevented by increasing the lighting frequency, but power consumption undesirably increases with increasing frequencies. For this reason, it is preferable to use the frequency of not more than 10 kHz.

As has been explained, according to the present embodiment, by providing the LED arrays 401a and 401b at the light incident surface 404a and the surface 404g opposing the light incident surface 404a of the light guiding body 404, respectively, and lighting the first LED array 401a and second LED array 401b in turn, the emitting state of each LED array can be compensated, thereby making it possible to provide the linearly emitting state with a small light-dark difference of a bright line.

It has become possible to provide a front light 400, with which the power consumption can be reduced compared with a case where the LEDs of the same number are kept turned ON, and the occurrence of unwanted flickers (recognition of flickers) can be suppressed by repetitively emitting light on a lighting frequency in a range of 60 Hz≦f≦10 kHz.

Embodiment 8

The following will describe Embodiment 8 of the present invention, while referring to the drawings.

Incidentally, the members having the same structure (function) as those in Embodiments 1 through 7 will be designated by the same reference numerals and their description will be omitted.

Figure 43:
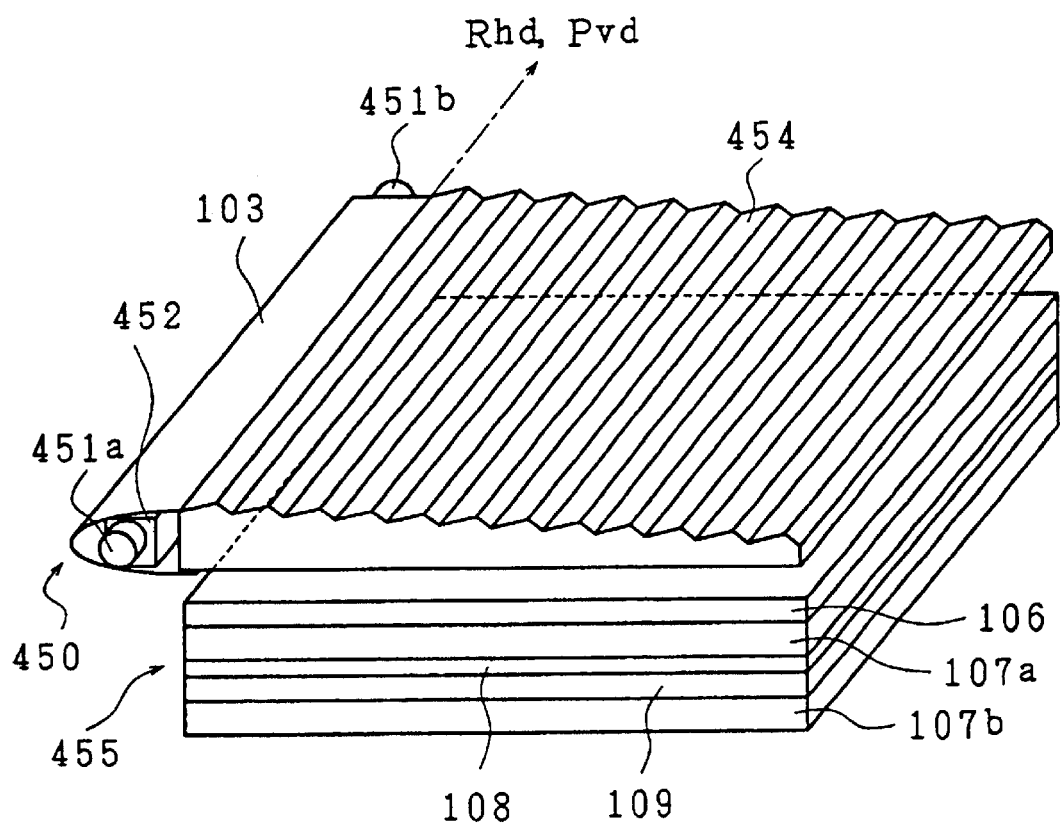
FIG. 43 is view of a reflecting liquid crystal display including a front light and a reflecting liquid crystal display element used in Embodiment 8 of the present invention.

FIG. 43 is a view illustrating a reflecting liquid crystal display composed of a front light (lighting system) 450 and a reflecting liquid crystal display element (image display element) 455 used in the present embodiment.

As shown in FIG. 43, the reflecting liquid crystal display of the present embodiment is basically arranged in the same manner as that of Embodiment 1, except that a linear light guiding body (lighting element) 452 and a light guiding body (planar light guiding body) 454 differ in shape from the corresponding ones in Embodiment 1.

Further, adapted as the reflecting liquid crystal display element 455 in the present embodiment is a 3.9-in. reflecting liquid crystal display element employing the stripe alignment in which the number of pixels in the horizontal line is 320 for each of R, G, and B colors, the number of pixels in the vertical line is 240, and the pixel pitch Ph in the horizontal direction is 0.0826 mm and the pixel pitch Pv in the vertical direction is 0.248 mm. The aspects other than those described above of the arrangement of the reflecting liquid crystal display element 455 are identical to those of the reflecting liquid crystal display element 105 of Embodiment 1 (FIG. 1).

Figure 44:
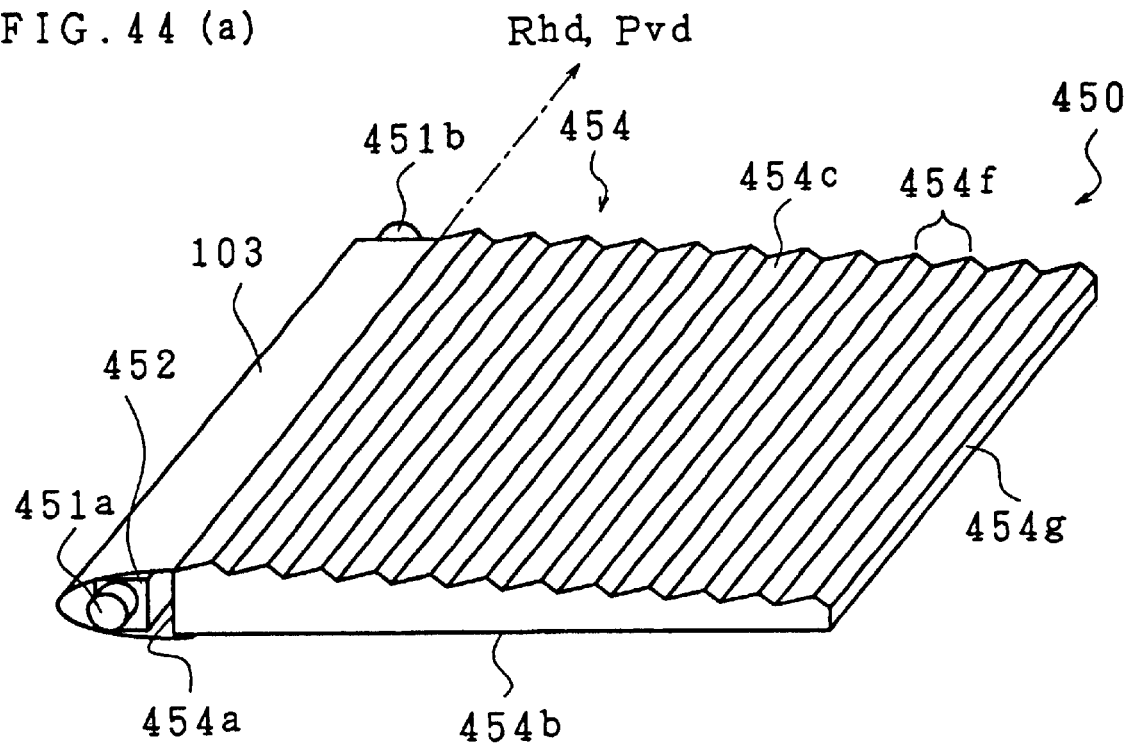
FIG. 44(a) is a perspective view illustrating the front light in the reflecting liquid crystal display shown in FIG. 43.
FIG. 44(b) is an enlarged view of a part of a light guiding body of the front light.
Figure 44:
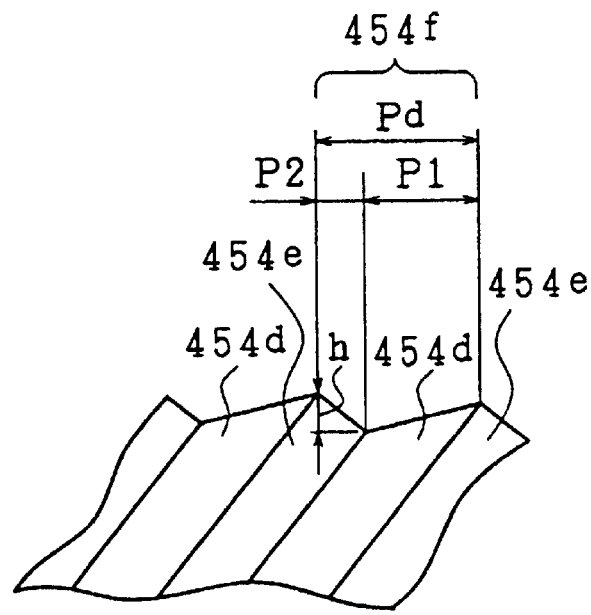

First of all, the following will describe the front light 450 in detail, while referring to FIGS. 44(a) and 44(b). FIG. 44(a) is a perspective view of the front light 450 part of the foregoing reflecting liquid crystal display, while FIG. 44(b) is an enlarged view of a part of the light guiding body 454 of the front light 450.

In the present embodiment, white LEDs (light emitting diodes) (commercially known as NSCW 100 of Nichia Corporation), used as the dot light emitting sources (light source units) 451a and 451b, are provided at a light incident surface (light incident end surface) described below of the linear light guiding body 452. Also, there is provided a diffusing and reflecting sheet 103 around the linear guiding body 452.

The light guiding body 454 is to convert light emitted in a linearly emitting state by the linear light guiding body 452 into light in a planarly emitting state. The light thus converted into the planarly emitting state by the light guiding body 454 irradiates the reflecting liquid crystal display element 455 (FIG. 43). The light guiding body 454 is provided so that a light outgoing surface of the linear light guiding body 452 that will be described later should oppose a light incident surface 454a of the linear light guiding body 452.

The light guiding body 454 is formed, for instance, by injection mold with polymethyl methacrylate. The light guiding body 454 has the light incident surface 454a, a light outgoing surface 454b, and a counter surface 454c. Here, the light outgoing surface 454b is a surface substantially perpendicular to the light incident surface 454a, while the counter surface 454c is a surface opposing the light outgoing surface 454b. Provided on the counter surface 454c are cyclic structures 454f each of which is in a prism form having a propagating portion 454d and a reflecting portion 454e. The anti-reflection treatment is applied to the light outgoing surface 454b of the light guiding body 454, like in Embodiment 1.

Furthermore, each cyclic structure 454f is shaped so that light that is emitted from the dot light emitting sources 451a and 451b, converted by the linear light guiding body 452 into a linear light emitting state, then enters the light guiding body 454 should be effectively caused to outgo to the reflecting liquid crystal display element 455 (FIG. 43) side. More specifically, a pitch Pd as a cycle of the cyclic structures 454f is set to 0.16 mm, a pitch P1 of the propagating portions 454d is set to 0.15 mm, a pitch P2 of the reflecting portions 454e is set to 0.01 mm, and a height h of the prism formed with each pair of the propagating portion 454d and the reflecting portion 454e is set to 0.01 mm.

Here, the light guiding body 454 in the present embodiment differs from the light guiding body 104 (FIG. 4(a)) in Embodiment 1, in the aspect that the vertical direction Pvd of the pixel patterns and the cyclic direction Rhd of the cyclic structure 454f are formed parallel to each other (angle θ=0). Therefore, the cyclic direction Rhd of the cyclic structure 454f is parallel to the light incident surface 454a. Besides, as in Embodiment 1, the thickness (tin) of the light incident surface 454a and the thickness (tout) of the surface 454g opposing the light incident surface 454a are set to 1.2 mm and 0.8 mm (tin=1.2 mm, and tout=0.8 mm), respectively.

Figure 45:
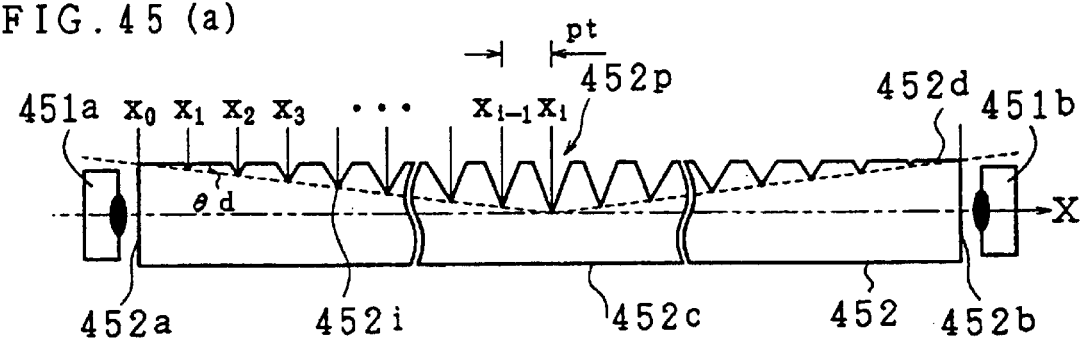
FIGS. 45(a), 45(b), and 45(c) are a plan view, a front view, and a side view illustrating an arrangement of a linear light guiding body, respectively.
FIG. 45(d) is an enlarged view of a prism-like portion of the linear light guiding body.
Figure 45:
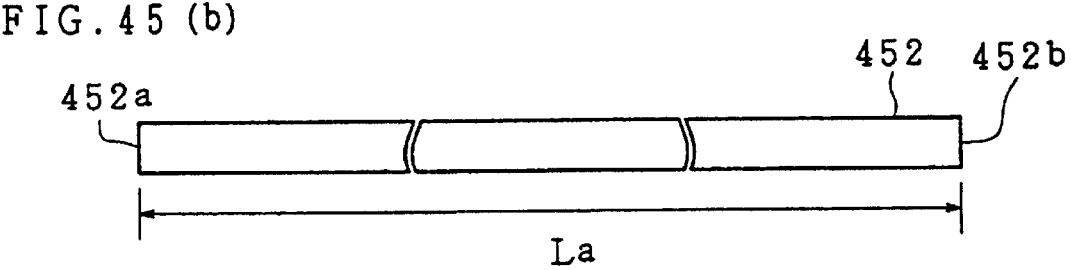
Figure 45:
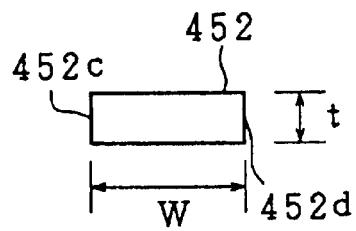
Figure 45:
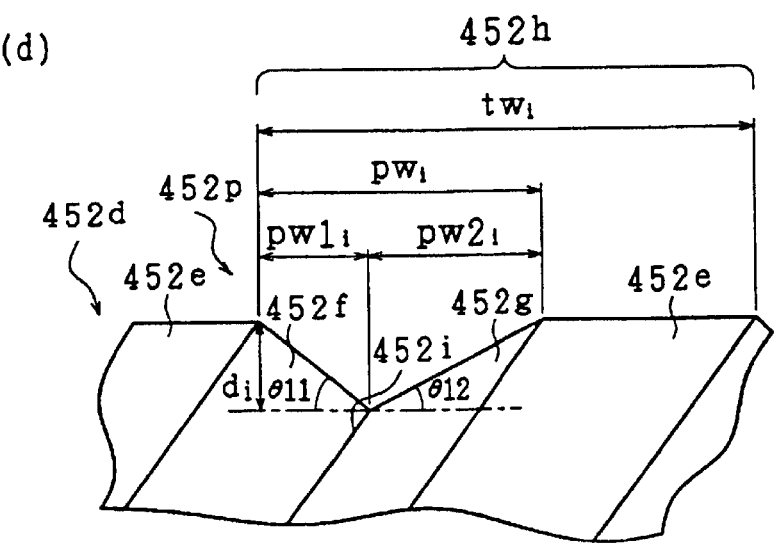

The following description will explain a structure of the linear light guiding body 452 in the present embodiment in detail, while referring to FIGS. 45(a) through 45(d). FIGS. 45(a), 45(b), and 45(c) are a plan view, a front view, and a side view illustrating the structure of the linear light guiding body 452, respectively, while FIG. 45(d) is an enlarged view illustrating a prism-like portion of the linear light guiding body 452.

Incidentally, the dot light emitting sources 451a and 451b are disposed at ends of the linear light guiding body 452, so that light in the dot emitting state that is emitted from the dot light emitting sources 451a and 451b is converted into light in the linearly emitting state upon entering the linear light guiding body 452. The linear light guiding body 452 is provided at the light incident surface 454a of the light guiding body 454 (FIG. 44(a)), and light converted into the linearly emitting state at the linear light guiding body 452 is further converted in the planarly emitting state upon entering the light guiding body 454.

The linear light guiding body 452 is produced, for instance, by forming a rectangular parallelepiped is formed by injection mold with polymethacrylate with a dimension of a length La=80 mm, a width W=3 mm, a thickness t=1 mm, as well as with a refractive index of 1.49, and appropriately processing the rectangular parallelepiped, so as to be in a form described below.

The linear light guiding body 452 has a light incident surface 452a, a light incident surface (second light incident surface) 452b, a light outgoing surface 452c, and a counter surface 452d. Here, the light incident surfaces 452a and 452b are parallel to each other. The light outgoing surface 452c is a surface vertical to the light incident surfaces 452a and 452b, while the counter surface 452d is a surface parallel to the light outgoing surface 452c. The dot light emitting sources 451a and 451b are disposed on the sides of the light incident surfaces 452a and 452b of the linear light guiding body 452. Incidentally, as to FIGS. 45(a) through 45(d), the dot light emitting sources 451a and 451b are shown only in FIG. 45(a), while omitted in the others.

Furthermore, provided on the counter surface 452d of the linear light guiding body 452 are cyclic structures 452h each of which is in a prism form having a propagating portion (flat portion) 452e and reflecting portions (tilt portion) 452f and 452g. The cyclic structures 452h are formed with a plurality of notches provided in the counter surface 452d and portions (the foregoing propagating portions 452e) between the adjacent notches in the counter surface 452d.

The reflecting portions 452f and 452g reflect a portion of light that has been emitted from the dot light emitting sources 451a and 451b, entered the light incident surfaces 452a and 452b, and propagated through the linear light guiding body 452, so that light should outgo from the light outgoing surface 452c in an appropriate direction.

A cross-sectional shape of the notch (a cross-sectional shape in a plane vertical to the light incident surfaces 452a and 452b and the light outgoing surface 452c) is an isosceles triangle whose base is positioned in a plane including the propagating portion 452e and whose apex is positioned on the light outgoing surface 452c side with respect to the foregoing plane. The two sides other than the base (the two sides having equal lengths) of the foregoing isosceles triangle correspond to the surfaces composing the reflecting portions 452f and 452g, respectively.

Here, in each notch, a surface on the side closer to the dot light emitting source 451a is the reflecting portion 452f, while a surface on the side closer to the dot light emitting source 451b is the reflecting portion 452g. The notch composed of the reflecting portions 452f and 452g is hereinafter referred to as a prism 452p. A portion corresponding to the apex of the isosceles triangle of the cross section of the prism (notch) 452p is hereinafter referred to as a trough portion 452i of the prism 452p.

Incidentally, since all of the foregoing plurality of prisms 452p are not necessarily in the same shape, as described below, strictly they are not cyclic structures, but they are herein referred to as cyclic structures 452h for conveniences' sake.

Here, the following point is defined. First of all, an X axis is taken in the lengthwise direction of the linear light guiding body 452 (direction connecting the dot light emitting source 451a and the dot light emitting source 451b, linear direction), while the direction from the dot light emitting source 451a to the dot light emitting source 451b is defined as positive direction. Besides, the foregoing prisms 452p are numbered in an order from the dot light emitting source 451a side so that each is referred to as the i'th (i=1, 2, 3, . . . ) prism 452p, while the subscript "i" of each sign referred to below is to correspond to the i'th prism 452p.

Each sign shown in FIGS. 45(a) and 45(d) is as follows. First of all, angles that the reflecting portions 452f and 452g respectively form with respect to the counter surface 452d and the light outgoing surface 452c are given as prism angles θ11 and θ12, respectively. Further, a pitch at which the foregoing prisms 452p are provided (a distance between trough portions 452i of adjacent prisms 452p) is given as pt, while a prism position of the i'th prism from the dot light emitting source 451a (position of the trough portion 452i of the prism 452p) is given as $x_i$. Incidentally, the starting point of $x_i$ is a position on the dot light emitting source 451a of the linear light guiding body 452 (an end of the linear light guiding body 452), and this position is given as $x_0$, then, $x_0$ can be defined as a position at a distance of pt in the negative direction of the X axis from $x_1$.

Then, in the i'th prism 452p, a prism height (notch depth, distance from a plane including the propagating portion 452e to the trough portion 452i) is given as $d_i$, while a prism width (notch width, width of notch in the X-axis direction) is given as $pw_i$. Further, in the prism width $pw_i$, a width (width in the X-axis direction) of the reflecting portion 452f is given as $pw1_i$, while a width (width in the X-axis direction) of the reflecting portion 452g is given as $pw2_i$. Further, a sum of a width in the X-axis direction of the propagating portion 452e between the i'th prism 452p and the (i+1)'th prism 452p and a prism width $pw_i$ of the i'th prism 452p is given as a unit width $tw_i$.

Figure 59:
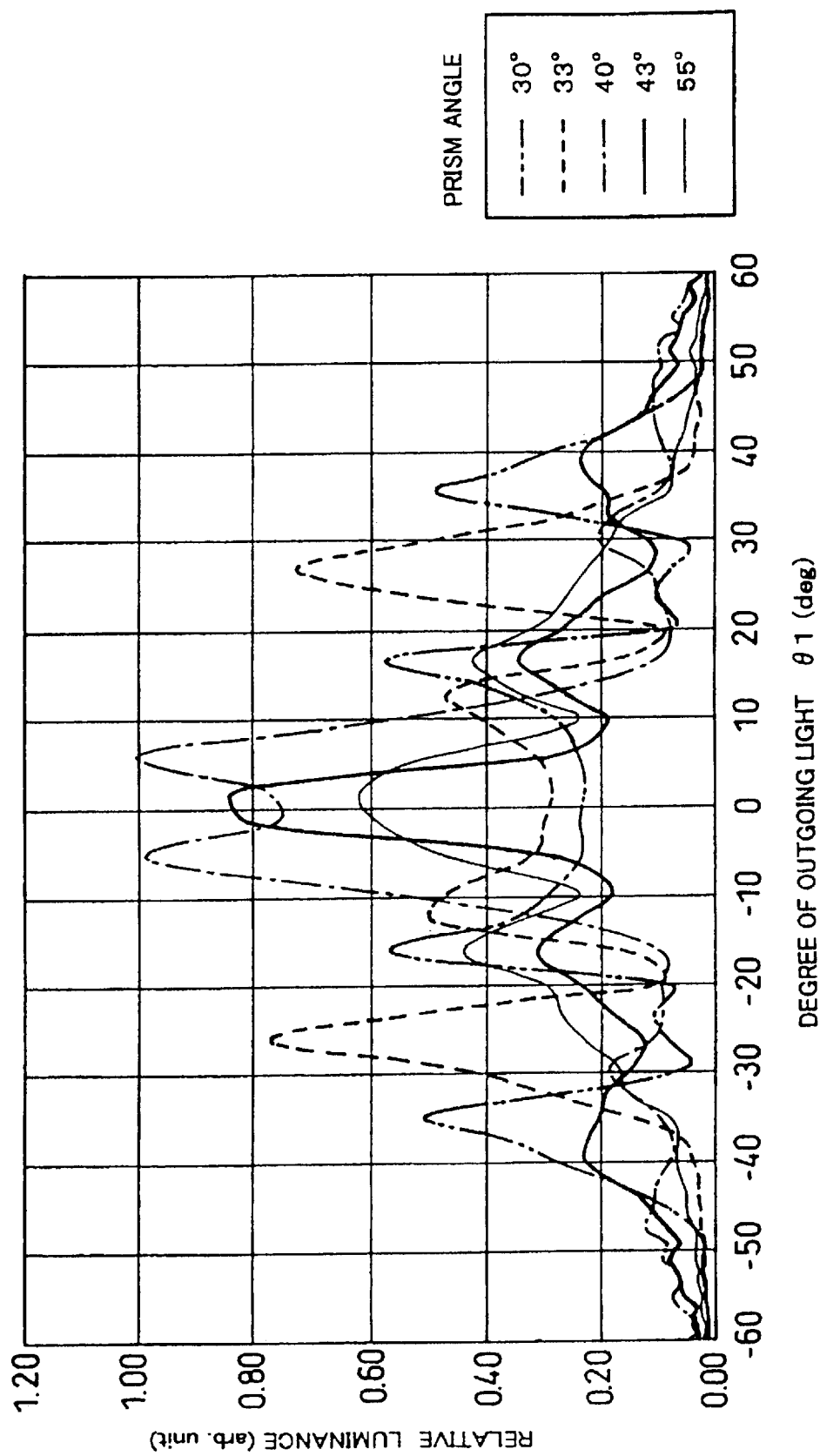
FIG. 59 is a graph showing outgoing-direction-dependent luminance distribution regarding several prism angles, as to the linear light guiding body.

Here, a prism angle in the linear light guiding body 452 and a peak value (maximal value) direction of an outgoing light from the linear light guiding body 452 is described, with reference to FIG. 59. FIG. 59 is a graph that shows luminance varying with the outgoing angle θ1 as to each of several prism angles in the linear light guiding body 452. Note that FIG. 59 shows data about the linear light guiding body 452 in which the prism angle θ11 and the prism angle θ12 are equal.

In the present embodiment, since the angle θ=0°, the luminance of the light perpendicularly incident to the incident surface 454a of the guiding body 454 (FIG. 44(a)) is increased, resulting in that the utilization of light at the guiding body 454 can be improved. In other words, among the outgoing light from the linear light guiding body 452, the luminance of light outgoing in a direction at the outgoing angle θ1=0°. Therefore, from FIG. 59, the prism angles θ11 and θ12=43° are adapted as a prism angle causing light to reach a peak value when the outgoing angle θ1=0°.

In other words, the prism angles θ11 and θ12 are both set to 43° so that the reflecting portions 452f and 452g should be at the same angle against the counter surface 452d.

The linear light guiding body 452 has a refractive index of 1.49, the critical angle upon the light outgoing from the inside of the linear light guiding body 452 to the outside (air layer) becomes about 42°. Here, considering the prism angles θ11 and θ12=43° and position relationship between the dot light emitting sources 451a and 451b and the reflecting portions 452f and 452g, a great proportion of light from the dot light emitting sources 451a and 451b is incident to the reflecting portions 452f and 452g at an incident angle greater than the critical angle. Therefore, most of light incident to the reflecting portions 452f and 452g is completely reflected by the reflecting portions 452f and 452g. Consequently, a quantity of light leaking from the linear light guiding body 452 to the outside can be decreased, thereby resulting in that the light can be more efficiently used.

Furthermore, the prism pitch pt is uniformly set throughout the entirety, so that pt=0.5 mm.

Here, the linear light guiding body 452 is formed so as to be symmetric with respect to the center in the X-axis direction (at a position of 40 mm from the end) Therefore, the following description depicts only those from the center to the dot light emitting source 451a side end unless otherwise described particularly.

The prism height $d_i$ varies with the prism position $x_i$. More specifically, a prism height $d_1$ of a prism 452p close to the incident surface 452a is small, and the prism height $d_i$ increases as it becomes closer to the center. In other words, as to the linear light guiding body 452 as a whole, the prism height $d_i$ is small at each end, while the prism height $d_i$ increases as it becomes closer to the center. However, fulfillment of the foregoing requirements on the average suffices (for instance, such a case where each average of the prism heights $d_i$ in each 5 mm interval fulfills the requirements described below), and the prisms need not strictly satisfy the requirements.

Here, furthermore, in the (i+1)'th and i'th prisms 452p (i is a natural number), a tilt of the prism height at each prism position is set so as to satisfy the relationship expressed as:

$$TILT=(d_{i+1}-d_i)/(x_{i+1}-x_i)=0.0011$$

Besides, the foregoing relationship can be expressed as:

$$\tan \theta d = 0.0011$$

where θd is a tilting angle of the prism height that is an angle formed by a plane including the trough 452i of each prism 452p and the counter surface 452d. Therefore, the tilting angle θd of the prism height is about 0.063°.

The linear light guiding body 452 was actually produced into a shape that fulfilled the foregoing requirements. The dimensions of the linear light guiding body 452 actually formed are shown in Table 5. Note that the values shown in Table 5 are results of measurement of the dimensions of the actually-produced linear light guiding body 452 by means of α-STEP 300 of KLA-Tencor Corporation, and the unit is millimeter. Further, the data shown in Table 5 are about the prisms 452p located in an area until the 80th prism 452p at the center of the linear light guiding body 452.

TABLE 5

| | POSITION | PRISM HEIGHT | PRISM WIDTH $pw_i$ | |
|---|---|---|---|---|
| i | $x_i$ (mm) | $d_i$ (mm) | $pw1_i$ (mm) | $pw2_i$ (mm) |
| 1 | 0.5 | 0.0277 | 0.0297 | 0.0297 |
| 2 | 1.0 | 0.0283 | 0.0303 | 0.0303 |

TABLE 5-continued

| POSITION | | PRISM HEIGHT | PRISM WIDTH $pw_i$ | |
|---|---|---|---|---|
| i | $x_i$ (mm) | $d_i$ (mm) | $pw1_i$ (mm) | $pw2_i$ (mm) |
| ... | ... | ... | ... | ... |
| 79 | 39.5 | 0.0706 | 0.0757 | 0.0757 |
| 80 | 40.0 | 0.0712 | 0.0763 | 0.0763 |

Figure 46:
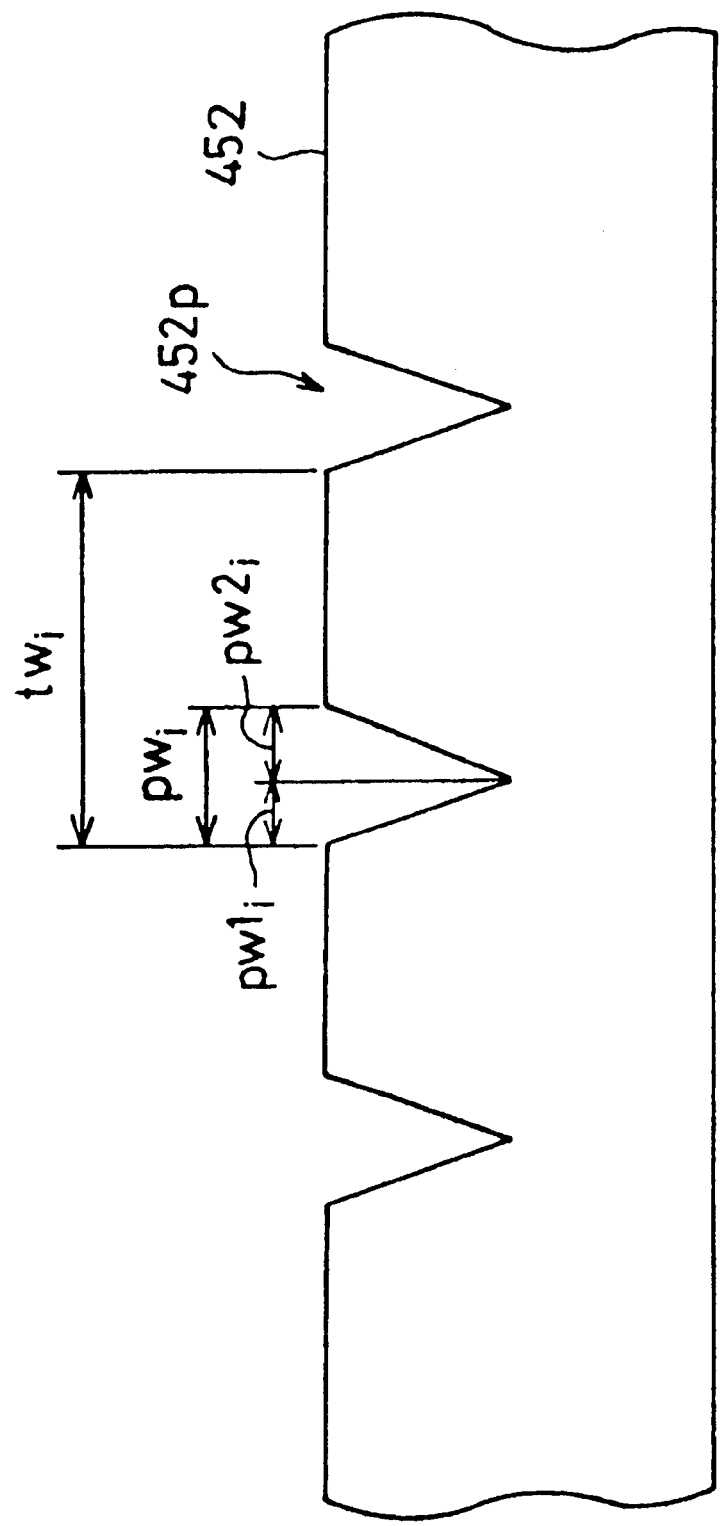
FIG. 46 is a plan view of the linear light guiding body.

Here, an occupancy ratio of the prism 452p in the counter surface 452d (prism occupation ratio) of the linear light guiding body 452, that is, a ratio of an area of portions where the prisms 452p are formed, with respect to an area of the counter surface 452d (an area of the same in the case where no prism 452p is formed) is described, with reference to FIG. 46. FIG. 46 is a plan view of the linear light guiding body 452. Here, the prism occupation ratio of the prisms 452p that are totally I in number (I is a natural number) can be defined as expressed by the following Equation 3:

$$\text{PRISM OCCUPATION RATIO} = \left\{ \frac{1}{I} \sum_{i=1}^{I} (pw1_i + pw2_i) \right\} / pt \quad \text{Equation 3}$$

In this case of the linear light guiding body 452, the prism occupation ratio is 21.4%.

Next, luminance distribution of the linear light guiding body 452 was measured by the method shown in FIG. 6. Incidentally, here, the dot light emitting sources 451a and 451b provided in the linear light guiding body 452 were illuminated in a state in which the luminance meter was set in a direction at an outgoing angle θ1=0° (in a state in which the optical axis of the luminance meter was perpendicular to the light outgoing surface 452c), and was moved along the lengthwise direction (X-axis direction) of the linear light guiding body 452 by 10 mm each time. In this state, luminance of the outgoing light from the linear light guiding body 452 was measured at every position.

Consequently, in the case of the foregoing linear light guiding body 452, the luminance distribution as a ratio of the maximum value and minimum value (max/min) of luminance across the entirety thereof was 1.8. Light linearly emitted from the linear light guiding body 452 is able to produce a more uniform planar light emitting state in the light guiding body 454 as the luminance distribution thereof is smaller, that is, more uniform, thereby being able to form homogeneous illuminating light. Further, if such luminance distribution is not less than 1 and not more than 3, it is acceptable for practical use. Therefore, in the present linear light guiding body 452, a homogeneous linear light emitting state undergoing no practical problem is produced.

Figure 47:
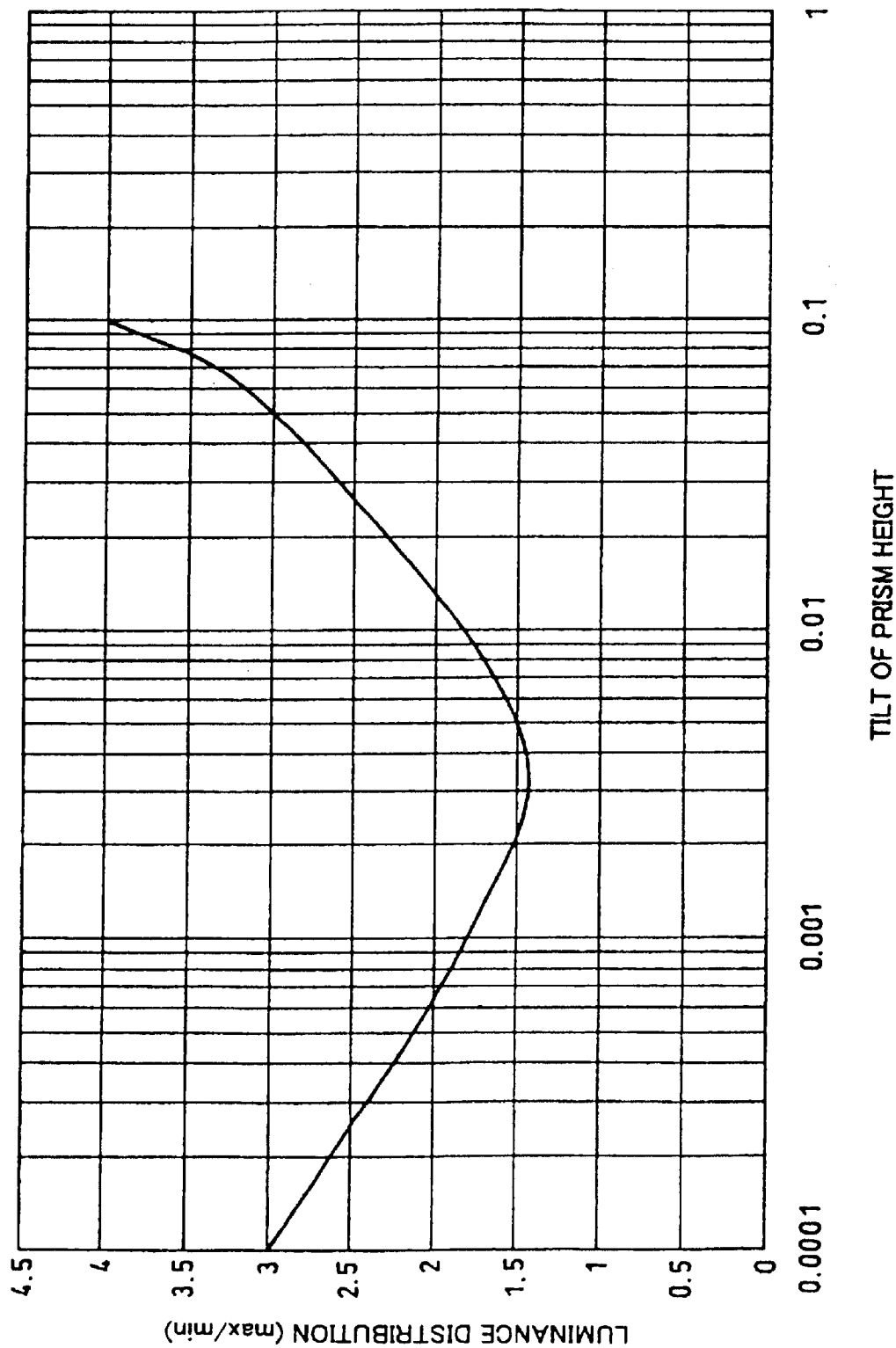
FIG. 47 is a graph of luminance distribution varying with a tilt of a prism height.

The following description will depict luminance distribution varying as the tilt of the prism height is varied, while referring to FIG. 47. FIG. 47 is a graph showing luminance distribution (max/min) that varies with respect to the tilt of the prism height ($(d_{i+1}-d_i)/(x_{i+1}-x_i)$)

FIG. 47 reveals that the luminance distribution is 3 when the tilt of the prism height is 0.0001, and that the luminance distribution of the outgoing light from the linear light guiding body 452 decreases, that is, luminance distribution is improved, as the tilt of the prism height increases in the range of 0.0001 to about 0.003.

On the other hand, the luminance distribution tends to increase with respect to the tilt of the prism height exceeding about 0.003, and the luminance distribution exceeds 3 when the tilt exceeds 0.05. Here, as described above, in the case where the luminance distribution of the linear light guiding body 452 is not more than 3, there is no practical problem. Considering this, the tilt of the prism height is preferably set in a range of not less than 0.0001 and not more than 0.05.

Figure 48:
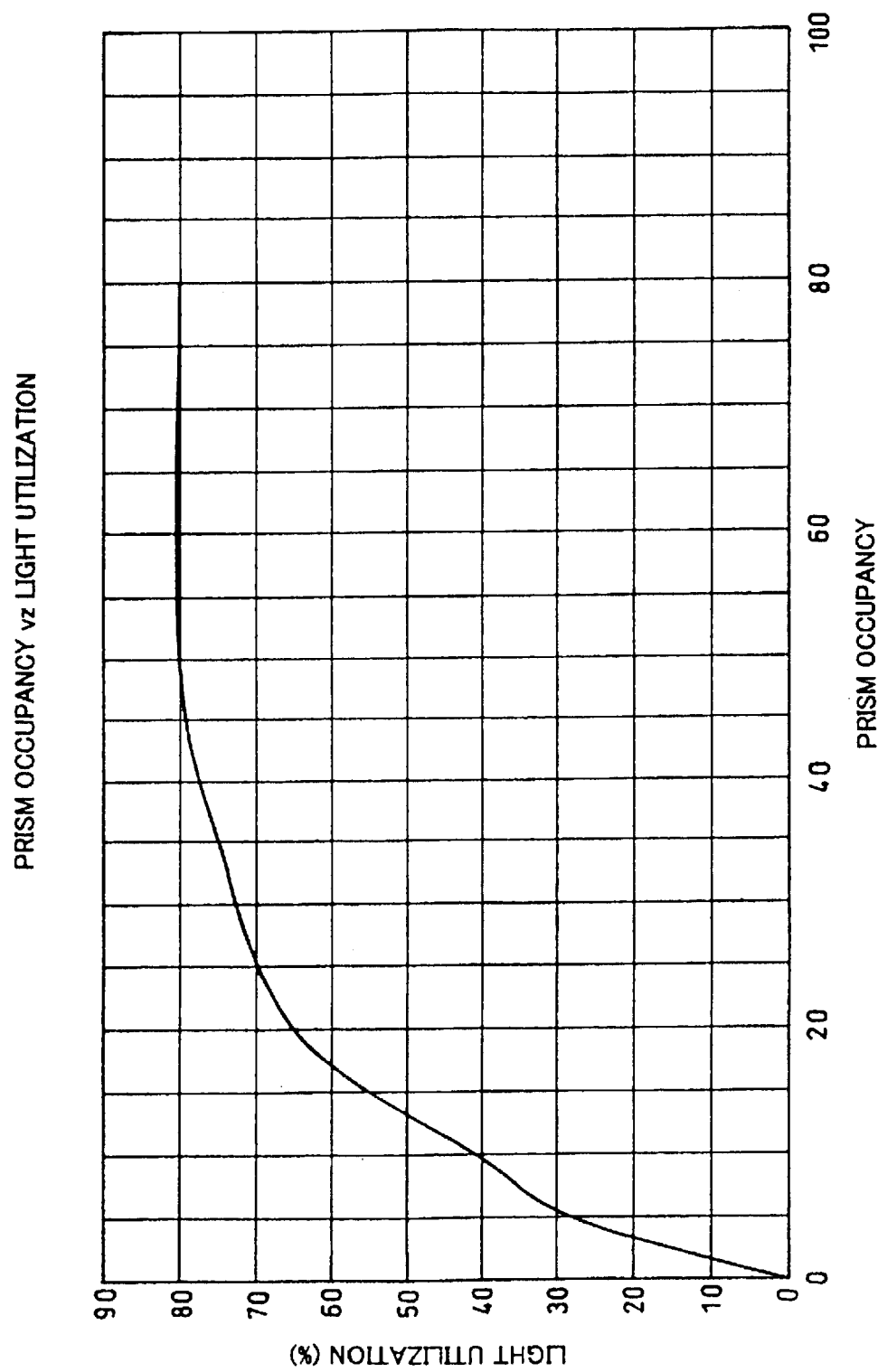
FIG. 48 is a graph of light utilization varying with prism occupation ratio.

The following description depict the utilization of light that varies as the prism occupation ratio is varied, while referring to FIG. 48. FIG. 48 is a graph showing the utilization of light that varies in response to variation of the prism occupation ratio. Here, the utilization of light is a ratio of a sum of flux of light converted into the linearly emitting state at the linear light guiding body 452 with respect to a sum of flux of light incident from the dot light emitting sources 451a and 451b to the linear light guiding body 452, expressed in percentage.

Incidentally, the sum of flux of light incident from the dot light emitting sources 451a and 451b to the linear light guiding body 452 was measured in the following manner: in a state in which the light outgoing surfaces of the dot light emitting sources 451a and 451b except effective portions were shielded, the dot light emitting sources 451a and 451b were disposed on an integrating sphere. Likewise, the sum of flux of light converted into the linearly emitting state at the linear light guiding body 452 was measured in the following manner: in a state in which the surfaces of the linear light guiding body 452 except the light outgoing surface were shielded, the linear light guiding body 452 was disposed on an integrating sphere.

FIG. 48 reveals that the utilization of light is about not less than 30%, in the case where the prism occupation ratio is not less than 5%.

Here, linear light guiding bodies 452 with the prism occupation ratios of 5% and 9.8%, respectively, were used for forming front lights 450 arranged as shown in FIG. 44(a), respectively, and brightness of light in the planarly emitting state at the front lights 450 was measured. Consequently the front lights exhibited brightness of 1 cd/m² and 1.4 cd/m², respectively. They both are sufficient brightness as auxiliary lighting in practical application.

As described above, by setting the prism occupation ratio to not less than 5%, preferable and practical utilization of use at the linear light guiding body 452 and brightness of light in the planarly emitting state at the front light 450 can be achieved, that are not less than 30% and not less than 1 cd/m², respectively.

Figure 49:
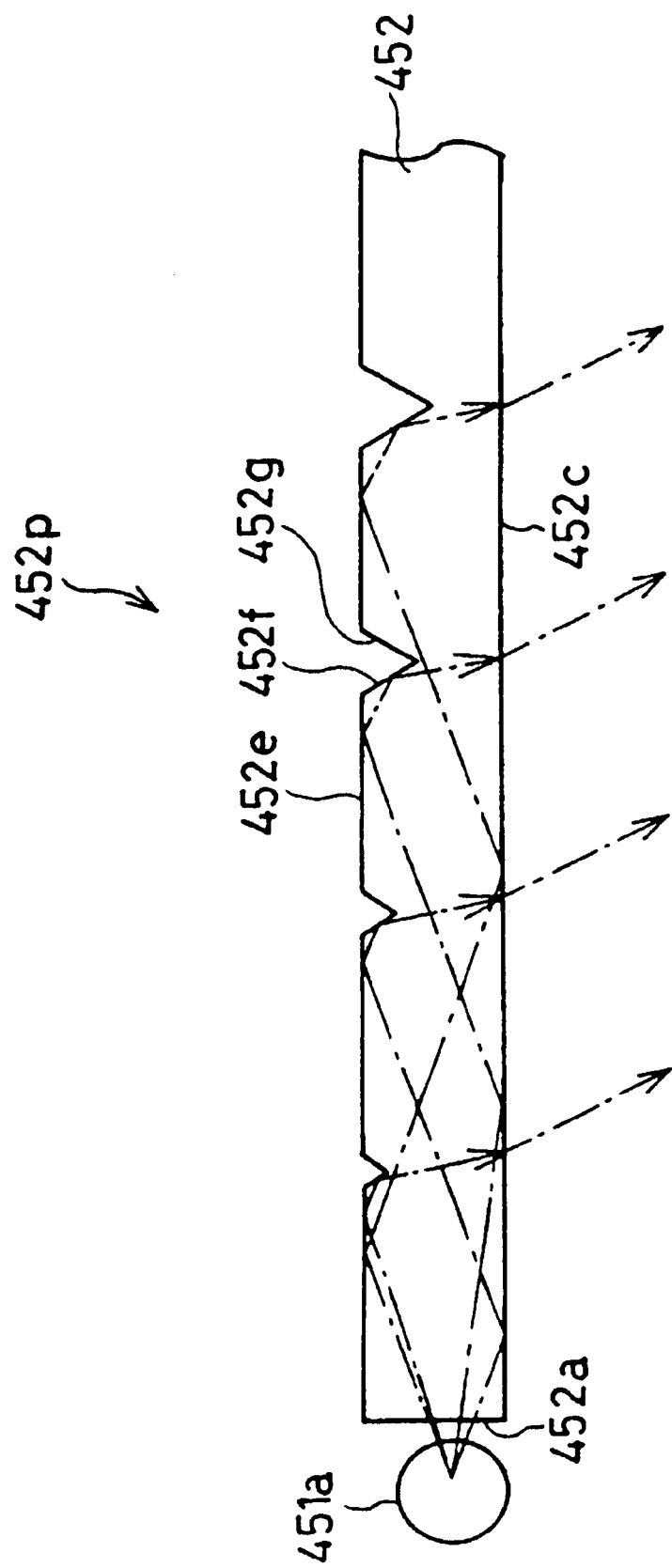
FIG. 49 is a schematic diagram illustrating propagation of light across a linear light guiding body.

On the other hand, as the prism occupation ratio increases, the area of the propagating portion 452e (FIG. 45(d)) of the linear light guiding body 452 decreases. Here, the function of the propagating portion 452e is described below, with reference to FIG. 49. FIG. 49 is a schematic diagram illustrating a state of propagation of light in the linear light guiding body 452. Among light incident through the light incident surface 452a and reaching the prisms 452p, a part of the same directly reaches the reflecting portions 452f from the dot light emitting source 451a, but the other part (indicated by a single-dot chain line in FIG. 49) reaches the reflecting portions 452f after repetition of reflection at the propagating portions 452e and the light outgoing surface 452c. In other words, the propagating portions 452e function to propagate the light from the dot light emitting source 451a in the lengthwise direction of the linear light guiding body 452.

Therefore, as the prism occupation ratio increases and an area of the propagating portions 452e decreases, the function to propagate light in the lengthwise direction of the linear light guiding body 452 deteriorates. As a result, a quantity of light outgoing from the light outgoing surface 452c of the linear light guiding body 452 is smaller at a position farther from the dot light emitting source 451a in the lengthwise direction of the linear light guiding body 452, thereby resulting in that the luminance distribution deteriorates.

As described above, since it is necessary to secure an area of the propagating portions 452e, the prism occupation ratio is preferably set not more than 80%.

The following description will depict the unit width $tw_i$ while referring to FIGS. 50(a) through 50(d). FIGS. 50(a) through 50(d) are concept views illustrating relationship between the unit width $tw_i$ in the linear light guiding body 452 and light distribution across the light outgoing surface 452c. FIGS. 50(a) and 50(b) are a plan view and a front view, respectively, in the case where the unit width $tw_i$ is relatively great. FIGS. 50(c) and 50(d) are a plan view and a front view, respectively, in the case where the unit width $tw_i$ is relatively small. Hatched parts in FIGS. 50(b) and 50(d) are portions where luminance is relatively great, that is, bright portions, in the light outgoing surface 452c when irradiated by the linear light guiding body 452.

As shown in FIGS. 50(c) and 50(d), in the case where the unit width $tw_i$ is relatively small (for instance, in the case where the unit width $tw_i$=2.0 mm), the luminance distribution in the linearly emitting state is small, because either (i) a portion with a relatively small luminance, that is, a dark portion, produced between adjacent bright portions is narrow in width as compared with the width of the bright portion, or (ii) no dark portion is produced.

On the other hand, as shown in FIGS. 50(a) and 50(b), in the case where the unit width $tw_i$ is relatively great (for instance, in the case where the unit width $tw_i$=3.0 mm), the width of the dark portion increases to become too big to be ignored with respect to the width of the bright portion. Therefore, in the linearly emitting state as well, the luminance distribution increases due to the dark portions.

More specifically, in the case where the unit width $tw_i$ exceeds 2.0 mm, luminance irregularity tends to occur in the linearly emitting state as described above. Therefore, the unit width $tw_i$ is preferably not more than 2.0 mm. However, if the unit width $tw_i$ is set less than 0.05 mm, formation of the prisms 452p itself becomes difficult. Therefore, the unit width $tw_i$ is preferably not less than 0.05 mm.

In the present embodiment, the prism angles θ11 and θ12 (FIG. 45(d)) of the linear light guiding body 452 can be set to 43°, and the prism angles θ11 and θ12 are not particularly limited to these.

Here, the prism angles θ11 and θ12 affect the direction of the outgoing light from the linear light guiding body 452 (FIG. 45(a)) in which the luminance of the light reaches a peak value. As described above, in the case where the prism angles θ11 and θ12 are both 43°, the direction of the outgoing light that makes the luminance have a peak value is a normal direction of the light outgoing surface 452c. This is suitable for the case where the cyclic direction 454f of the light guiding body 454 (FIG. 44(a)) is provided parallel to the light outgoing surface 452c of the linear light guiding body 452.

Here, by setting the prism angle of the prisms 452p to 43°, the outgoing light that causes the luminance to have a peak value can be attained in the normal direction. Therefore, this arrangement ensures that light can be efficiently made incident to the cyclic structures 454f provided in the light guiding body 454, thereby enabling to provide bright lighting means.

Furthermore, the prism angles θ11 and θ12 are preferably set so that the outgoing light that provides the peak value of the luminance is directed in a direction suitable for the cyclic structures 454f in the light guiding body 454 (in a direction perpendicular to the cyclic direction).

As described above, when a plurality of prisms 452p are formed on the counter surface 452d opposing the light outgoing surface 452c of the linear light guiding body 452, and a prism height at a position $x_i$ in the lengthwise direction of the light outgoing surface 452c is given as di, a tilt expressed as $(d_{i+1}-d_i)/(x_{i+1}-x_i)$ is set to 0.0011, while the linear light guiding body 452 is arranged so as to be symmetric with respect to the center in the lengthwise direction of the light outgoing surface 452c. By so doing, incident light from the dot light emitting sources 451a and 451b provided at both ends of the linear light guiding body 452 can be converted into the linearly emitting state excelling in luminance distribution, whereby a lighting system that provides uniform illumination can be provided.

Figure 51A:
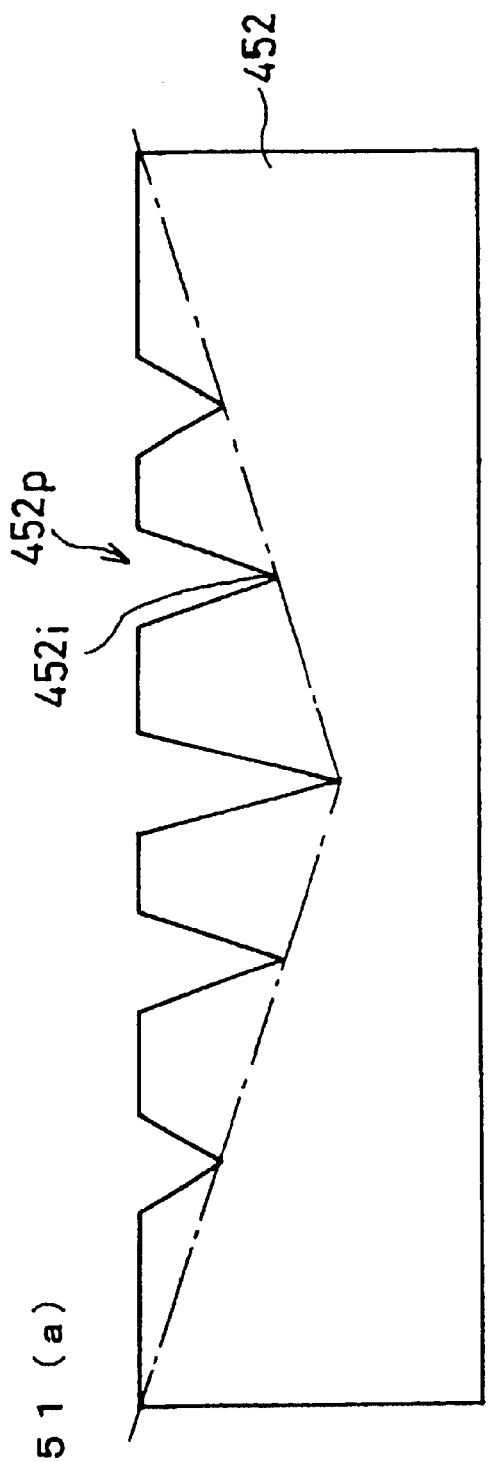
FIGS. 51(a) and 51(b) are schematic diagrams illustrating states of a tilt of a prism height.
Figure 51B:
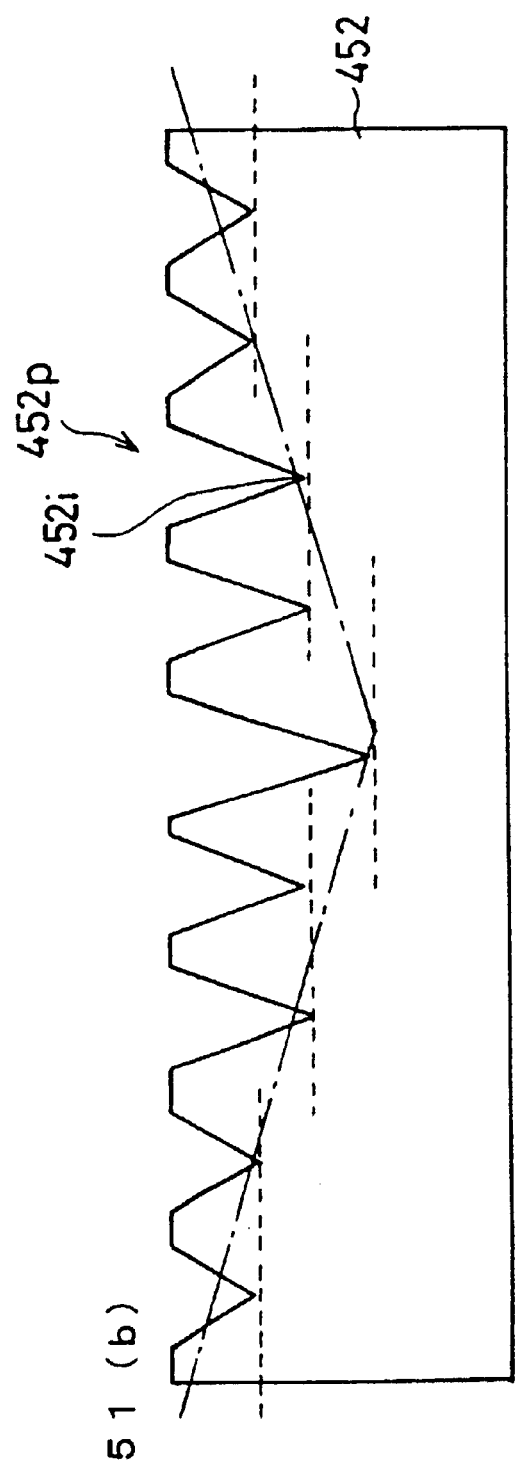

Incidentally, the tilt of the prism height $(d_{i-1}-d_i)/(x_{i+1}-x_i)$ does not have to be necessarily uniform. This will be described below, with reference to FIGS. 51(a) and 51(b). FIGS. 51(a) and 51(b) are schematic diagrams illustrating states of the tilt of the prism height.

As shown in FIG. 51(a), the foregoing linear light guiding body 452 has a uniform tilt of the prism height. Therefore, the trough 452i of each prism 452p is positioned on tilt lines (alternate long and short dash lines in FIG. 51(a)).

The linear light guiding body 452 in the present embodiment is not particularly limited to this, and it may be arranged, for instance, so that the prism 452p should be set as shown in FIG. 51(b). In some cases the linear light guiding body 452 shown in FIG. 51(b) is arranged so that the adjacent (i+1)'th and i'th prisms 452p have prism heights $d_{i+1}$ and $d_i$ that are equal to each other, and the average of tilt of prism heights (indicated by alternate long and short dash lines in FIG. 51(b)) is identical to that in the case of FIG. 51(a).

Furthermore, the linear light guiding body 452 in the present embodiment does not have to be necessarily symmetric, but it may be arranged so that only the dot light emitting source 451a in FIG. 45(a) is utilized as the light source and that the tilt of the prism height may be set so as to vary in only one direction from one end (light incident surface 452a) of the linear light guiding body 452 to the other end thereof.

Incidentally, though the tilt of the prism height is set as to the prism height $d_i$ in the aforementioned case, the prism width $pw_i$ may be varied instead. In other words, the prisms width $pw_i$ may be increased as becoming farther from the light source. In such an arrangement also, the reflecting portions 452f and 452g become larger as becoming farther from the light source, and therefore, the same function as described above can be attained.

As described above, as shown in FIGS. 45(a) through 45(d), the linear light guiding body 452 of the present embodiment is arranged so as to have a light incident surface 452a that is provided at an end of the prismatic linear light guiding body 452 in the lengthwise direction (X-axis direction) and to which light from the dot light emitting source 451a is incident, and a light outgoing surface 452c that is provided along the lengthwise direction of the linear light guiding body 452 and from which incident light outgoes.

Further, prisms 452p that reflect incident light are arrayed in the lengthwise direction on the counter surface 452d opposing the light outgoing surface 452c.

Furthermore, as to the i'th prism 452p from the light incident surface 452a side, a distance therefrom to the light incident surface 452a is given as $x_i$, and a prism height of the same is given as $d_i$, then the tilt is expressed as:

$$TILT=(d_{i+1}-d_i)/(x_{i+1}-x_i)$$

and, an average of the tilts expressed as above of the prisms 452p is set greater than 0.

Alternatively, as to the prism width $pw_i$ of the i'th prism 452p, a difference thereof from the prism width of the adjacent prism is expressed as:

$$DIFFERENCE = (pw_{i+1} - pw_i)$$

and, an average of differences expressed as above of the prisms 452p is set greater than 0.

With this arrangement, the prism height $d_i$ or the prism width $pw_i$ of the prism 452p is set so as to averagely increase as becoming farther from the light incident surface 452a.

This ensures that the prism 452p positioned far from the light incident surface 452a should reflect more light, which enables to compensate a decrease in the quantity of light from the dot light emitting source 451a. Therefore, this allows an increase in the quantity of light outgoing from the linear light guiding body 452, while allows the luminance distribution of the outgoing light to be more uniform in the lengthwise direction of the linear light guiding body 452.

Furthermore, the foregoing arrangement, unlike a wedge-form light guiding body, allows a light guiding body to have a uniform width in the direction crossing the lengthwise direction, and hence, to have a structure that facilitates propagation of light from the light incident surface 452a in the lengthwise direction. Therefore, it is possible to improve utilization of light and to make luminance of outgoing light more uniform.

Furthermore, since the foregoing arrangement allows the pitch pt of the prism 452p uniform, it is possible to ensure that some propagating portions 452e are without prism 452p in the counter surface 452d that opposing the light outgoing surface 452c. This also allows the light guiding body to have a structure that facilitates propagation of light from the light incident surface 452a in the lengthwise direction.

Incidentally, the linear light guiding body 452 in the present embodiment is preferably arranged so that the prisms 452p should be formed from the side of the light incident surface 452b opposing the light incident surface 452a so as to fulfill the foregoing conditions. With this arrangement, it is possible to achieve each of the aforementioned effects by providing dot light emitting sources 451a and 451b with respect to the light incident surfaces 452a and 452b, respectively, to increase the quantity of light.

Embodiment 9

The following description will depict Embodiment 9 of the present invention, while referring to the drawings.

Incidentally, the members having the same structure (function) as those in Embodiments 1 through 8 will be designated by the same reference numerals and their description will be omitted.

Figure 52:
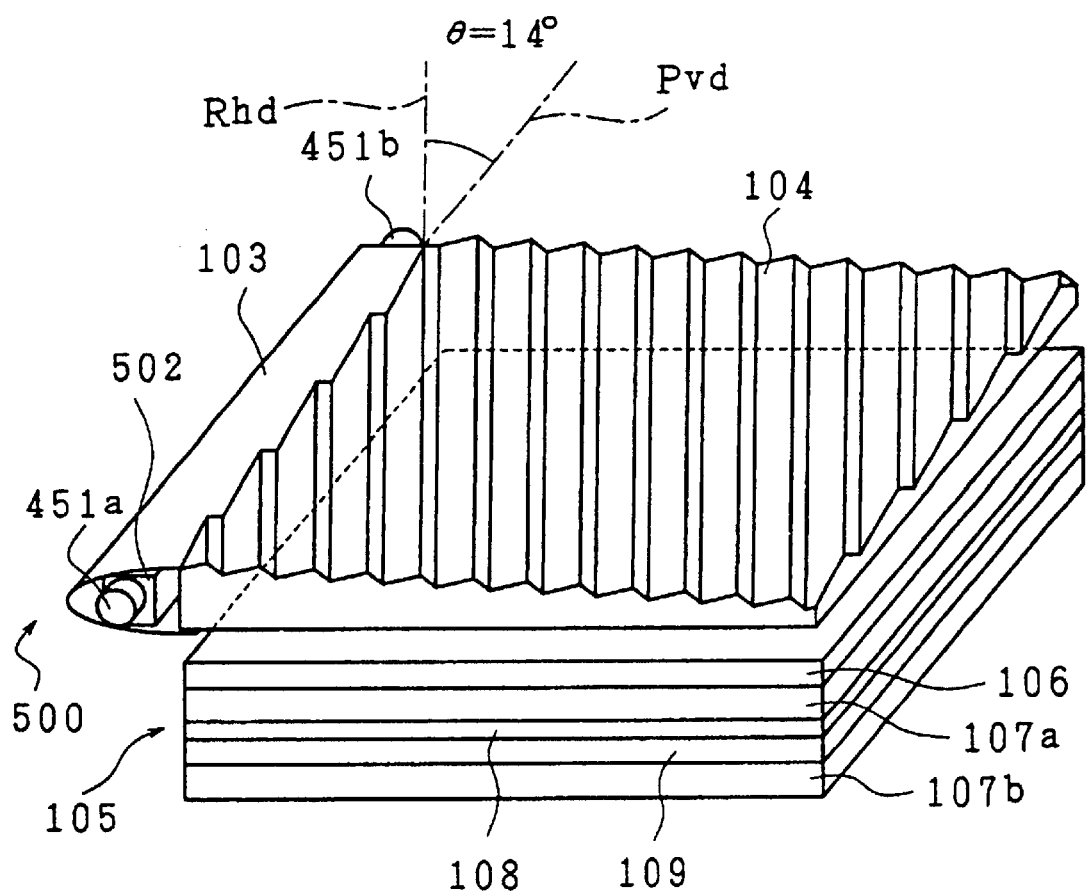
FIG. 52 is a perspective view illustrating an arrangement of a reflecting liquid crystal display in Embodiment 9.

First of all, a reflecting liquid crystal display in accordance with the present embodiment, while referring to FIGS. 52, 53(a), and 53(b). FIG. 52 is a perspective view illustrating an arrangement of a reflecting liquid crystal display in accordance with the present embodiment. Further, FIG. 53(a) is a perspective view of a front light (lighting system) 500 in the foregoing reflecting liquid crystal display, and FIG. 53(b) is an enlarged view of a light guiding body 104 of the front light 500.

As shown in FIG. 52, a basic arrangement of a reflecting liquid crystal display in accordance with the present embodiment is identical to Embodiment 1, except that the linear light guiding body (lighting element) 502 in the present embodiment differs in shape from that in Embodiment 1. Incidentally, the reflecting liquid crystal display element 105 and the light guiding body 104 used herein are the same as those used in Embodiment 1.

Figure 54:
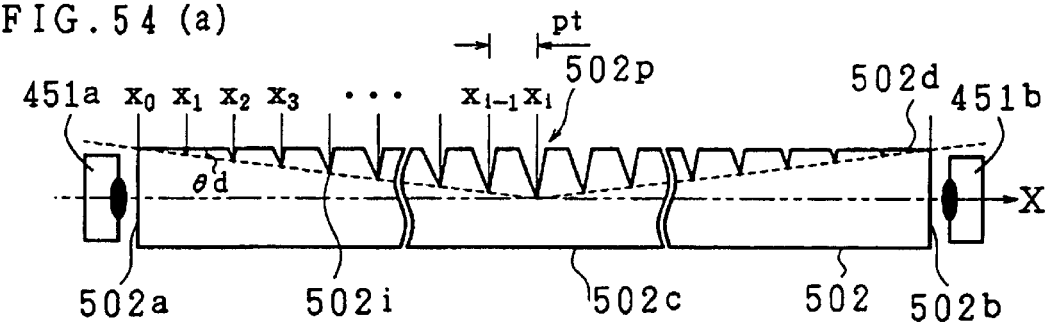
FIGS. 54(a), 54(b), and 54(c) are a plan view, a front view, and a side view illustrating an arrangement of a linear light guiding body, respectively.
FIG. 54(d) is an enlarged view of a prism-like portion of the linear light guiding body.
FIG. 54(e) is a schematic diagram illustrating a state in which light is reflected by a reflecting portion.
Figure 54:
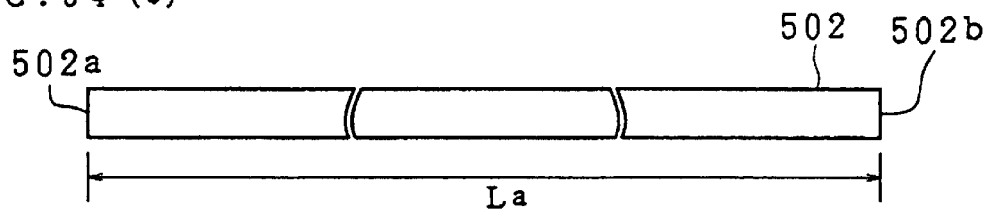
Figure 54:
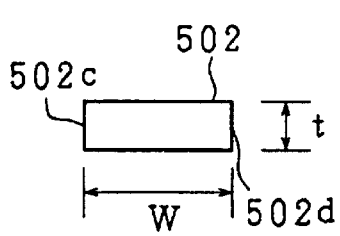
Figure 54:
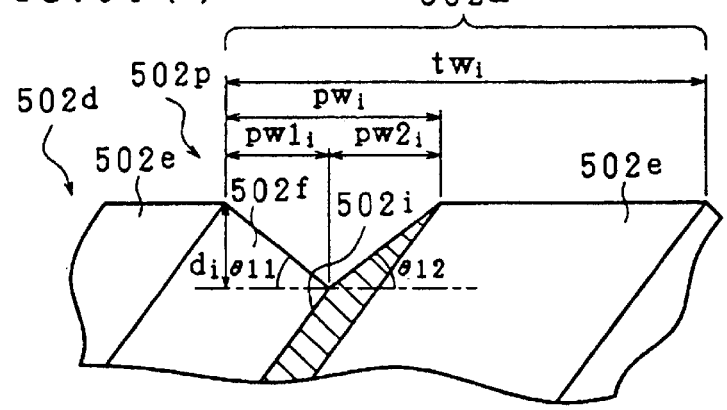
Figure 54:
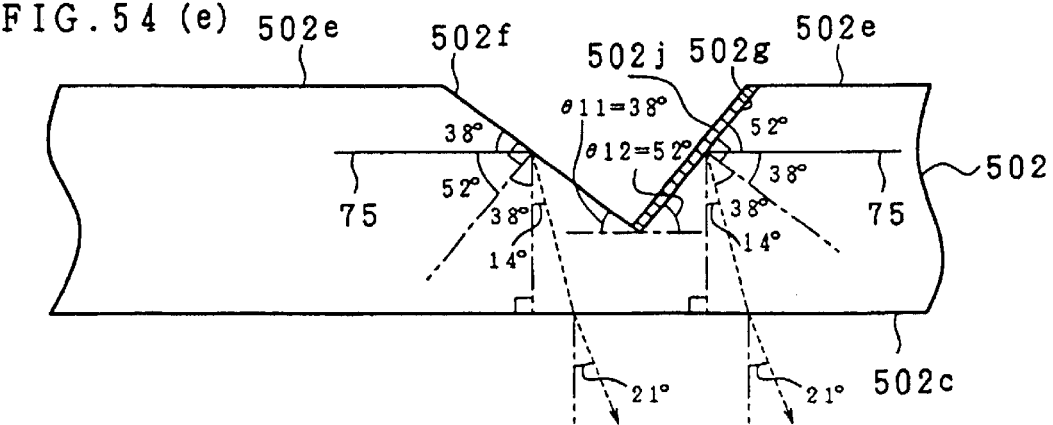

As described above, a tilt is given to the cyclic direction Rhd of the cyclic structures 104f with respect to the repeating direction Pvd of the pixels, this causes the cyclic direction Rhd of the light guiding body 104 to be tilted at an angle θ=14° with respect to the X axis and the light outgoing surface 502c of the light guiding body 502 (to be described later with reference to FIG. 54(a)). Therefore, in order to improve the luminance of light in the direction crossing the cyclic direction Rhd at a right angle in the light guiding body 104, the peak value direction of the luminance of the outgoing light that has been converted into the linearly emitting state by the linear light guiding body 502, is preferably set at the outgoing angle θ1 of about 20°.

Subsequently, the structure of the linear light guiding body 502 suitable for the light guiding body 104 is described with reference to FIGS. 54(a) through 54(e). FIGS. 54(a), 54(b), and 54(c) are a plan view, a front view, and a side view illustrating a structure of the linear light guiding body 502, respectively, FIG. 54(d) is an enlarged view of a prism-like portion of the linear light guiding body 502, and FIG. 54(e) is a schematic diagram illustrating a state in which light is reflected by reflecting portions 502f and 502g. Note that the dot light emitting sources 451a and 451b are shown in only FIG. 54(a), whereas they are omitted in the other drawings.

The linear light guiding body 502 differs from the linear light guiding body 452 (FIG. 45(a)) of Embodiment 8 as to the shape of a prism (notch portion) 502p. In the linear light guiding body 502, as described above, the peak value direction of luminance of outgoing light is preferably set at the outgoing angle θ1 of about 20° (first outgoing angle).

Then, as shown in FIG. 54(e), light 75 that propagates the inside of the linear light guiding body 452 in a direction parallel to the outgoing surface 452c is assumed, and prism angles θ11 and θ12 that cause the light 75 to outgo at the outgoing angle θ1 of about 20° are derived: the prism angle θ11=38° and the prism angle θ12=52°. Incidentally, light actually propagating the inside of the linear light guiding body 452 is not limited to the light 75, but since the proportion of the foregoing light 75 is great, the setting as described above allows the peak value of the outgoing light to be achieved when light outgoes at the outgoing angle θ1 of about 20°.

Here, since the light 75 incident onto the reflecting portion 502g at a small incident angle does not satisfy the condition of total reflection, a part of the light 75 travels therethrough. To prevent this, a reflecting film 502j is preferably provided on the reflecting portion 112g, by vapor deposition or sputtering of aluminum, for instance.

Thus, by setting the prism angles θ11 and θ12 of the linear light guiding body 502 to angles different to each other, the direction of the outgoing light from the linear light guiding body 502 at which the luminance of the outgoing light reaches a peak value can be varied.

Incidentally, the prism angles θ11 and θ12 of the linear light guiding body 502 are preferably optimized in a range from 30° to 60° according to the moire preventing angle θ (for instance, 10° to 80°).

The other aspects of the shape of the linear light guiding body 502 are identical to those of the linear light guiding body 452 in Embodiment 8 (FIG. 45(a)), except the following concrete numerical values.

Here, the prism pitch pt is uniform on the whole, set so that pt=1.0 mm. Further, the linear light guiding body 502 is formed so as to be symmetric with respect to the center in the X-axis direction. Therefore, the following description depicts only those from the center to the dot light emitting source 451*a* side end unless otherwise described particularly. Regarding the tilt direction of the prism 502*p*, however, the prism 502*p* is not symmetric with respect to the center in the direction of the X-axis of the linear light guiding body 501, but a tilt is given to the same with respect to one direction. In other words, the prism angles θ11 and θ12 are uniform throughout the entirety of the linear light guiding body 502.

The prism height $d_i$, as with the Embodiment 8, is set so as to vary with the prism position $x_i$. Viewing the whole linear light guiding body 502, a prism height $d_i$ is small at each end, and it becomes greater at a position closer to the center.

Here, furthermore, in the (i+1)'th and i'th prisms 502*p*, a tilt of the prism height at each prism position is set so as to satisfy the relationship expressed as:

$$TILT=(d_{i+1}-d_i)/(x_{i+1}x_i)=0.005$$

Besides, the tilting angle θd of the prism height can be expressed as:

$$\tan θd=0.005$$

Therefore, the tilting angle θd of the prism height is about 0.286°.

The linear light guiding body 502 was actually produced into a shape that fulfilled the foregoing requirements. The dimensions of the linear light guiding body 502 actually formed are shown in Table 6. Note that the unit of the values shown in Table 6 is millimeter. Further, the data shown in Table 6 are about the prisms 502*p* located in an area until the 40th prism 502*p* at the center of the linear light guiding body 502.

TABLE 6

| POSITION | PRISM HIGHT | PRISM WIDTH $pw_i$ | |
|---|---|---|---|
| i | $x_i$ (mm) | $d_i$ (mm) | $pw1_i$ (mm) | $pw2_i$ (mm) |
| 1 | 1.0 | 0.0275 | 0.0352 | 0.0215 |
| 2 | 2.0 | 0.0325 | 0.0416 | 0.0254 |
| ... | ... | ... | ... | ... |
| 39 | 39.0 | 0.218 | 0.278 | 0.170 |
| 40 | 40.0 | 0.223 | 0.265 | 0.178 |

The prism occupation ratio defined by Equation 3 of the foregoing linear light guiding body is 25.9%.

Furthermore, the luminance distribution in the peak value direction of the outgoing light in the foregoing linear light guiding body 502 was measured by the same method as that in Embodiment 8, and it was found to be 1.8. This proves that the present linear light guiding body 502 is able to provide a uniform linearly-emitting state raising no problems in practical application.

Furthermore, the utilization of light by the foregoing linear light guiding body 502 was measured by the same method as that in Embodiment 8, and the utilization of light was about 70%. This proves that the present linear light guiding body 502 is able to drastically improve the utilization of light.

Figure 53:
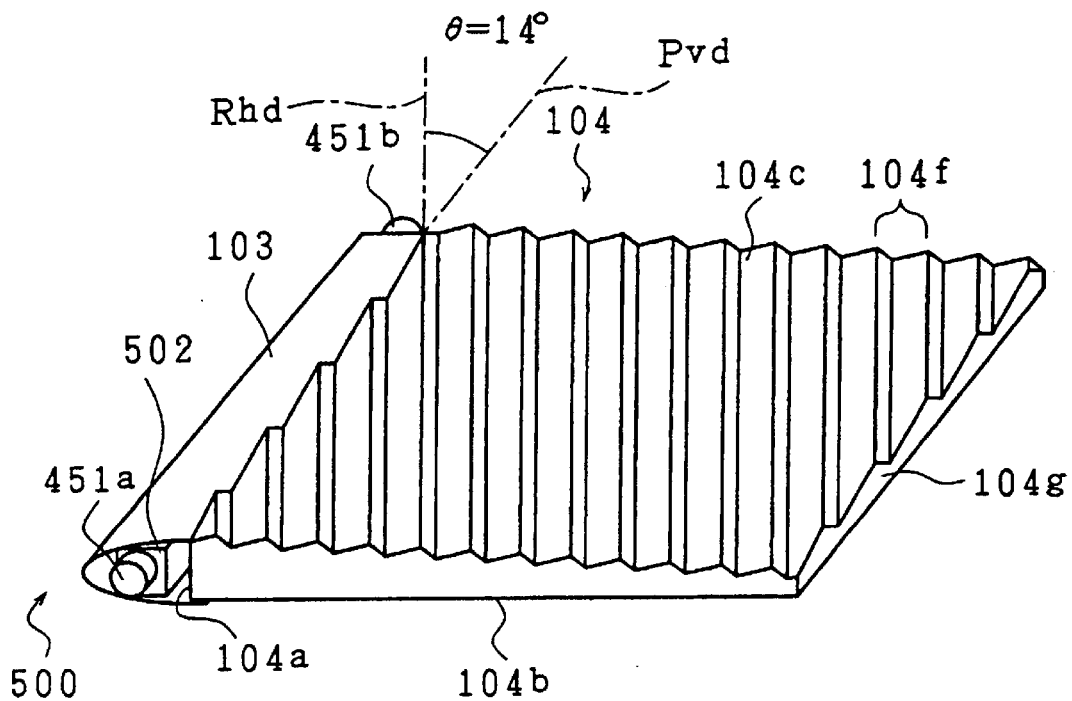
FIG. 53(a) is a perspective view of a front light in the reflecting liquid crystal display shown in FIG. 52.
FIG. 53(b) is an enlarged view of a light guiding body of the front light.
Figure 53:
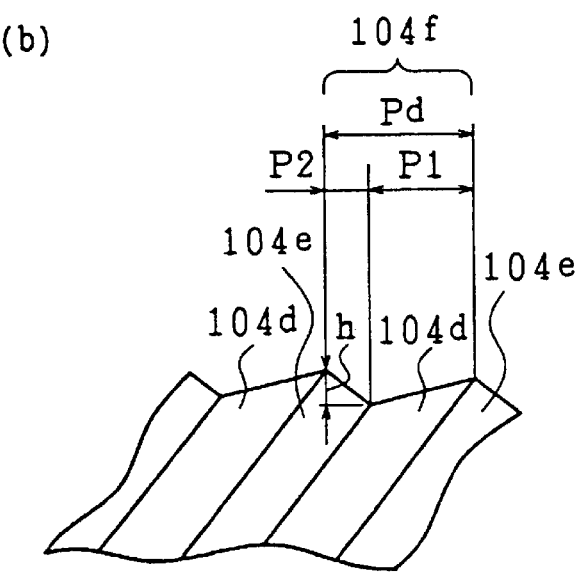

The brightness of light in the planarly emitting state provided by the front light 500 (FIG. 53(*a*)) composed of the foregoing linear light guiding body 502, the foregoing light guiding body 104, and the diffusing and reflecting sheet 103 was measured, and it was found to be 2.5 cd/m². This is sufficient brightness raising problems in practical application, as brightness provided by auxiliary lighting means.

As described above, in the foregoing arrangement, an angle formed between the cyclic Rhd and the repeating direction of the pixels provided in the liquid crystal display element 105 was set to 14° and the prism angles of the prisms 502*p* provided in the linear light guiding body 502 are set to two different angles. With this arrangement, it is possible to prevent a moire fringe, while it is possible to cause light to be efficiently incident to the cyclic structures 104*f* of the light guiding body 104 that are provided with a tilt. Thus, it is possible to provide a bright lighting system excelling in uniformity of lighting.

Furthermore, by providing the diffusing and reflecting sheet (diffusing means) 103 in the vicinity of the linear light guiding body 502, it is possible to provide further efficient lighting means.

Thus, by setting the prism angles θ11 and θ12 of the linear light guiding body 502 to different angles, the direction of the outgoing light from the linear light guiding body 502 at which the luminance of the outgoing light has a peak value can be varied.

Incidentally, in the foregoing case, the prism angles θ11 and θ12 of each prism 502*p* are set uniform in the linear light guiding body 502 as a whole, but they may be set to vary with the position of the linear light guiding body 502. This makes it possible to further flexibly set the direction of outgoing light that provides a peak value of outgoing luminance of outgoing light from the linear light guiding body 502.

For instance, by setting the prism angles θ11 not uniform angles but to different, multiple angles, light from the same dot light emitting source 501*a* is reflected in different directions to be emitted. This allows the direction in which a peak value of the outgoing luminance appears to be set to a plurality of directions. This makes it possible to provide a further uniform luminance of outgoing light from the light guiding body 104 in the planarly emitting state, and to improve utilization of light.

As described above, as shown in FIGS. 54(*a*) through 54(*e*), the linear light guiding body 502 of the present embodiment is a prismatic linear light guiding body 502 having a light incident surface 502*a* and a light incident surface (second incident light) 502*b* to which light from the dot light emitting sources 451*a* and 451*b* is incident, and a light outgoing surface 502*c* from which incident light outgoes.

The light incident surfaces 502*a* and 502*b* are provided at respective ends of the linear light guiding body 502 in the lengthwise direction, and the light outgoing surface 502*c* is provided in the lengthwise direction of the linear light guiding body 502.

Further, a plurality of prisms 502*p* that reflect incident light are arrayed in the lengthwise direction on the surface 502*d* opposing the light outgoing surface 452*c* of the linear light guiding body 502.

Each prism 502*p* is a V-shape groove formed with two flat surfaces (reflecting portions 502*f* and 502*g*), and these surfaces are formed at not less than two different angles with respect to the light outgoing surface 502*c*.

In this arrangement, light from the same light source (for instance the dot light emitting source 451*a*) can be reflected in different directions, and it is possible to set the angles so that the peak value appears in a plurality of outgoing directions.

Furthermore, considering the case where light is allowed to enter through both of the ends of the linear light guiding body 502, it is possible to set the angles so that the peak value of the outgoing light appears in asymmetric directions with respect to the linear light guiding body 502.

Thus, by irradiating the light guiding body 104 provided asymmetric with respect to the light incident surface with use of the present linear light guiding body 502, to prevent occurrence of a moire fringe, for instance, it is possible to attain light in a more uniform planarly-emitting state at higher utilization of light.

Embodiment 10

The following description will depict Embodiment 10 of the present invention, while referring to the drawings.

Incidentally, the members having the same structure (function) as those in Embodiments 1 through 9 will be designated by the same reference numerals and their description will be omitted.

Figure 55:
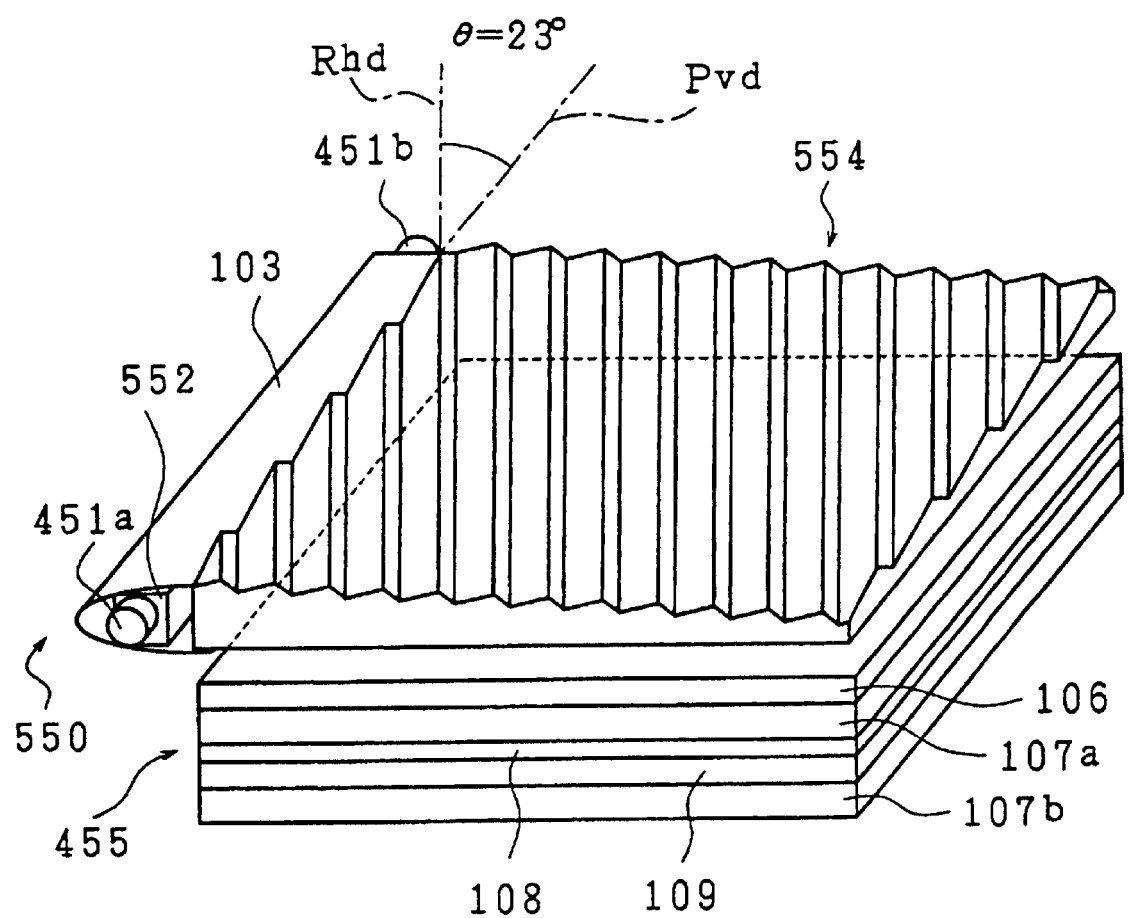
FIG. 55 is a perspective view illustrating an arrangement of a reflecting liquid crystal display in Embodiment 10.
Figure 56:
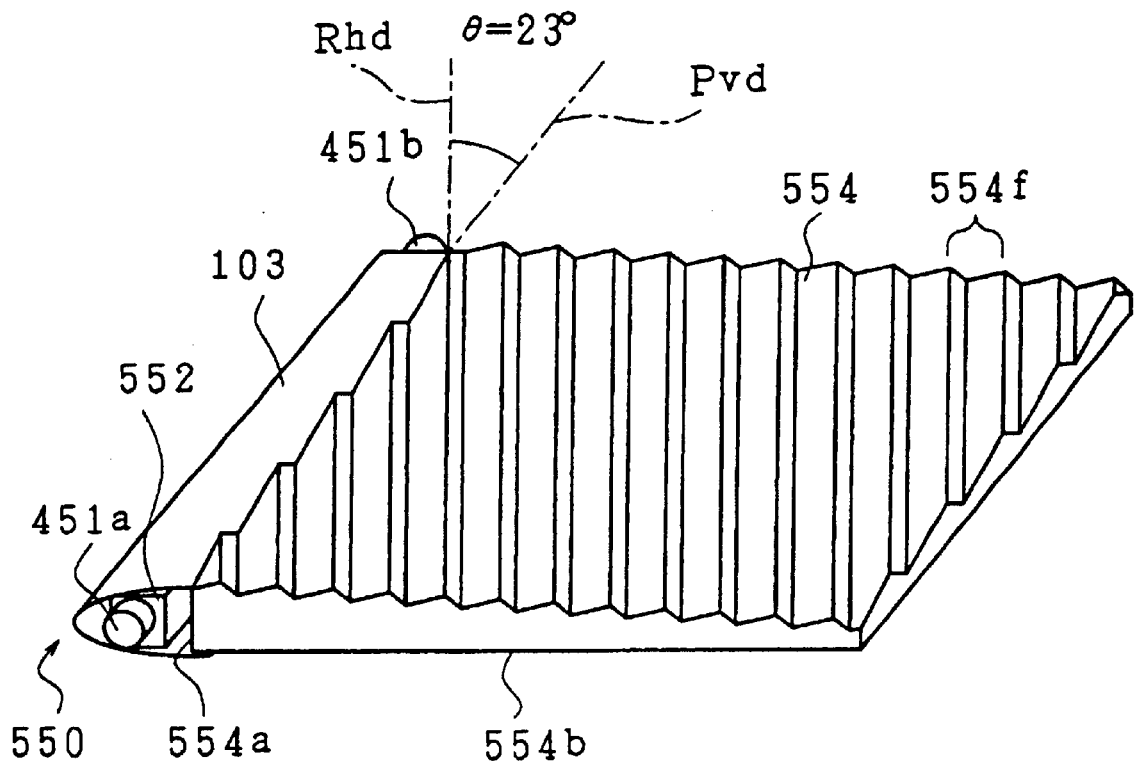
FIG. 56(a) is a perspective view of a front light in the reflecting liquid crystal display shown in FIG. 55.
FIG. 56(b) is an enlarged view of a light guiding body of the front light.
Figure 56:
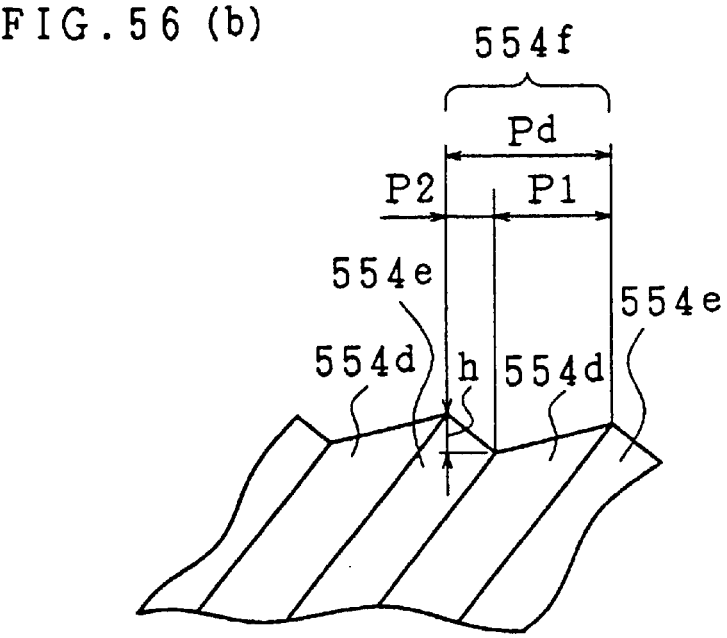

First of all, a reflecting liquid crystal display of the present embodiment will be described, with reference to FIGS. 55, 56(a), and 56(b). FIG. 55 is a perspective view illustrating an arrangement of the reflecting liquid crystal display in accordance with the present embodiment. Further, FIG. 56(a) is a perspective view of a front light (lighting system) 550 in the foregoing reflecting liquid crystal display, and FIG. 56(b) is an enlarged view of a light guiding body (planar light guiding body) 554 of the foregoing front light 550.

A basic arrangement of a reflecting liquid crystal display in accordance with the present embodiment is identical to Embodiment 8, except that the light guiding body 554 and a linear light guiding body (lighting element) 552 in the present embodiment differ in shape from those of Embodiment 8. Incidentally, the reflecting liquid crystal display element 455 used herein is the same as that used in Embodiment 8.

Here, the light guiding body 554 is provided with cyclic structures 554f each having a propagating portion 554d and a reflecting portion 554e, and the cyclic structures 554f are arrayed at a pitch Pd of 0.39 mm, a pitch P1 of the propagating portions 554 of 0.38 mm, and a pitch P2 of the reflecting portions 554e of 0.01 mm. A prism is formed with each pair of the propagating portion 554d and the reflecting portion 554e, and has a prism height h of 0.01 mm. This arrangement intends that light emitted from the dot light emitting sources 451a and 451b, entering the linear light guiding body 552 through the light incident surface 552a and a light incident surface (second incident surface) 552b, then converted into the linearly emitting state by the linear light guiding body 552, and entering the light guiding body 554, should effectively outgoes to the reflecting liquid crystal display element 455 side.

Then, a tilt in the repeating direction Pvd of the pixels is given to the cyclic direction Rhd of the cyclic structures 554f of the light guiding body 554, and the tilting angle θ is set to 23°. Thus, since a tilt in the repeating direction Pvd of the pixels is given to the cyclic direction Rhd of the light guiding body 554, this results in that the cyclic direction Rhd also has a tilt at an angle of θ=23°with respect to the X axis and a light outgoing surface 552c (to be described later with reference to FIG. 57(a)) of the linear light guiding body 552.

Therefore, to improve the luminance of light in the direction crossing the cyclic direction Rhd at a right angle in the light guiding body 554, the direction in which the outgoing light having been converted into the linearly emitting state by the linear light guiding body 552 is directed to have luminance of the peak value should be set to an outgoing angle θ1=35°.

Figure 57:
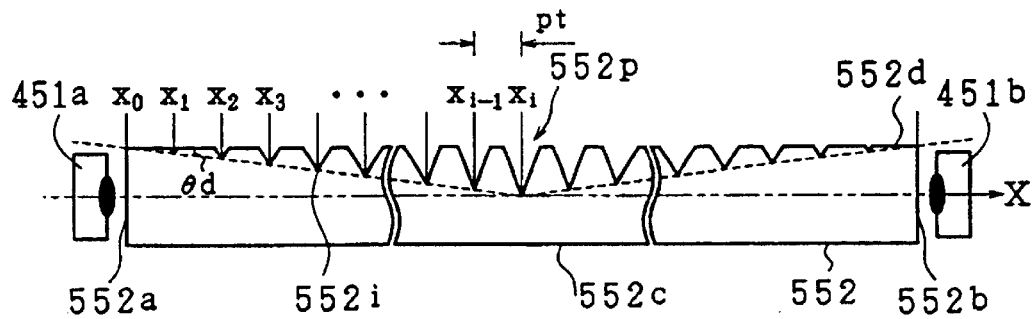
FIGS. 57(*a*), 57(*b*), and 57(*c*) are a plan view, a front view, and a side view illustrating an arrangement of a linear light guiding body, respectively, and FIG. 57(*d*) is an enlarged view of a prism-like portion of the linear light guiding body.
Figure 57:
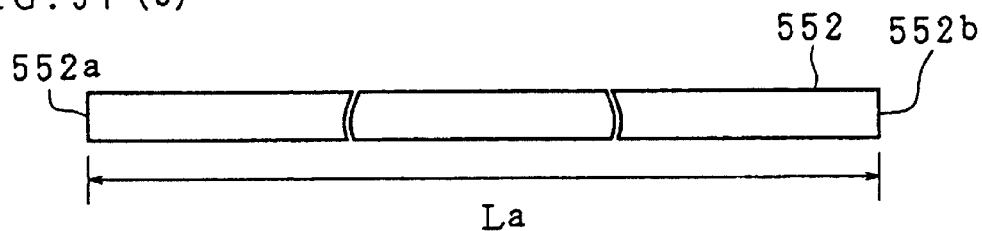
Figure 57:
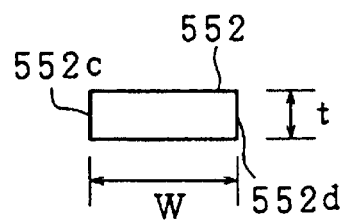
Figure 57:
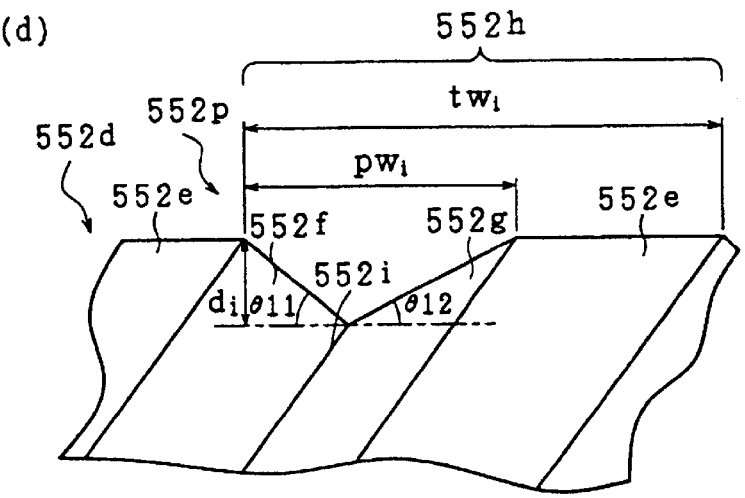

The following description will depict a structure of the linear light guiding body 552 suitable for the light guiding body 554, while referring to FIGS. 57(a) through 57(d). FIGS. 57(a), 57(b), and 57(c) are a plan view, a front view, and a side view illustrating an arrangement of the linear light guiding body 552, and FIG. 57(d) is an enlarged view of a prism-form portion of the linear light guiding body 552. Incidentally, the dot light emitting sources 451a and 451b are illustrated only in FIG. 57(a), and they are omitted in the other drawings.

The foregoing linear light guiding body 552 differs from the linear light guiding body 452 (FIG. 45(a)) in Embodiment 8 as to the shape of a prism (notch portion) 552p. In the linear light guiding body 552, as described above, the direction in which the outgoing light reaches the peak value of luminance is preferably set at the outgoing angle θ1=35° as described above.

Then, based on FIG. 59, prism angles θ11 and θ12=30° are adapted as prism angles that provide a peak value of luminance at the outgoing angle θ1=35°.

To state differently, angles that the reflecting portions 552f and 552g respectively form with the counter surface 452d are set equal to each other, while the prism angles θ11 and θ12 are both set to 30°.

Figure 58:
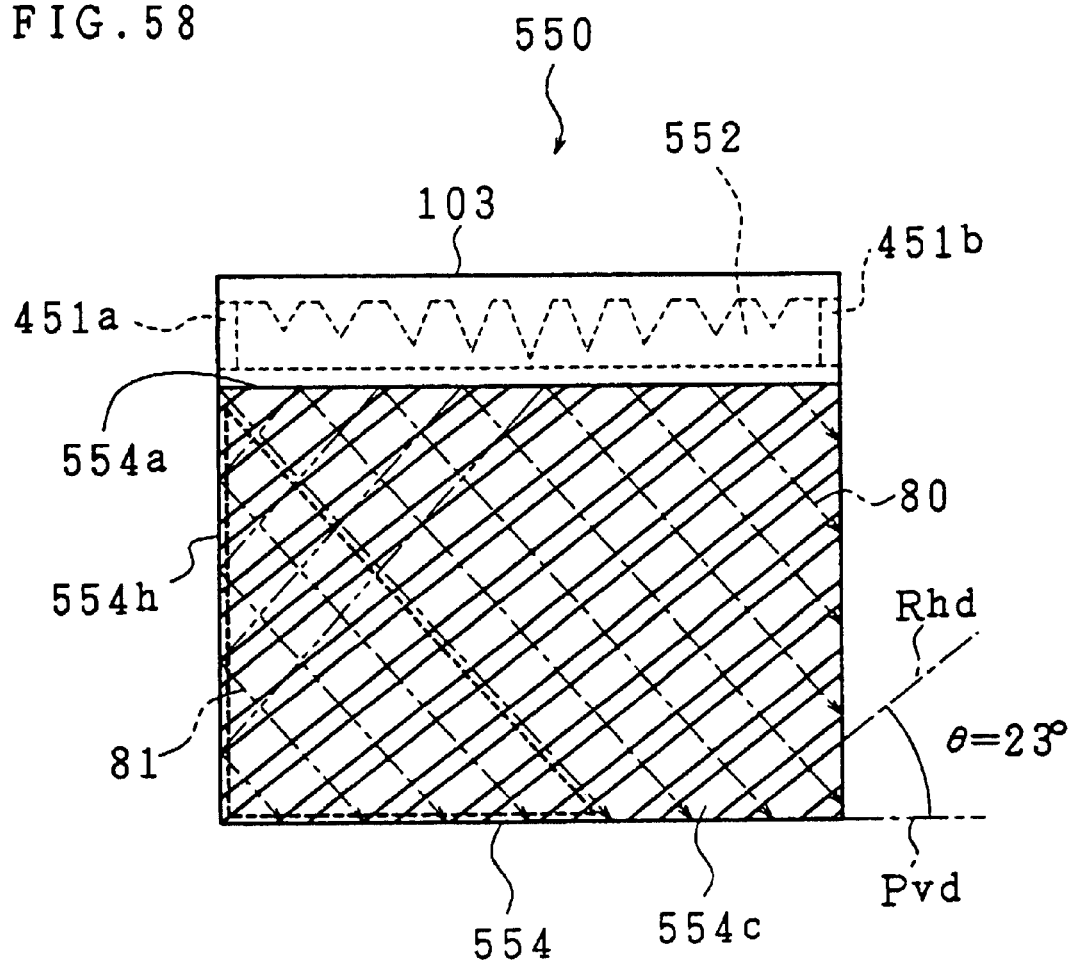
FIG. 58 is a plan view of the front light taken from a counter surface side.

Incidentally, since the prism angles θ11 and θ12 are set equal to each other, the peak value of luminance of the outgoing light from the linear light guiding body 552 appears at the outgoing angle θ1=±35°. The reason of such setting is described below, with reference to FIG. 58. FIG. 58 is a plan view of the front light 550 taken from the counter surface 554c side of the light guiding body 554. Note that FIG. 58 schematically illustrates a part of light outgoing from the linear light guiding body 552.

Light 80 (alternate long and short dash lines in FIG. 58) that reaches a peak value of luminance when outgoing from the linear light guiding body 552 in the direction at the outgoing angle θ1=±35° (first outgoing direction) propagates through the light guiding body 554 in the direction crossing the cyclic direction Rhd at a right angle. Therefore, the light 80 is reflected by the reflecting portions 554e (FIG. 56(b)) toward the reflecting liquid crystal display element 455 (FIG. 55), thereby efficiently irradiating the reflecting liquid crystal display element 455. In other words, the utilization of light is enhanced because of the presence of the light 80.

On the other hand, light 81 (alternate long and two short dashes lines in FIG. 58) that reaches a peak value of luminance when outgoing from the linear light guiding body 552 in the direction at the outgoing angle θ1=−35° (second outgoing direction) propagates through the light guiding body 554 in the direction nearly parallel to the cyclic direction Rhd. Therefore, the light 81 is hardly effected by a reflecting function of the reflecting porion 554e (FIG. 56(b)). Thus, the light θ1 reaches the side surface 554h of the light guiding body 554 (herein, the side surface at the dot light emitting source 451a side), and is reflected on the side surface 554h. The reflected light 81 from the side surface 554h travels in a direction that intersects at right angles with the cyclic direction Rhd.

The light 81 reflected from the side surface 554h reaches an area (triangle indicated by a broken line in FIG. 58) where the light 80 does not reach directly also, thereby making a compensation for the light 80. Consequently, outgoing light in the planarly emitting state from the light guiding body 554 can be distributed more evenly.

Incidentally, the light 80 travels from the light incident surface 554a of the light guiding body 554 along the direction at the outgoing angle θ1=±35°. In practice, however, the light 80 diffuses within the entire light guiding body 554 by being reflected repetitively. Thus, the light 80 alone can make a uniform distribution of outgoing light in the planarly emitting state from the light guiding body 554, but the presence of the light 81 can make a better distribution.

In addition, it is preferable to provide a reflecting film over the side surface 554h, because by so doing, reflection efficiency of the light 81 can be improved.

The other aspects of the shape of the linear light guiding body 552 are identical to those of the linear light guiding body 452 in Embodiment 8 (FIG. 45(a)), except the following concrete numerical values. The following description will more concretely depict the linear light guiding body 552 while referring to FIGS. 57(a) and 57(d).

The prism pitch pt of the linear light guiding body 552 is uniform on the whole, herein set to 1.0 mm. Further, the linear light guiding body 552 is formed so as to be symmetric with respect to the center in the X-axis direction. Therefore, the following description depicts only those from the center to the dot light emitting source 451a side end unless otherwise described particularly.

The height $d_i$ is set so as to vary with the prism position $x_i$, like in Embodiment 8. Viewing the whole linear light guiding body 552, a prism height $d_i$ of a prism 552p at each end is small, and it becomes greater at a position closer to the center.

Here, actually, in the (i+1)'th and i'th prisms 552p, a tilt of the prism height at each prism position is set, like in Embodiment 9, so as to satisfy the relationship expressed as:

$$TILT=(d_{i+1}-d_i)/(x_{i+1}-x_i)=0.005$$

The linear light guiding body 552 was actually produced into a shape that fulfilled the foregoing requirements. The dimensions of the linear light guiding body 552 actually formed are shown in Table 7. Note that the unit of the values shown in Table 7 is millimeter. Further, the data shown in Table 7 are about the prisms 552p located in an area until the 40th prism 552p at the center of the linear light guiding body 552.

TABLE 7

| POSITION | | PRISM HIGHT | PRISM WIDTH $pw_i$ | |
|---|---|---|---|---|
| i | $x_i$ (mm) | $d_i$ (mm) | $pw1_i$ (mm) | $pw2_i$ (mm) |
| 1 | 1.0 | 0.0275 | 0.0476 | 0.0476 |
| 2 | 2.0 | 0.0325 | 0.0563 | 0.0563 |
| ... | ... | ... | ... | ... |
| 39 | 39.0 | 0.218 | 0.377 | 0.377 |
| 40 | 40.0 | 0.223 | 0.386 | 0.386 |

The prism occupation ratio defined by Equation 3 as to the linear light guiding body 552 was 43.5%.

Further, the utilization of light in the foregoing linear light guiding body 502 was measured in the same manner as that in Embodiment 8, and it was found to be about 78%. In addition, the luminance distribution across the light outgoing surface 554b of the light guiding body 554 was not more than 1.8, enabling generation of light in a considerably uniform planarly-emitting state.

Thus, the front light 550 is capable of producing a uniform planarly-emitting state, and further improving utilization of light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

With the lighting system and the lighting element of the present invention, it is possible to improve display quality of an image display device that needs a light source, as previously described. More specifically, a dot light emitting source capable of realizing low power consumption and space saving is employed as a light source and light from the light source is efficiently converted into the linearly emitting state and the planarly emitting state in good distribution, so that a display element can be irradiated with uniform and bright light.

Furthermore, with the lighting system and the light element of the present invention, when they are combined with an image display element, it is possible to prevent a moire fringe that adversely affects image quality, while achieving the foregoing effects.

By constituting a liquid crystal display with the foregoing lighting system, lighting element, and liquid crystal display element, it is possible to provide a liquid crystal display that is small in size and low-power consuming, capable of preventing a moire fringe, and capable of realizing uniform and bright image display.

What is claimed is:

1. A lighting system for irradiating pixels of an image display element with outgoing light, said lighting system comprising:
  a linear light guiding body for converting light from a light source unit into a linearly emitting state; and
  a planar light guiding body in which a cyclic structure for converting light from said linear light guiding body into a planarly emitting state and emitting the converted light is formed,
  wherein light from said linear light guiding body reaches a peak value of luminance when outgoing in a first outgoing direction, said first outgoing direction being a direction on a side of a direction perpendicular to a cyclic direction of said cyclic structure with respect to a normal direction of a light outgoing surface of said linear light guiding body, and
  wherein a tilt is given to the cyclic direction of said cyclic structure with respect to a repeating direction of said pixels.

2. The lighting system as set forth in claim 1, wherein said first outgoing direction is set so that light in said first outgoing direction should travel in said planar light guiding body in a perpendicular direction with respect to said cyclic direction.

3. The lighting system as set forth in claim 1, wherein light from said linear light guiding body reaches a peak value of luminance when outgoing in a second outgoing direction that is different from said first outgoing direction.

4. The lighting system as set forth in claim 3, wherein said first outgoing direction and said second outgoing direction are symmetric with respect to the normal direction of the light outgoing surface of said linear light guiding body.

5. The lighting system as set forth in claim 3, wherein a ratio of maximum value and minimum value in luminance distribution of the light outgoing from said linear light guiding body in said second outgoing direction is not more than 3.

6. The lighting system as set forth in claim 1, wherein a ratio of maximum value and minimum value in luminance distribution of the light outgoing from said linear light guiding body in said first outgoing direction is not more than 3.

7. The lighting system as set forth in claim 1, wherein an angle that the cyclic direction of said cyclic structure provided on said planar light guiding body forms with respect to the repeating direction of said pixels is not less than 10° and not more than 80°.

8. The lighting system as set forth in claim 1, wherein in said linear light guiding body, on a surface thereof opposing said light outgoing surface, a propagating portion and a reflecting portion are repetitively formed.

9. The lighting system as set forth in claim 1, wherein a diffusing and reflecting sheet is provided to surround said linear light guiding body.

10. The lighting system as set forth in claim 1, wherein:
said light source unit causes the light to enter said linear light guiding body,
the lighting system further comprising:
optical matching means provided between said light source unit and said linear light guiding body.

11. The lighting system as set forth in claim 10, wherein said optical matching means is an adhesive resin having a refractive index n ranging from 1.4 to 1.7 both inclusive.

12. The lighting system as set forth in claim 1, wherein said linear light guiding body is formed so that:
a thickness t2 of said light outgoing surface of said linear light guiding body is substantially equal to a thickness t1 of a light incident surface of said planar light guiding body; and
an angle θ5 formed between the normal direction of said light outgoing surface with a side end surface of said linear light guiding body satisfies:

$$0° < \theta5 \leq 20°.$$

13. The lighting system as set forth in claim 1, wherein said linear light guiding body is tapered so that a cross section of said linear light guiding body taken along a plane perpendicular to said light outgoing surface thereof should be in a shape of trapezoid that widens from a light outgoing surface side toward a side opposing the light outgoing surface side.

14. The lighting system as set forth in claim 13, wherein an angle formed between the normal direction of said light outgoing surface of said linear light guiding body with a tapered side surface is larger than 0° and not larger than 20°.

15. The lighting system as set forth in claim 1, wherein a reflecting surface is provided on said light incident surface of said linear light guiding body in such a manner that light from said light source unit should be reflected toward said cyclic structures formed on said linear light guiding body.

16. The lighting system as set forth in claim 1, wherein the following relationship is satisfied:

$$0 \, mm < (L2-L1) \leq 10 \, mm$$

where L1 representing a length of said light incident surface of said planar light guiding body, and L2 representing a length of said light outgoing surface of said linear light guiding body.

17. The lighting system as set forth in claim 16, wherein the following relationship is satisfied:

$$g \times \tan \theta \leq (L2-L1) \leq 10 \, mm$$

where:
θ represents an angle formed between the cyclic direction of said cyclic structure provided on said planar light guiding body and the repeating direction of said pixels;
L1 represents a length of said light incident surface of said planar light guiding body;
L2 represents a length of said light outgoing surface of said linear light guiding body; and
g represents a distance between said light incident surface of said planar light guiding body and said light outgoing surface of said linear light guiding body.

18. The lighting system as set forth in claim 1, wherein light outgoing from said linear light guiding body reaches substantially a peak value of luminance when outgoing in a direction at an angle θ1 that satisfies:

$$\theta1 = \sin^{-1}(n \times \sin \theta)$$

or $$\theta1 = -\sin^{-1}(n \times \sin \theta)$$

where:
θ represents an angle formed between the cyclic direction of said cyclic structure provided on said planar light guiding body and the repeating direction of
said pixels; and
n represents a refractive index of said planar light guiding body.

19. The lighting system as set forth in claim 1, wherein the normal direction of said light outgoing surface of said linear light guiding body and said first outgoing direction form an angle expressed as:

$$\sin^{-1}(n \times \sin \theta)$$

where:
θ represents an angle formed between the cyclic direction of said cyclic structure provided on said planar light guiding body and said light incident surface of said planar light guiding body; and
n represents a refractive index of said planar light guiding body.

20. A liquid crystal display comprising:
a lighting system as set forth in claim 1; and
a liquid crystal display element displaying an image by controlling, at each pixel, light outgoing from said light outgoing surface of said planar light guiding body.

21. The liquid crystal display as set forth in claim 20, wherein said liquid crystal display element is a reflecting liquid crystal display element.

22. A front light comprising a lighting system as set forth in claim 1.

23. A liquid crystal display including:
a light source unit composed of at least one dot light emitting source;
sheet-state diffusing means for converting light from said light source unit into a linearly emitting state;
planar light guiding body for converting light in a linearly emitting state into a planarly emitting state; and a liquid crystal display element displaying an image by controlling, at each pixel, light outgoing from said light outgoing surface of said planar light guiding body, wherein:

said light source unit is disposed at a lower end of a portion of said light outgoing surface of said planar light guiding body, which portion protrudes from said liquid crystal display element;

said diffusing means is provided so that at least a part thereof opposes said light source unit with said planar light guiding body being disposed therebetween, while at least a part thereof opposes an end surface of the portion of said planar light guiding body, which portion protrudes from said liquid crystal display element; and a distance L between said dot light emitting source and said diffusing means, and a thickness the of the portion of said planar light guiding body, which portion protrudes from said liquid crystal display element satisfy:

$$0 \leq (L-te) \leq 102 \text{ mm}.$$

24. The liquid crystal display as set forth in claim 23, wherein said at least one dot light emitting source constituting said light source unit is composed of an LED element.

25. The liquid crystal display as set forth in claim 23, wherein said liquid crystal display element is a reflecting liquid crystal display element.

26. A lighting system having a light source unit and a planar light guiding body, said light source unit being composed of at least one dot light emitting source, said planar light guiding body having a light incident surface to which light from said light source unit is incident and converting light in a linearly emitting state that is incident onto said light incident surface into a planarly emitting state, said lighting system comprising:

sheet-state diffusing means that converts light emitted from said light source unit into a linearly emitting state, said sheet-state diffusing means being provided in the vicinity of said dot light emitting source and arranged so that at least a part thereof opposes said light source unit while at least a part thereof opposes said light incident surface of said planar light guiding body, wherein:

said at least one dot light emitting source is disposed below said light incident surface of said planar light guiding body;

a direction in which light outgoes from said dot light emitting source is set to a normal direction of said light incident surface, directed from inside of said planar light guiding body to outside; and a distance L' between said dot light emitting source and said diffusing means satisfies:

$$0 \leq L' \leq 10 \text{ mm}.$$

27. The lighting system as set forth in claim 26, wherein said at least one dot light emitting source constituting said light source unit is composed of an LED element.

28. A liquid crystal display comprising:

a lighting system as set forth in claim 26; and a liquid crystal display element displaying an image by controlling, at each pixel, light outgoing from said light outgoing surface of said planar light guiding body.

29. A front light comprising a lighting system as set forth in claim 26.

30. A lighting system comprising:

a planar light guiding body having a light incident surface, an end surface opposing to said light incident surface, a light outgoing surface substantially perpendicular to said light incident surface, and a counter surface opposing to said light outgoing surface;

a light source unit disposed on said end surface, for emitting light in dot emitting state and opposing to said light incident surface; and converting means disposed on said light incident surface, for converting the light from said light source unit into a linearly emitting state by making the light from said light source unit become incident to said light incident surface again, said converting means being diffusing means;

wherein said counter surface is provided with cyclic structures for a) converting light from said light source into divergent light by the time it reaches said converting means and b) converting the light from said light incident surface into a planarly emitting state, each of the cyclic structures being an asymmetric prism having a propagating portion and a reflecting portion.

31. The lighting system as set forth in claim 30, wherein:

said light source unit is composed of at least one dot light emitting source.

32. The lighting system as set forth in claim 31, wherein said at least one dot light emitting source constituting said light source unit is composed of an LED element.

33. A lighting system having a light source unit and a planar light guiding body, said planar light guiding body having two light incident surfaces opposing each other to which light from said light source unit is incident as well as a light outgoing surface from which the incident light converted into a planarly emitting state outgoes, said lighting system comprising:

said light source unit is composed of an LED array, wherein:

said LED array includes a first LED array provided on one of said light incident surfaces of said planar light guiding body, and a second LED array provided on the other light incident surface of said planar light guiding body; and said first and second LED arrays alternately emit light.

34. The lighting system as set forth in claim 33, wherein a frequency f causing said first and second LED arrays to alternately emit light satisfies:

$$60 \text{ Hz} \leq f \leq 10 \text{ kHz}.$$

35. A liquid crystal display comprising:

a lighting system as set forth in claim 33; and a liquid crystal display element displaying an image by controlling, at each pixel, light outgoing from said light outgoing surface of said planar light guiding body.

36. A front light comprising a lighting system as set forth in claim 33.

37. A liquid crystal display comprising:

a front light including a light source unit and a planar light guiding body, said planar light guiding body having a light incident surface to which light from said light source unit is incident and a light outgoing surface from which the incident light outgoes, the light from said light source unit being in a linearly emitting state at least when being incident to said light incident surface of said planar light guiding body; and a reflecting liquid crystal display element displaying an image by controlling, at each pixel, light outgoing from said light outgoing surface of said planar light guiding body, wherein:
on a counter surface of said planar light guiding body opposing said light outgoing surface thereof, a cyclic structure composed of a propagating portion and a reflecting portion is repetitively formed; and
said cyclic structure is provided on said planar light guiding body so that a cyclic direction thereof has an angle θ of not less than 10° and not more than 80° with respect to the repeating direction of said pixels.

38. A lighting element comprising a prismatic linear light guiding body, said linear light guiding body having a light incident surface to which light from a light source unit is incident and a light outgoing surface from which the incident light outgoes, wherein:
said light incident surface is provided on an end surface of said linear light guiding body, the end surface being at an end in a lengthwise direction;
said light outgoing surface is provided on a side surface of said linear light guiding body along the lengthwise direction;
notches that reflect the incident light are arrayed on a surface of said linear light guiding body opposing said light outgoing surface at constant pitches in the lengthwise direction, the number of said notches being I (I is an integer of not less than 2); and
as to said I notches, an average of differences between widths of adjacent notches is greater than 0, said difference being defined as:

$$DIFFERENCE = (pw_{i+1} - pw_i)$$

where $pw_i$ is a width of the i'th notch from said light incident surface (i is an integer ranging from 1 to I).

39. The lighting element as set forth in claim 38, wherein, on the surface of said linear light guiding body opposing said light outgoing surface, a total of widths of said notches in the lengthwise direction accounts for not less than 5 percent and not more than 80 percent of a sum of the total of said widths of said notches and a total of widths of flat portions provided between said notches.

40. The lighting element as set forth in claim 38, wherein, on the surface of said linear light guiding body opposing said light outgoing surface, a sum of a width of said notch in the lengthwise direction and a width of a flat portion in the lengthwise direction is not less than 0.05 mm and not more than 2 mm, the flat portion being a portion provided between said notch and another adjacent notch on one side to said notch.

41. The lighting element as set forth in claim 38, wherein:
said linear light guiding body has a second light incident surface on an end surface opposing said light incident surface of said linear light guiding body;
notches that reflect the incident light are arrayed in the lengthwise direction on a surface of said linear light guiding body opposing said light outgoing surface, the number of said notches being J (J is an integer of not less than 2); and
an average of tilts of said J notches is greater than 0, said tilt being defined as:

$$TILT = (d_{j+1} - d_j)/(x_{j+1} - x_j)$$

where $x_j$ and $d_j$ are a distance from said light incident surface, and a depth, respectively, of the j'th notch from said second light incident surface (j is an integer ranging from 1 to I).

42. The lighting element as set forth in claim 38, wherein:
each of said notches is a V-shape groove formed with two flat surfaces; and
an angle that each flat surface forms with respect to said light outgoing surface is not less than 30° and not more than 60°.

43. The lighting element as set forth in claim 38, wherein diffusing means is provided in the vicinity of said linear light guiding body.

44. A lighting element comprising a prismatic linear light guiding body, said linear light guiding body having a light incident surface to which light from a light source unit is incident and a light outgoing surface from which the incident light outgoes, wherein:
said light incident surface is provided on an end surface of said linear light guiding body, the end surface being at an end in a lengthwise direction;
said light outgoing surface is provided on a side surface of said linear light guiding body along the lengthwise direction;
notches that reflect the incident light are arrayed on a surface of said linear light guiding body opposing said light outgoing surface in the lengthwise direction, the number of said notches being I (I is an integer of not less than 2); and
an average of tilts of said I notches is greater than 0, said tilt being defined as:

$$TILT = (d_{i+1} - d_i)/(x_{i+1} - x_i)$$

where $x_i$ and $d_i$ are a distance from said light incident surface, and a depth, respectively, of the i'th notch from said light incident surface (i is an integer ranging from 1 to I).

45. The lighting element as set forth in claim 44, wherein said average of tilts of said I notches is in a range of not less than 0.0001 and not more than 0.05.

46. The lighting element as set forth in claim 44, wherein values of said tilts are uniform throughout said I notches.

47. The lighting element as set forth in claim 44, wherein, on the surface of said linear light guiding body opposing said light outgoing surface, a total of widths of said notches in the lengthwise direction accounts for not less than 5 percent and not more than 80 percent of a sum of the total of said widths of said notches and a total of widths of flat portions provided between said notches.

48. The lighting element as set forth in claim 44, wherein, on the surface of said linear light guiding body opposing said light outgoing surface, a sum of a width of said notch in the lengthwise direction and a width of a flat portion in the lengthwise direction is not less than 0.05 mm and not more than 2 mm, the flat portion being a portion provided between said notch and another adjacent notch on one side to said notch.

49. The lighting element as set forth in claim 44, wherein:
said linear light guiding body has a second light incident surface on an end surface opposing said light incident surface of said linear light guiding body;
notches that reflect the incident light are arrayed in the lengthwise direction on a surface of said linear light guiding body opposing said light outgoing surface, the number of said notches being J (J is an integer of not less than 2); and
an average of tilts of said J notches is greater than 0, said tilt being defined as:

$$TILT = (d_{j+1} - d_j)/(x_{j+1} - x_j)$$

where $x_j$ and $d_j$ are a distance from said light incident surface, and a depth, respectively, of the j'th notch from said second light incident surface (j is an integer ranging from 1 to I).

50. The lighting element as set forth in claim 44, wherein:
    each of said notches is a V-shape groove formed with two flat surfaces; and
    an angle that each flat surface forms with respect to said light outgoing surface is not less than 30° and not more than 60°.

51. The lighting element as set forth in claim 44, wherein diffusing means is provided in the vicinity of said linear light guiding body.

52. A lighting element comprising a prismatic linear light guiding body, said linear light guiding body having a light incident surface to which light from a light source unit is incident and a light outgoing surface from which the incident light outgoes, wherein:
    said light incident surface is provided on an end surface of said linear light guiding body, the end surface being at an end in a lengthwise direction;
    said light outgoing surface is provided on a side surface of said linear light guiding body along the lengthwise direction;
    a plurality of notches that reflect the incident light are arrayed on a surface of said linear light guiding body opposing said light outgoing surface in the lengthwise direction;
    each notch is a V-shape groove formed with two flat surfaces;
    said flat surfaces of said notches are provided at not less than two different angles with respect to said light outgoing surface.

53. The lighting element as set forth in claim 52, wherein:
    each of said notches is a V-shape groove formed with two flat surfaces; and
    an angle that each flat surface forms with respect to said light outgoing surface is not less than 30° and not more than 60°.

54. The lighting element as set forth in claim 52, wherein diffusing means is provided in the vicinity of said linear light guiding body.

55. A lighting system for irradiating pixels of an image display element with outgoing light, said lighting system comprising:
    a linear light guiding body for converting light from a light source unit into a linearly emitting state; and
    a planar light guiding body in which a cyclic structure for converting light from said linear light guiding body into a planarly emitting state and emitting the converted light is formed,
    wherein light from said linear light guiding body reaches a peak value of luminance when outgoing in a first outgoing direction, said first outgoing direction being a direction on a side of a direction perpendicular to a cyclic direction of said cyclic structure with respect to a normal direction of a light outgoing surface of said linear light guiding body, and
    wherein light from said linear light guiding body reaches a peak value of luminance when outgoing in a second outgoing direction that is different from said first outgoing direction.

56. The lighting system as set forth in claim 55, wherein said first outgoing direction and said second outgoing direction are symmetric with respect to the normal direction of the light outgoing surface of said linear light guiding body.

57. The lighting system as set forth in claim 55, wherein a ratio of maximum value and minimum value in luminance distribution of the light outgoing from said linear light guiding body in said second outgoing direction is not more than 3.

58. A lighting system for irradiating pixels of an image display element with outgoing light, said lighting system comprising:
    a linear light guiding body for converting light from a light source unit into a linearly emitting state; and
    a planar light guiding body in which a cyclic structure for converting light from said linear light guiding body into a planarly emitting state and emitting the converted light is formed,
    wherein light from said linear light guiding body reaches a peak value of luminance when outgoing in a first outgoing direction, said first outgoing direction being a direction on a side of a direction perpendicular to a cyclic direction of said cyclic structure with respect to a normal direction of a light outgoing surface of said linear light guiding body, and
    wherein said linear light guiding body is formed so that:
    a thickness t2 of said light outgoing surface of said linear light guiding body is substantially equal to a thickness t1 of a light incident surface of said planar light guiding body; and
    an angle θ5 formed between the normal direction of said light outgoing surface with a side end surface of said linear light guiding body satisfies:

$0° < θ5 ≤ 20°$.

59. A lighting system for irradiating pixels of an image display element with outgoing light, said lighting system comprising:
    a linear light guiding body for converting light from a light source unit into a linearly emitting state; and
    a planar light guiding body in which a cyclic structure for converting light from said linear light guiding body into a planarly emitting state and emitting the converted light is formed,
    wherein light from said linear light guiding body reaches a peak value of luminance when outgoing in a first outgoing direction, said first outgoing direction being a direction on a side of a direction perpendicular to a cyclic direction of said cyclic structure with respect to a normal direction of a light outgoing surface of said linear light guiding body, and
    wherein said linear light guiding body is tapered so that a cross section of said linear light guiding body taken along a plane perpendicular to said light outgoing surface thereof should be in a shape of trapezoid that widens from a light outgoing surface side toward a side opposing the light outgoing surface side.

60. The lighting system as set forth in claim 59, wherein an angle formed between the normal direction of said light outgoing surface of said linear light guiding body with a tapered side surface is larger than 0° and not larger than 20°.

61. A lighting system for irradiating pixels of an image display element with outgoing light, said lighting system comprising:
    a linear light guiding body for converting light from a light source unit into a linearly emitting state; and
    a planar light guiding body in which a cyclic structure for converting light from said linear light guiding body into a planarly emitting state and emitting the converted light is formed, wherein light from said linear light guiding body reaches a peak value of luminance when outgoing in a first outgoing direction, said first outgoing direction being a direction on a side of a direction perpendicular to a cyclic direction of said cyclic structure with respect to a normal direction of a light outgoing surface of said linear light guiding body, and wherein the following relationship is satisfied:

$$0 \; mm < (L2-L1) \leq 10 \; mm$$

where L1 representing a length of said light incident surface of said planar light guiding body, and L2 representing a length of said light outgoing surface of said linear light guiding body.

62. The lighting system as set forth in claim 61, wherein the following relationship is satisfied:

$$g \times \tan \theta < (L2-L1) \leq 10 \; mm$$

where:

$\theta$ represents an angle formed between the cyclic direction of said cyclic structure provided on said planar light guiding body and the repeating direction of said pixels;

L1 represents a length of said light incident surface of said planar light guiding body;

L2 represents a length of said light outgoing surface of said linear light guiding body; and g represents a distance between said light incident surface of said planar light guiding body and said light outgoing surface of said linear light guiding body.

63. A liquid crystal display, comprising:

a lighting system as set forth in claim 61; and a liquid crystal display element displaying an image by controlling, at each pixel, light outgoing from said light outgoing surface of said planar light guiding body.

64. A lighting system for irradiating pixels of an image display element with outgoing light, said lighting system comprising:

a linear light guiding body for converting light from a light source unit into a linearly emitting state; and a planar light guiding body in which a cyclic structure for converting light from said linear light guiding body into a planarly emitting state and emitting the converted light is formed, wherein light from said linear light guiding body reaches a peak value of luminance when outgoing in a first outgoing direction, said first outgoing direction being a direction on a side of a direction perpendicular to a cyclic direction of said cyclic structure with respect to a normal direction of a light outgoing surface of said linear light guiding body, and wherein light outgoing from said linear light guiding body reaches substantially a peak value of luminance when outgoing in a direction at an angle $\theta 1$ that satisfies:

$$\theta 1 = \sin^{-1}(n \times \sin \theta)$$

or $$\theta 1 = -\sin^{-1}(n \times \sin \theta)$$

where:

$\theta$ represents an angle formed between the cyclic direction of said cyclic structure provided on said planar light guiding body and the repeating direction of said pixels; and n represents a refractive index of said planar light guiding body.

65. A lighting system for irradiating pixels of an image display element with outgoing light, said lighting system comprising:

a linear light guiding body for converting light from a light source unit into a linearly emitting state; and a planar light guiding body in which a cyclic structure for converting light from said linear light guiding body into a planarly emitting state and emitting the converted light is formed, wherein light from said linear light guiding body reaches a peak value of luminance when outgoing in a first outgoing direction, said first outgoing direction being a direction on a side of a direction perpendicular to a cyclic direction of said cyclic structure with respect to a normal direction of a light outgoing surface of said linear light guiding body, and wherein the normal direction of said light outgoing surface of said linear light guiding body and said first outgoing direction form an angle expressed as:

$$\sin^{-1}(n \times \sin \theta)$$

where:

$\theta$ represents an angle formed between the cyclic direction of said cyclic structure provided on said planar light guiding body and said light incident surface of said planar light guiding body; and n represents a refractive index of said planar light guiding body.

66. A liquid crystal display, comprising:

a lighting system for irradiating pixels of an image display element with outgoing light, said lighting system comprising:

a linear light guiding body for converting light from a light source unit into a linearly emitting state; and a planar light guiding body in which a cyclic structure for converting light from said linear light guiding body into a planarly emitting state and emitting the converted light is formed, wherein light from said linear light guiding body reaches a peak value of luminance when outgoing in a first outgoing direction, said first outgoing direction being a direction on a side of a direction perpendicular to a cyclic direction of said cyclic structure with respect to a normal direction of a light outgoing surface of said linear light guiding body, and a liquid crystal display element displaying an image by controlling, at each pixel, light outgoing from said light outgoing surface of said planar light guiding body, wherein said liquid crystal display element is a reflecting liquid crystal display element.

67. A lighting system having a light source unit and a planar light guiding body, said planar light guiding body having a light incident surface to which light from said light source unit is incident and converting light in a linearly emitting state that is incident onto said light incident surface into a planarly emitting state, said lighting system comprising:

sheet-state converting means that converts light emitted from said light source unit into light in a linearly emitting state, said sheet-state converting means being arranged so that at least a part thereof opposes said light source unit while at least a part thereof opposes said light incident surface of said planar light guiding body, wherein:

said light source unit is composed of at least one dot light emitting source; and said converting means is diffusing means provided in the vicinity of said dot light emitting source, wherein:

said at least one dot light emitting source is disposed below the light incident surface of said planar light guiding body so as to face said diffusing means through said planar light guiding body in-between; and a distance L between said dot light emitting source and said diffusing means, and a thickness te of said light incident surface of said planar light guiding body satisfy:

$$0 \leq (L-te) \leq 10 \text{ mm}.$$

68. A lighting system having a light source unit and a planar light guiding body, said planar light guiding body having a light incident surface to which light from said light source unit is incident and converting light in a linearly emitting state that is incident onto said light incident surface into a planarly emitting state, said lighting system comprising:

sheet-state converting means that converts light emitted from said light source unit into light in a linearly emitting state, said sheet-state converting means being arranged so that at least a part thereof opposes said light source unit while at least a part thereof opposes said light incident surface of said planar light guiding body, wherein:

said light source unit is composed of at least one dot light emitting source; and said converting means is diffusing means provided in the vicinity of said dot light emitting source, wherein:

said at least one dot light emitting source is disposed below said light incident surface of said planar light guiding body;

a direction in which light outgoes from said dot light emitting source is set to a normal direction of said light incident surface, directed from inside of said planar light guiding body to outside; and a distance L' between said dot light emitting source and said diffusing means satisfies:

$$0 \leq L' \leq 10 \text{ mm}.$$

* * * * *